(12) United States Patent
Blythe et al.

(10) Patent No.: US 12,445,666 B2
(45) Date of Patent: Oct. 14, 2025

(54) METHOD AND SYSTEM FOR CONTENT AWARE MONITORING OF MEDIA CHANNEL OUTPUT BY A MEDIA SYSTEM

(71) Applicant: Evertz Microsystems Ltd., Burlington (CA)

(72) Inventors: Jeremy Blythe, Burlington (CA); Barnaby Dalton, Mississauga (CA); Robert Beattie, Blainslie (GB); Andrew Duncan, Newmill (GB); Jeff Wei, Richmond Hill (CA)

(73) Assignee: Evertz Microsystems Ltd., Burlington (CA)

( * ) Notice: Subject to any disclaimer, the term of this patent is extended or adjusted under 35 U.S.C. 154(b) by 58 days.

(21) Appl. No.: 18/523,191

(22) Filed: Nov. 29, 2023

(65) Prior Publication Data

US 2024/0171791 A1    May 23, 2024

Related U.S. Application Data

(63) Continuation of application No. 17/839,650, filed on Jun. 14, 2022, now Pat. No. 11,871,057.

(60) Provisional application No. 63/210,520, filed on Jun. 15, 2021.

(51) Int. Cl.
    *H04N 21/24*     (2011.01)
    *H04N 21/234*    (2011.01)

(52) U.S. Cl.
    CPC ... *H04N 21/2407* (2013.01); *H04N 21/23418* (2013.01)

(58) Field of Classification Search
    None
    See application file for complete search history.

(56) References Cited

U.S. PATENT DOCUMENTS

| | | |
|---|---|---|
| 8,259,177 B2 | 9/2012 | Gits et al. |
| 8,655,056 B2 | 2/2014 | Singh et al. |
| 8,671,109 B2 | 3/2014 | Gupta et al. |
| 8,731,286 B2 | 5/2014 | Cavet |
| 8,831,760 B2 | 9/2014 | Gupta et al. |
| 9,497,505 B2 | 11/2016 | Heffernan et al. |
| 11,871,057 B2 | 1/2024 | Blythe et al. |

(Continued)

FOREIGN PATENT DOCUMENTS

WO    2013164817 A1    11/2013

*Primary Examiner* — Cai Y Chen
(74) *Attorney, Agent, or Firm* — SMART & BIGGAR LP

(57) ABSTRACT

A system and method for content aware monitoring of an output of a media channel by a media system is provided herein. In at least one embodiment, the method comprises: receiving a media assertion schedule comprising a schedule of assertion checks which allow validating that the output of the media channel, by the media system, is synchronized with an expected media channel output; receiving, from a signature generating module, at least one observed signature file; determining that the timestamp data, in each of the at least one received observed signature file, aligns with at least one timecode included in an assertion check in the media assertion schedule; identifying an assertion condition included in the assertion check; and validating the assertion condition using the observed media frame signatures included in each of the at least one received observed signature file.

20 Claims, 30 Drawing Sheets

(56) References Cited

U.S. PATENT DOCUMENTS

2013/0259761 A1* 10/2013 Betsushiyo ............ B01D 53/94
422/180
2016/0094877 A1 3/2016 Heffernan et al.
2019/0138549 A1* 5/2019 Oztaskent ............. G06F 16/685

* cited by examiner

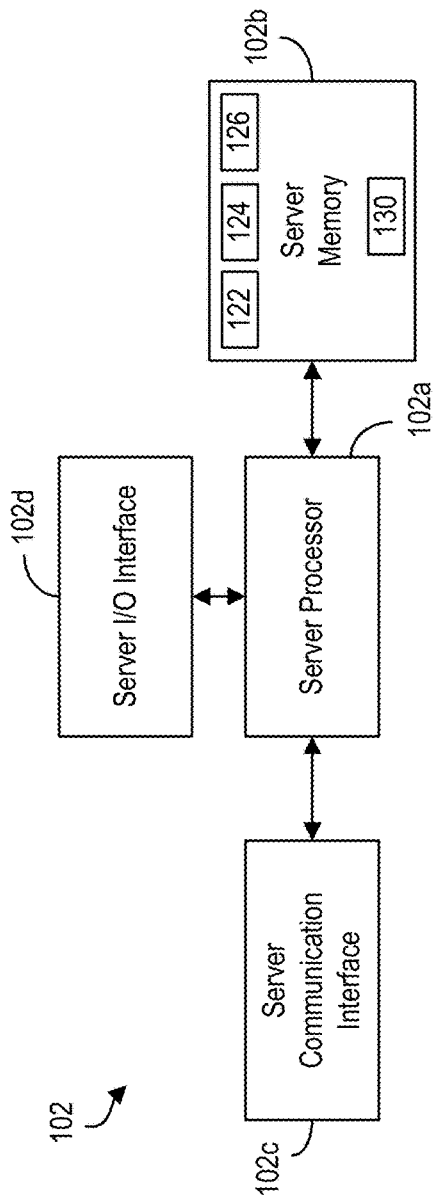
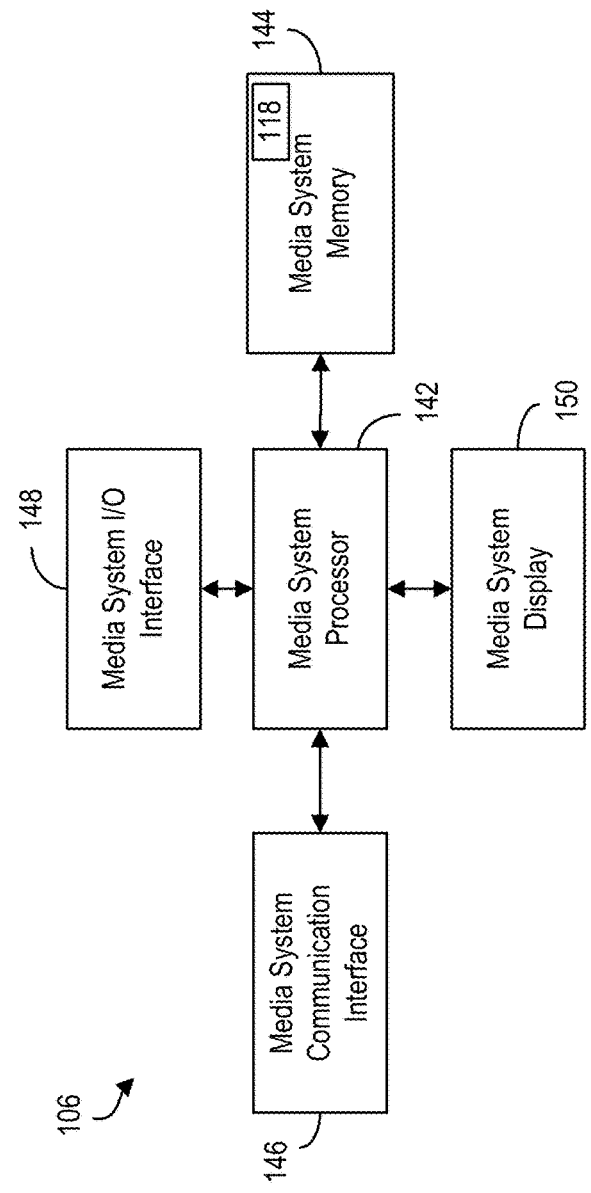

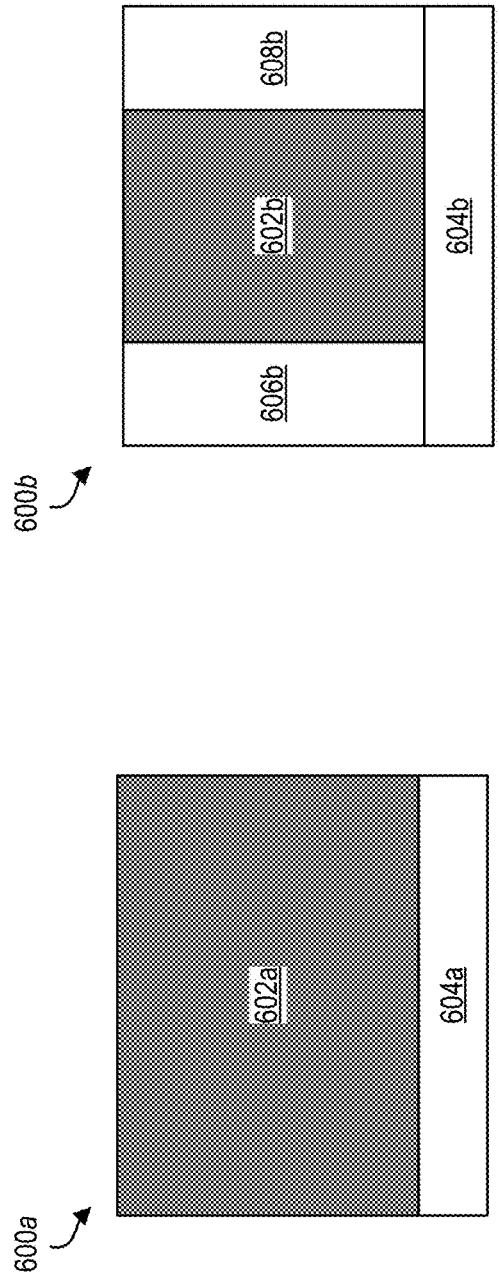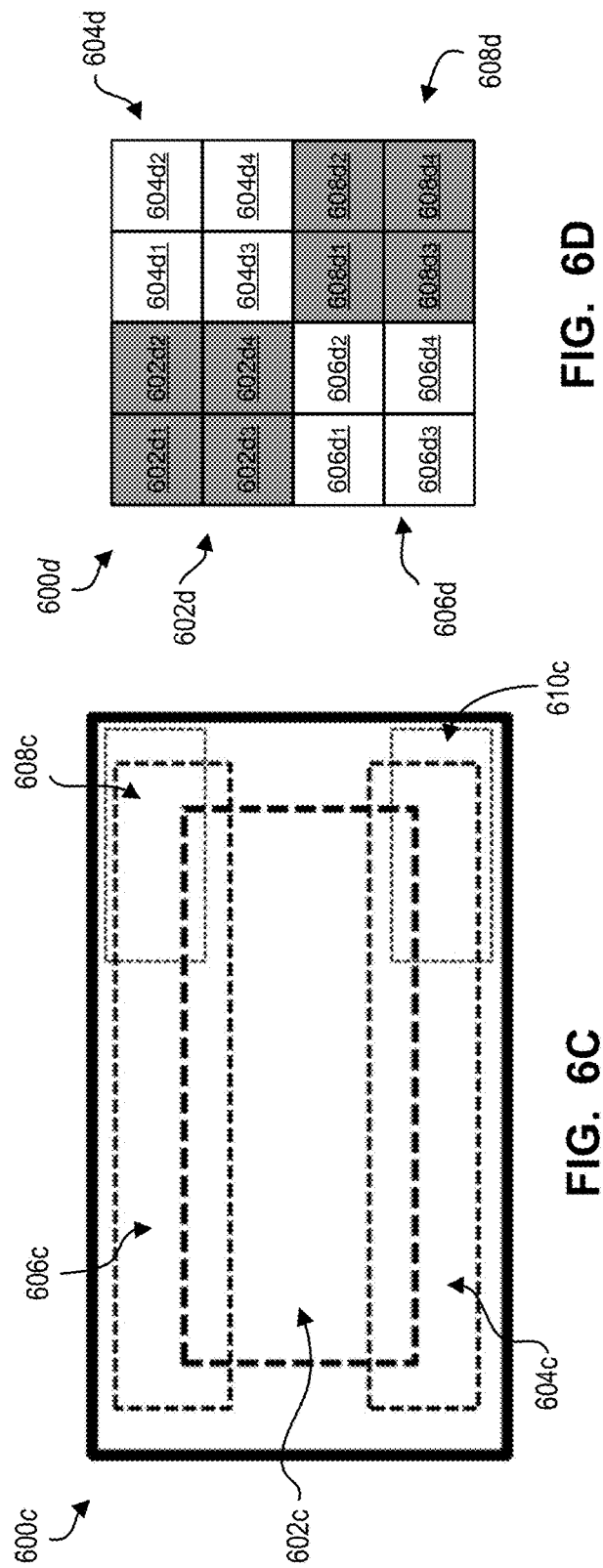

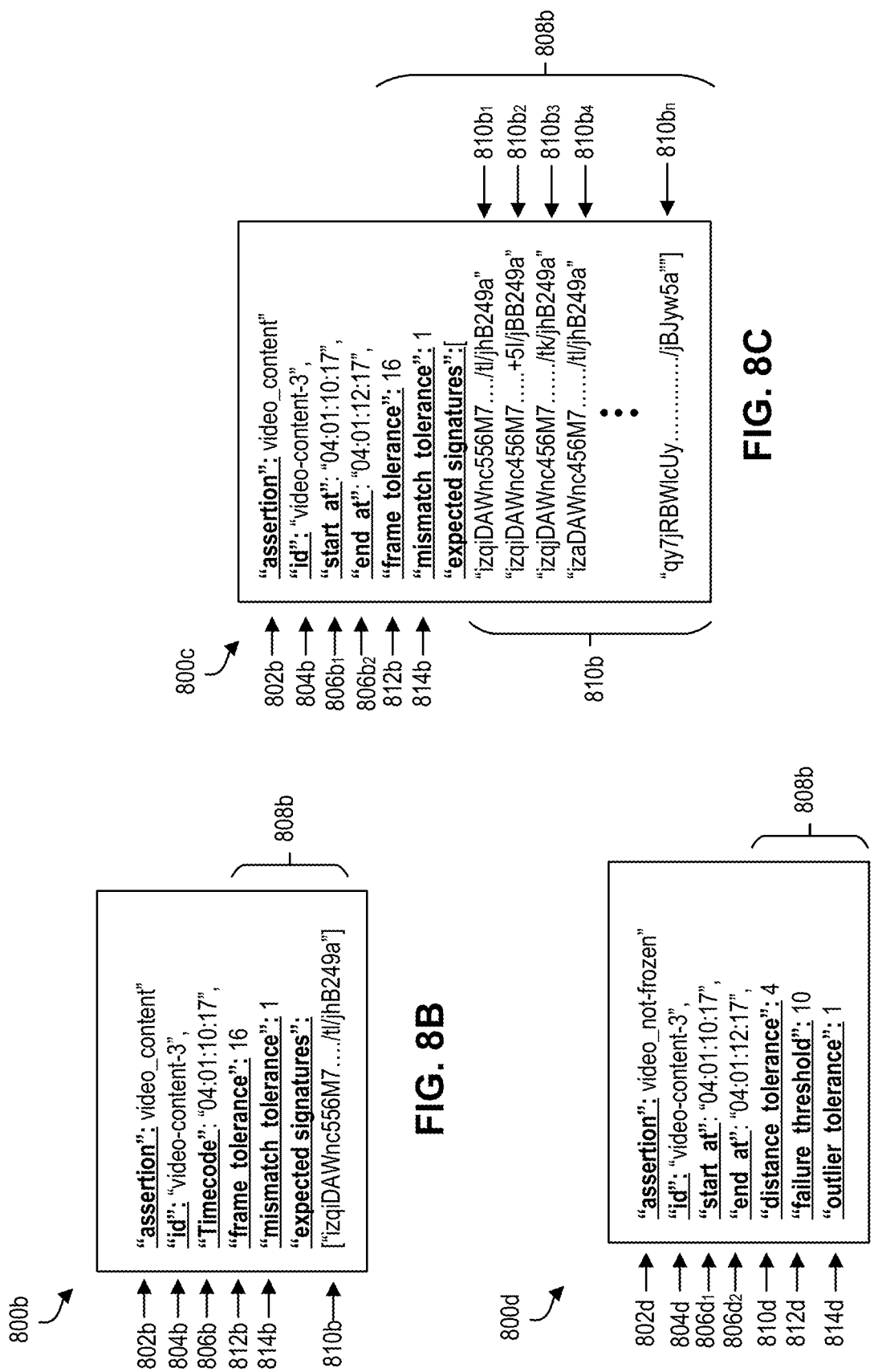

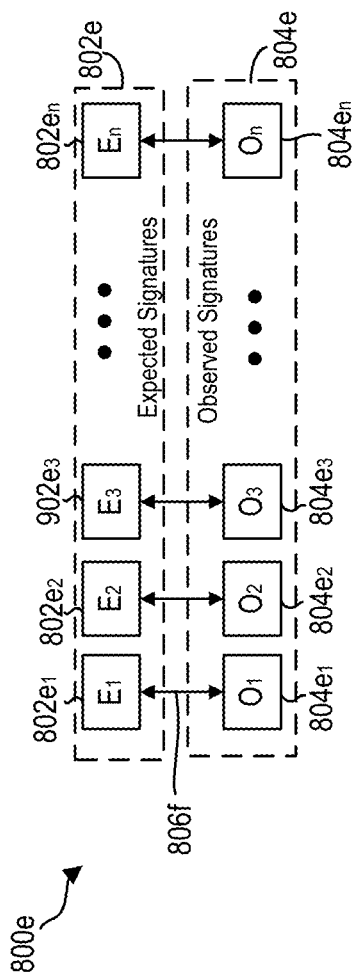
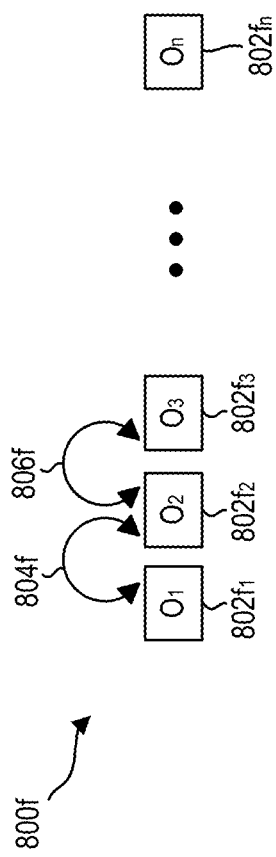
FIG. 8E
FIG. 8F

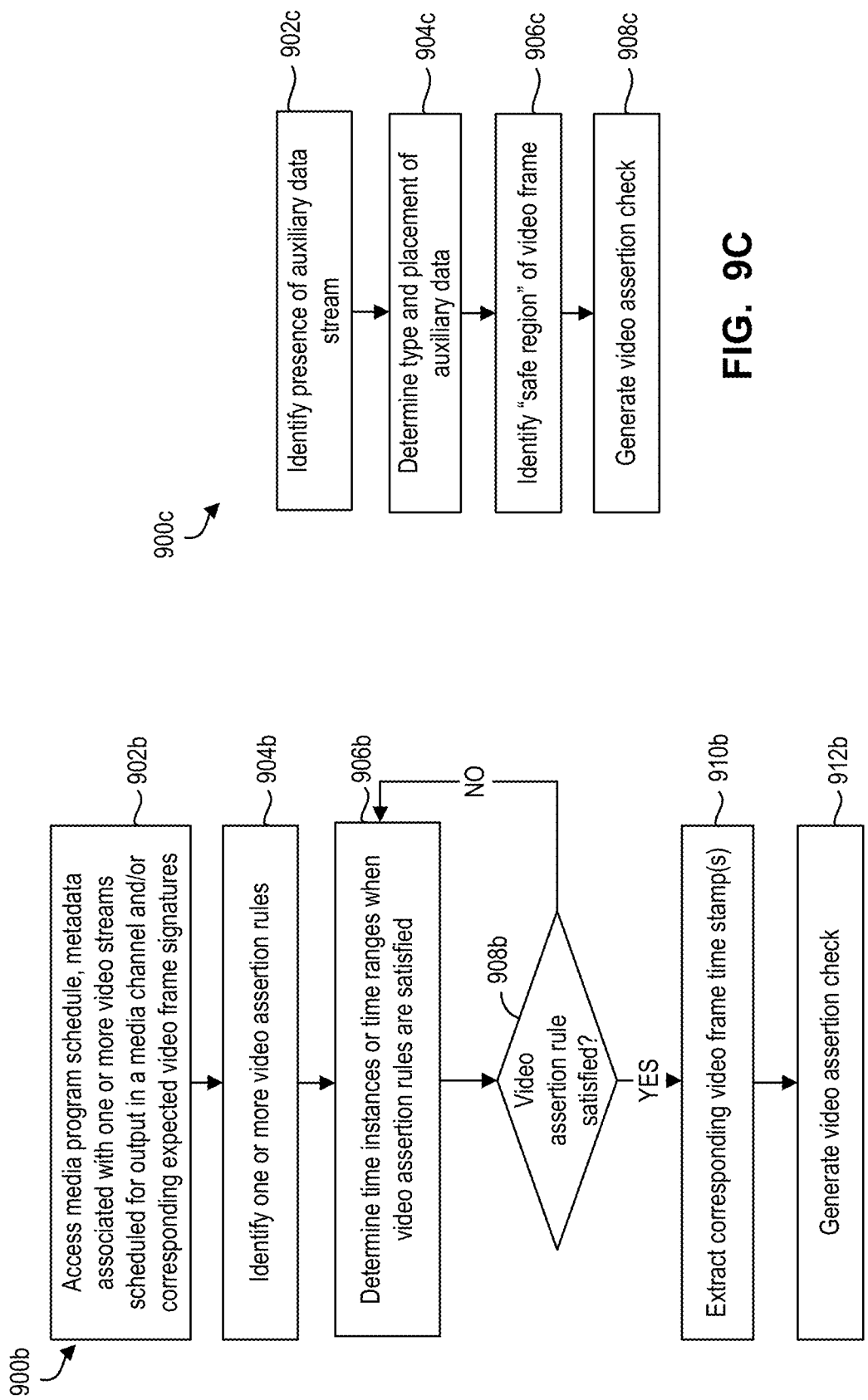

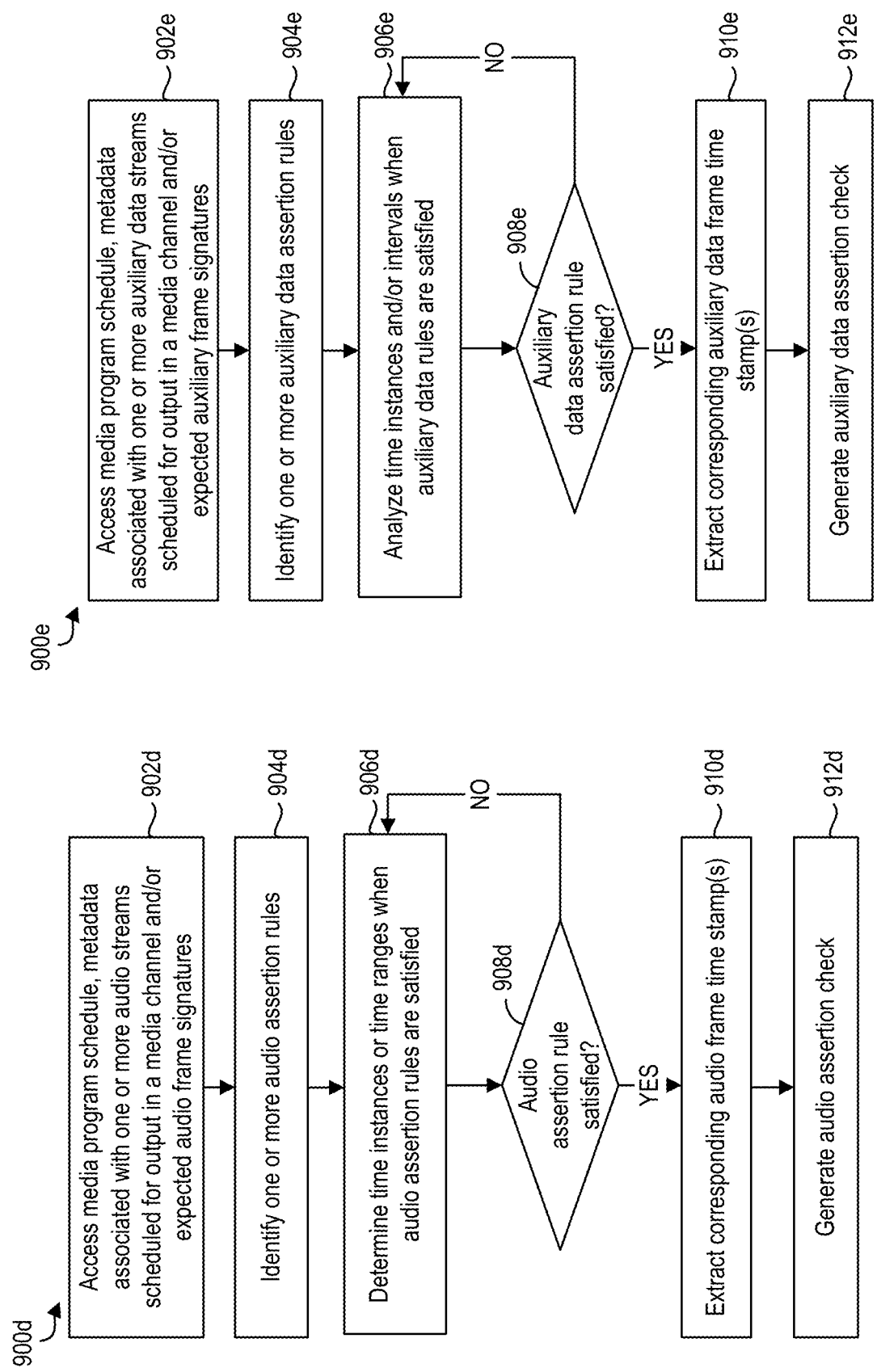

METHOD AND SYSTEM FOR CONTENT AWARE MONITORING OF MEDIA CHANNEL OUTPUT BY A MEDIA SYSTEM

REFERENCE TO RELATED APPLICATIONS

This application is a continuation of U.S. application Ser. No. 17/839,650 filed on Jun. 14, 2022, which claims the benefit of U.S. Provisional Application No. 63/210,520 filed on Jun. 15, 2021, the entire contents of which are incorporated herein by reference.

FIELD

The described embodiments relate to monitoring of media channel output, and in particular, to a method and system for content aware monitoring of media channel output by a media system.

INTRODUCTION

Media broadcasting involves the distribution of media content (e.g., television shows) to various downstream media playing devices, such as television sets as well other end-user computing devices (e.g., laptops, mobile phones, etc.). The broadcasting can occur, for example, using "over-the-air" broadcasting, that includes traditional terrestrial, satellite and cable communication channels. Broadcasting can also occur via streaming through internet protocol networks (e.g., internet protocol television (IPTV)).

A media broadcast "pipeline" often starts at a broadcast station, and ends at one or more end-user devices. The broadcast station can include a cable or network television station or a radio station. The broadcast station aggregates the media content for broadcasting in accordance with a "media program schedule". The program schedule can include, for example, a listing of different media content for broadcasting, as well as the broadcasting times for output of that media content. In some example cases, broadcast stations may even broadcast a plurality of media channels, each media channel having its own unique program schedule. For example, international or national broadcast stations may broadcast different media channels, having different scheduled media content, tailored for the specific broadcast region receiving the channel.

Once the media content is broadcast by the station (e.g., on air or via streaming), the media content may be received directly by one or more end-user devices. In other cases, broadcast content may also be received by other broadcast stations, such as regional or local stations. The regional or local stations may receive the broadcast content, and may supplement (or modify) the program schedule with additional content reflecting regional or local preferences.

A significant complexity in media broadcasting, however, is the need for real-time or near real-time monitoring of broadcast output. In other words, there is a need to monitor each broadcast channel to ensure that the actual channel output is synchronized with the expected channel output. The expected channel output can be defined by a channel's media program schedule.

In many cases, channel monitoring is performed manually (or visually) by a human operator. For example, a human operator is located in a broadcast control room, and is tasked with visually monitoring on-air playout of media channel content using one or more multi-viewer monitoring screens. In some example cases, a single human operator is tasked with monitoring up to thirty (30) broadcast channels simultaneously. The human operator must ensure—for all broadcast channels—that the correct video, audio, subtitles, graphics, etc. are played out at the correct times.

For international broadcast channels, the complexity of channel monitoring is compounded. In particular, in these cases, channels are broadcast in many different languages. Accordingly, the human operator must additionally ensure that the correct language, of audio and/or subtitles, is played-out on each channel. Owing to the overwhelming task for a single operator to monitor a large number of media channels, it is therefore the case that many errors go undetected during live broadcast, or otherwise, are detected too late.

SUMMARY OF VARIOUS EMBODIMENTS

The various embodiments described herein generally relate to systems and methods for content aware monitoring of media channel output by a media system.

In accordance with a broad aspect of the teachings herein, there is provided a method for content aware monitoring of an output of a media channel by a media system, the method comprising: receiving a media assertion schedule, the media assertion schedule comprising a schedule of assertion checks, the assertion checks allowing validation that the output of the media channel, by the media system, is synchronized with an expected media channel output, wherein each assertion check comprises an assertion condition and at least one timecode, the at least one time code corresponding to a time instance or time range for validating the respective assertion condition; receiving, from a signature generating module communicatively coupled to the media system, at least one observed signature file, wherein each of the at least one received observed signature file comprises an observed media frame signature and timestamp data, wherein each observed media frame signature corresponds to a processed version of at least a portion of a media frame output by the media system on the media channel, and the timestamp data indicates an output time of that media frame by the media system; determining that the timestamp data, in each of the at least one received observed signature file, aligns with at least one timecode included in an assertion check in the media assertion schedule; in response to the determination, identifying an assertion condition included in the assertion check; validating the assertion condition using the observed media frame signatures included in each of the at least one received observed signature file; and if the assertion condition is validated, generating an output indicating that the media channel output, by the media system, is synchronized with the expected media channel output, otherwise if the assertion condition is not validated, generating the output indicating that the media channel output by the media system is not synchronized with the expected channel output.

In at least one embodiment, prior to receiving the observed signature file, the method further comprises: analyzing one or more media streams expected for output by the media system on the media channel, wherein each of the one or more media streams comprises a plurality of media frames; and generating, based on the one or more media streams, one or more expected media frame signatures, each of the one or more expected media frame signatures corresponding to a processed version of at least a portion of a media frame of a corresponding media stream of the one or more media streams.

In at least one embodiment, the assertion check comprises a content match assertion check, the content match assertion check including: (i) a timecode range corresponding to a time range for validating the assertion check, and (ii) at least one expected media frame signature corresponding to at least one media frame that is expected to be output by the media system within the timecode range.

In at least one embodiment, the method further comprises validating the assertion condition in the content match assertion check by: calculating a similarity metric between each observed media frame signature included in the at least one received observed signature file and a corresponding at least one expected media frame signature included in the assertion check; and determining that each calculated similarity metric is above a pre-determined threshold.

In at least one embodiment, (i) each observed media frame signature, in the at least one received observed signature file, corresponds to a hashed version of at least a portion of a video frame that is output by the media system on the media channel, and (ii) each at least one expected media frame signature included in the content match assertion check also corresponds to a hashed version of at least a portion of a video frame that is expected to be output by the media system within the timecode range.

In at least one embodiment, (i) each observed media frame signature, included in the received at least one observed signature file, corresponds to one or more zero crossing values of an audio frame that is output by the media system on the media channel, and (ii) each at least one expected media frame signature included in the content match assertion check also corresponds to one or more zero crossing values of an audio frame that is expected to be output by the media system within the timecode range.

In at least one embodiment, the method further comprises validating a content match assertion check further comprises using a state machine model, and the method further comprises: assigning the content match assertion check an initial inactive state; determining, (i) a timecode range for the content match assertion check, and (ii) a minimum number of observed signatures required to validate the assertion check, wherein the minimum number of observed signatures equals the number of expected signatures included in the content match assertion check; receiving, from the signature generating module, a first observed signature file including a first timestamp; determining that the first timestamp is within the timecode range; in response to the determination, varying the state of the content match assertion check to an active state and buffering the first observed signature file in a set of most recently received observed signatures; receiving, from the signature generating module, further observed signature files, wherein for each further received observed signature file: determining (i) whether a timestamp of the further received observed signature file is within the timecode range, and (ii) whether the set of most recently received observed signatures includes the minimum number of observed signatures; in response to determining that the timestamp is outside of the timecode range and the minimum number of observed signatures has not been received, varying the state of the content match assertion check to a retired ambiguous state; in response to determining that the timestamp is within the timecode range and the minimum number of observed signatures has not been received, buffering the received observed signature file in the set of most recently received observed signatures and maintaining the content match assertion check in an active state; in response to determining that the timestamp is within the timecode range and the set of most recently received observed signatures includes the minimum number of observed signatures, varying the state of the content match assertion check to a validating state and validating the content match assertion check using the observed signature files in the buffered set, and wherein the method further comprises: in response to validating the content match assertion check, varying the content match assertion check to a successfully validated state; and in response to failing to validate the content match assertion check, dropping the earliest received observed signature from the set of most recently received observed signatures, and monitoring to receive further observed signature files, and wherein if the content match assertion check is in a validating state, and the minimum number of observed signatures has been received, and the timestamp of the further received observed signature file is not within the timecode range, then varying the state of the content match assertion check to a retired failed state.

In at least one embodiment, the assertion check comprises a frozen frame assertion check and a timecode range corresponding to a time range for validating the assertion check, and the method further comprises: receiving, from the signature generating module, a plurality of observed signature files, each of the plurality of observed signature files having timestamp data within the timecode range, the plurality of observed signature files corresponding to consecutive video frames output by the media system on the media channel; and validating the assertion condition in the frozen frame assertion check by: calculating a similarity metric between the observed media frame signatures corresponding to consecutive video frames; and determining that each calculated similarity metric is below a pre-determined threshold.

In at least one embodiment, the method further comprises initially generating the media assertion schedule by: analyzing at least one of: (i) the one or more expected media frame signatures generated based on the one or more media streams, (ii) a media program schedule comprising a scheduled output of the one or more media streams on the media system, or (iii) metadata associated with the one or more media streams; based on the analysis, determining one or more time intervals, in the one or more media streams, where the at least one media assertion rule is satisfied; and if a media assertion rule is satisfied, generating an assertion check including a timecode range corresponding to the one or more time intervals.

In at least one embodiment, the method further comprises identifying, in the media program schedule, the presence of scheduled graphic overlay data; analyzing metadata associated with the graphic overlay data to determine one or more of size and placement of the graphic overlay data over a video frame; in response to the analyzing, identifying one or more video frame portions, in the video frame, that do not include the graphic overlay data; and generating a content match assertion check that includes expected signatures for the one or more video frame portions.

In accordance with a broad aspect of the teachings herein, there is provided a system for content aware monitoring of an output of a media channel by a media system, the system comprising: a signature generating module communicatively coupled to the media system, wherein the signature generating module is operable to generate at least one observed signature file, wherein each of the at least one observed signature file comprises an observed media frame signature and timestamp data, wherein the observed media frame signature corresponds to a processed version of at least a portion of a media frame being output by the media system on the media channel, and the timestamp data indicates an output time of that media frame by the media system; and a server processor configured to: receive a media assertion schedule, the media assertion schedule comprising a schedule of assertion checks for validating that the output on the media channel by the media system is synchronized with an expected media channel output, wherein each assertion check comprises an assertion condition and at least one timecode, the at least one timecode corresponding to a time instance or time range for validating the assertion condition; receive, from a signature generating module, the at least one observed signature file; determine that the timestamp data, in each of the at least one received observed signature file, aligns with at least one timecode in an assertion check in the media assertion schedule; in response to the determination, identify an assertion condition included in the assertion check; validate the assertion condition in the assertion check using the observed media frame signatures included in each of the at least one received observed signature file; and if the assertion condition is validated, generate an output indicating that the media channel output by the media system is synchronized with the expected channel output, otherwise generate an output indicating that the media channel output by the media system is not synchronized with the expected channel output.

In at least one embodiment, prior to receiving the observed signature file, the server processor is further configured to: analyze one or more media streams expected for output by the media system on the media channel, wherein each of the one or more media streams comprises a plurality of media frames; and generate, based on the one or more media streams, one or more expected media frame signatures, each of the one or more expected media frame signatures corresponding to a processed version of at least a portion of a media frame of a corresponding media stream of the one or more media streams.

In at least one embodiment, the assertion check comprises a content match assertion check, the content match assertion check including, (i) a timecode range corresponding to a time range for validating the assertion check, and (ii) at least one expected media frame signature corresponding to at least one media frame that is expected to be output by the media system within the timecode range.

In at least one embodiment, the assertion condition in the content match assertion check, the server processor is further configured to: calculate a similarity metric between each observed media frame signature included in the at least one received observed signature file and a corresponding at least one expected media frame signature included in the assertion check; and determine that each calculated similarity metric is above a pre-determined threshold.

In at least one embodiment, (i) each observed media frame signature, included in the at least one received observed signature file, corresponds to a hashed version of at least a portion of a video frame that is output by the media system on the media channel, and (ii) each at least one expected media frame signature included in the content match assertion check also corresponds to a hashed version of at least a portion of a video frame that is expected to be output by the media system within the timecode range.

In at least one embodiment, (i) each observed media frame signature, included in the received at least one observed signature file, corresponds to one or more zero crossing values of an audio frame that is output by the media system on the media channel, and (ii) each at least one expected media frame signature included in the content match assertion check also corresponds to one or more zero crossing values of an audio frame that is expected to be output by the media system within the timecode range.

In at least one embodiment, validating a content match assertion check further comprises using a state machine model, and the server processor is further configured to: assign the content match assertion check an initial inactive state; determine (i) a timecode range for the content match assertion check, and (ii) a minimum number of observed signatures required to validate the assertion check, wherein the minimum number of observed signatures equals the number of expected signatures included in the content match assertion check; receive, from the signature generating module, a first observed signature file including a first timestamp; determine that the first timestamp is within the timecode range; in response to the determination, vary the state of the content match assertion check to an active state and buffering the first observed signature file in a set of most recently received observed signatures; receive, from the signature generating module, further observed signature files, wherein for each further received observed signature file: determine (i) whether a timestamp of the further received observed signature file is within the timecode range, and (ii) whether the set of most recently received observed signatures includes the minimum number of observed signatures; in response to determining that the timestamp is outside of the timecode range and the minimum number of observed signatures has not been received, vary the state of the content match assertion check to a retired ambiguous state; in response to determining that the timestamp is within the timecode range and the minimum number of observed signatures has not been received, buffer the received observed signature file in the set of most recently received observed signatures and maintaining the content match assertion check in an active state; in response to determining that the timestamp is within the timecode range and the set of most recently received observed signatures includes the minimum number of observed signatures, vary the state of the content match assertion check to a validating state and validating the content match assertion check using the observed signature files in the buffered set, and wherein the method further comprises: in response to validating the content match assertion check, vary the content match assertion check to a successfully validated state; and in response to failing to validate the content match assertion check, drop the earliest received observed signature from the set of most recently received observed signatures, and monitoring to receive further observed signature files, and wherein if the content match assertion check is in a validating state, and the minimum number of observed signatures has been received, and the timestamp of the further received observed signature file is not within the timecode range, then vary the state of the content match assertion check to a retired failed state.

In at least one embodiment, the assertion check comprises a frozen frame assertion check and a timecode range corresponding to a time range for validating the assertion check, and the server processor is further configured to: receive, from the signature generating module, a plurality of observed signature files, each of the plurality of observed signature files having timestamp data within the timecode range, the plurality of observed signature files corresponding to consecutive video frames output by the media system on the media channel; and validate the assertion condition in the frozen frame assertion check by: calculating a similarity metric between the observed media frame signatures corresponding to consecutive video frames; and determine that each calculated similarity metric is below a pre-determined threshold.

In at least one embodiment, the server processor is further configured to initially generate the media assertion schedule by: analyzing at least one of: (i) the one or more expected media frame signatures generated based on the one or more media streams, (ii) a media program schedule comprising a scheduled output of the one or more media streams on the media system, or (iii) metadata associated with the one or more media streams; based on the analysis, determining one or more time intervals, in the one or more media streams, where the at least one media assertion rule is satisfied; and if a media assertion rule is satisfied, generating an assertion check including a timecode range corresponding to the one or more time intervals.

In at least one embodiment, the server processor is further configured to: identify in the media program schedule the presence of scheduled graphic overlay data; analyze metadata associated with the graphic overlay data to determine one or more of size and placement of the graphic overlay data over a video frame; in response to the analyzing, identify one or more video frame portions, in the video frame, that do not include the graphic overlay data; and generate a content match assertion check that includes expected signatures for the one or more video frame portions.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

Other aspects and features will become apparent to those ordinarily skilled in the art, upon review of the following description of some exemplary embodiments.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope to the teachings described herein.

FIG. 1B is a simplified block diagram of an example server;

FIG. 1C is a simplified block diagram of an example media system;

FIG. 6A is an illustration of an example video frame divided into one or more video frame portions, according to some embodiments;

FIG. 6B is an illustration of an example video frame divided into one or more video frame portions, according to some other embodiments;

FIG. 6C is an illustration of an example video frame divided into one or more video frame portions, according to still some other embodiments;

FIG. 6D is an illustration of an example video frame divided into one or more video frame portions, according to still yet some other embodiments;

FIG. 8B shows an example content match assertion check, according to some embodiments;

FIG. 8C shows an example content match assertion check, according to some other embodiments;

FIG. 8D shows an example frozen media frame assertion check, according to some embodiments;

FIG. 8E is an illustration showing validation of a content match assertion check by comparing observed and expected media frame signatures;

FIG. 8F is an illustration showing validation of a frozen media frame assertion check by comparing consecutive observed media frame signatures;

FIG. 9B is an example method for generating video assertion checks in a media assertion schedule, according to some embodiments;

FIG. 9C is an example method for generating video assertion checks in a media assertion schedule, according to some other embodiments;

FIG. 9D is an example method for generating audio assertion checks in a media assertion schedule, according to some embodiments;

FIG. 9E is an example method for generating auxiliary data assertion checks in a media assertion schedule, according to some embodiments;

Figure 1A:
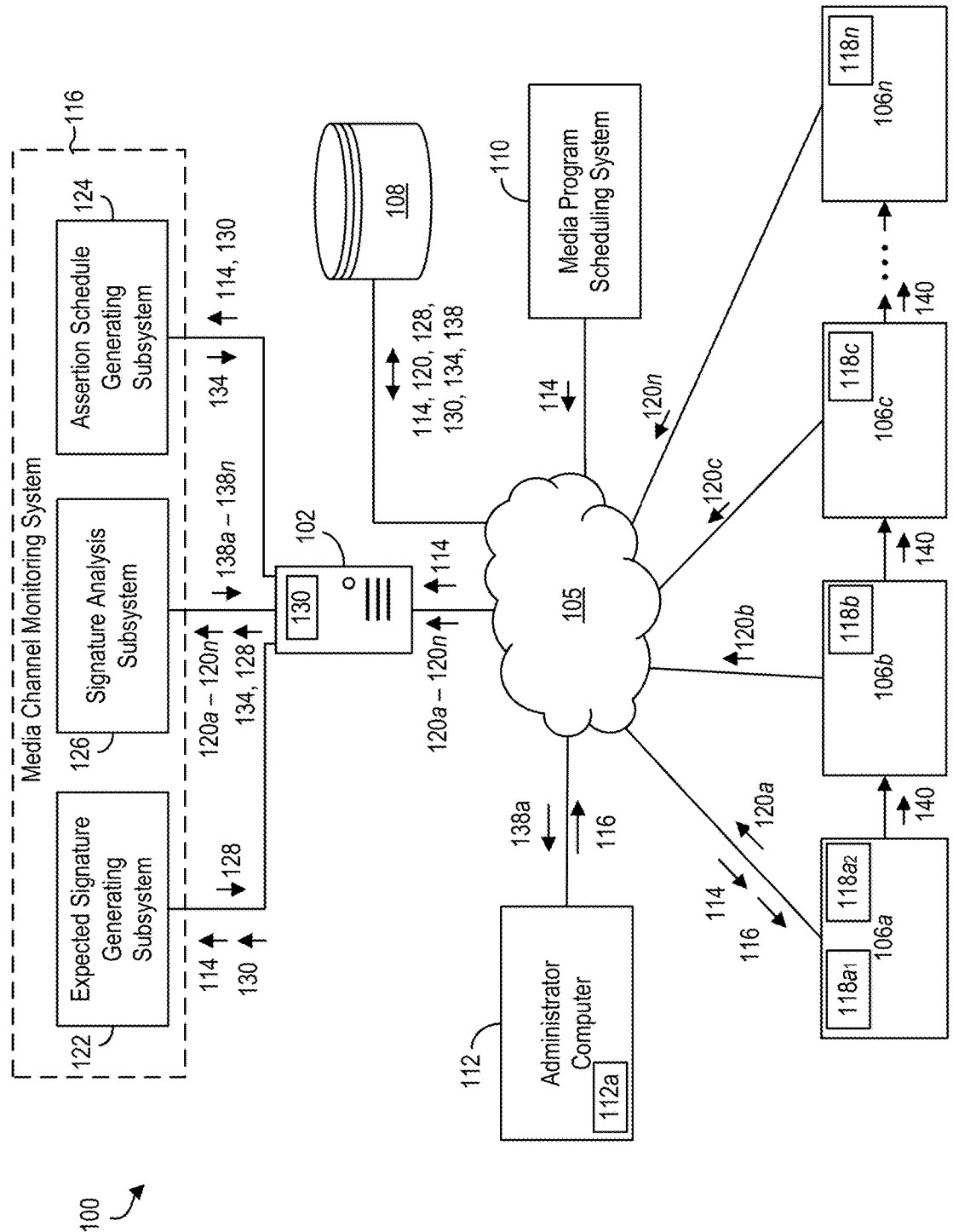
FIG. 1A is a simplified block diagram of an example system for content aware monitoring of media stream output in one or more media channels.

The drawings, described below, are provided for the purposes of illustration only of, and without limiting, the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DETAILED DESCRIPTION OF THE EMBODIMENTS

As stated in the background, conventional methods for monitoring media channel outputs rely on human operators positioned in broadcast control rooms. These operators are tasked with visually monitoring—in real-time or near real-time—large multi-viewer monitors that display outputs for many media broadcast channels. For each channel, the operators must ensure that the actual channel output is synchronized with the expected channel output.

As explained previously, the use of human operators can result in many broadcast errors being undetected, or otherwise being detected too late. This is because human operators are often unable to simultaneously monitor a multiplicity of channel outputs. To add to the complexity of the monitoring, operators are expected to monitor each channel to ensure that the correct audio language—as well as subtitles and close caption language—are being output. This may be especially challenging for stations broadcasting multi-lingual or international content.

In view of the foregoing, there is a need for automated methods and systems for monitoring media stream outputs on broadcast channels. Such systems and methods may enable automated monitoring of media channel output—in real-time or near real-time—to ensure that the actual channel output is relatively synchronized with the expected channel output. Further, such systems and methods may also enable automated detection of broadcast output errors, including detecting when media streams are frozen during broadcast playout.

Prior attempts at similar systems and methods suffer from significant drawbacks. One example prior solution is the use of exception-based monitoring techniques. Exception-based monitoring techniques scan the channel output to detect outlier features. For example, the outlier features can include a sequence of consecutive black video frames. Consecutive black video frames can indicate a missing video. Outlier features can also include a prolonged period of muted audio, which can indicate a malfunctioned audio output. Accordingly, exception-based monitoring detects the presence and/or absence of certain outlier features to flag errors between expected and actual output.

However, such systems have a number of disadvantages. For example, many perceived "outlier features" may not in-fact be alert worthy. For instance, a sequence of black video frames may not always indicate missing video. Rather, a sequence of black video frames may be inserted as part of a long artistic transition in the video sequence. Similarly, muted audio portions can be intentionally inserted, such as in a silent movie portion. Accordingly, without contextual awareness, exception-based systems generate false positive alerts for many non-alert worthy features. This, in turn, compromises the integrity and trustworthiness of the system to the user operator.

An additional problem with exception-based systems is their inability to detect whether the actual output, on a media channel, is synchronized with the expected output.

For example, the expected output can be defined by a channel's program guide schedule. In particular, exception-based systems only flag pre-defined outlier features. These systems are not "content aware"- or otherwise, are unaware of the actual content being output on a media channel at any given time. Accordingly, exception-based systems are unable to detect whether the correct video program is on-air, such as the correct portion of a television show. Exception-based systems are also unable to detect whether the correct audio is on-air, such as the correct audio language, or dialogue scene. Exception-based systems therefore find little practical application in channel output monitoring.

Over the years, a number of alternative solutions have been proposed to mitigate the lack of content awareness in exception-based systems. Once such solution is comparison-based monitoring. In comparison-based monitoring, the system is not directly detecting outlier features, but rather, is contrasting two identical (e.g., mirroring) live media streams against each other. For example, this can include contrasting identical video, audio or auxiliary data streams. For instance, one of the live streams can be on-air, while the other identical live stream is played-out in the back-end. In particular, the system flags an error when the two live streams are not identical. By way of example, if two live video streams are compared against each other, the system flags an error if black frames exist in one live stream, but are absent in the other stream. This difference may indicate a failure in one of the streams. However, if black frames are detected in both streams, then no error flag is generated.

Accordingly, comparison-based monitoring offers marginal improvements over exception-based monitoring. For example, comparison-based monitoring does not generate false alerts merely because a sequence of black frames was detected. Rather, an alert is only generated if the black frames exist in one stream, but not the other. This avoids generating false alerts where black frames exist as part of an artistic sequence. The same principle applies to detecting muted audio.

Nevertheless, despite the marginal improvements offered by comparison-based monitoring, these systems still suffer from disadvantages. For example, comparison-based monitoring assumes at least one of the live streams is playing-out the correct content. For example, the back-end live stream is assumed to always play-out the correct content. However, if both live streams are playing-out incorrect content, the system is unable to generate an error flag. That is, the capability of comparison-based monitoring is limited to only detecting synchronization of two live streams, but does not extend to detecting that the live streams are in-fact playing correct (or scheduled) content. Comparison-based systems are therefore unable to determine whether the correct content (e.g., video, audio, subtitles or closed captions) is being output at the correct time instances.

I. General System Overview

Reference is now made to FIG. 1A, which shows a simplified block diagram of an example system 100 for content aware monitoring of media stream output in one or more media channels.

The system 100 generally includes a server 102 connected, via network 105, to one or more media systems 106a-106n and a memory database 108. Server 102 may also connect to one, or both, of a media program scheduling system 110, and an administrator computer 112.

Media systems 106a-106n are any systems operable to output media streams. The media streams can be associated with one or more media channels. For example, the media streams, being output by the media systems 106, can include one or more of audio, video and auxiliary data streams.

Examples of output video and audio streams can include television program content with synchronized video and audio. Examples of output auxiliary data streams can include logos, graphic objects, subtitles, audio cue tones, closed captions, embedded triggers (e.g., SCTE-104 embedded triggers) and/or various other bugs which may overlay the video and/or audio streams. In some example cases, the media streams can correspond to radio content. In these cases, the media stream may comprise only audio streams, as well auxiliary audio data streams, but otherwise no video streams.

Each media stream, output by a media system 106, can include one or more media frames. For example, a video stream may comprise a plurality of video (or image) frames. The video frames can be output at a pre-determined frame rate per second. Similarly, each audio stream may comprise a plurality of audio frames. As used herein, an "audio frame" may comprise a portion of audio having a duration, or length, synchronized with a corresponding single video frame.

In some examples, an audio stream may be sampled at a higher rate than an associated video's FRPS (frame rate per second). For example, the audio may be sampled at 44,100 or 48,000 samples per second, while the video frame rate may be only sampled at 25 or 29.97 frames per second. In these cases, an "audio frame", synchronizing with only a single video frame, may in-fact comprise a plurality of audio stream samples.

Figure 2A:
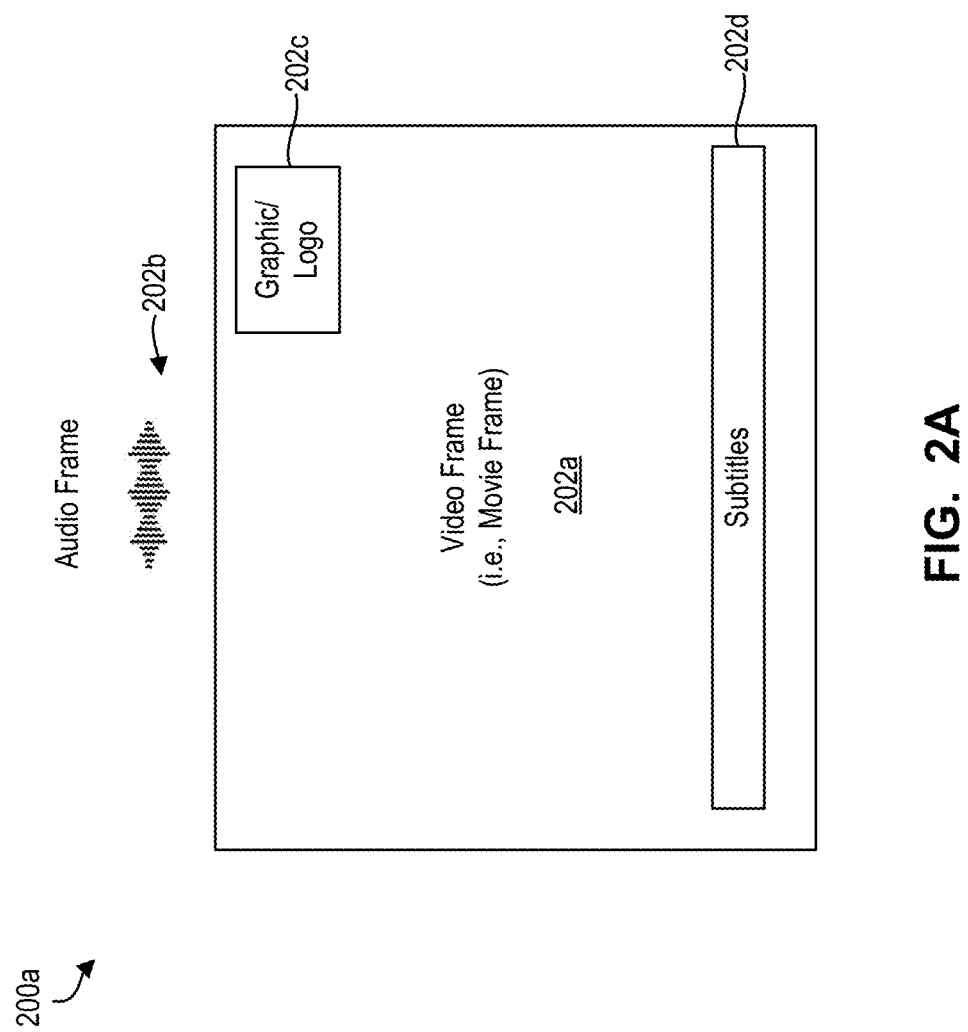
FIG. 2A is a schematic illustration showing example embodiments of one or more media frames.

FIG. 2A shows example synchronized media frames 200a. The synchronized media frames include a synchronized "video frame" 202a and a corresponding "audio frame" 202b output in association with that video frame. Similarly, media frames 200a may include auxiliary data frames synchronized with the video frame (e.g., graphics or logos 202c, or subtitles 202d).

Continuing with reference to FIG. 1A, each media system 106 can comprise one or more computing devices. Each computing device can "output" media streams associated with different media channels. "Outputting" a media stream may vary based on the type of media system 106.

By way of example, a media system 106 may comprise a media broadcast station. In this example, the media system 106 may "output" a media channel stream by broadcasting the media stream. The media stream can be broadcast to other downstream systems and/or devices (e.g., over-the-air broadcasting, or IP network streaming).

A media system 106 may also include end-user devices (e.g., laptops, smartphones, television sets, etc.). An end-user device can receive media streams from upstream systems and/or devices. For example, an end-user device can receive media streams from an upstream broadcasting station. In this example, the end-user device may "output" a received media stream by displaying the media stream on a device display (e.g., LCD screen). Media systems 106 can also, more generally, include any devices operable to receive media streams from upstream systems.

Some media systems 106 may both broadcast and display media streams. That is, some media system 106 can perform both functions, rather than only one or the other. Accordingly, such systems are configured for multiple types of outputs.

At least some media systems 106 may also perform media stream processing. That is, the media systems may "process" media streams, during or before media streams output. For example, these systems may apply one or more audio or video adjustment operations (e.g., audio or video signal equalization), as well as synchronization operations (e.g., synchronizing multiple associated media streams (e.g., video, audio, and auxiliary data streams)).

As shown in FIG. 1A, the media systems 106 may be communicatively coupled. For example, some upstream media systems 106 may communicate with other downstream media systems 106. For example, the media system 106a may communicate with the media system 106b, and the media system 106b may communicate with the media system 106c, and so on.

In at least one example application, system 100 may be part of a media broadcast distribution system. In this example, the media system 106a can be associated with a large broadcast station (e.g., an international broadcast station). Further, the media systems 106b and 106c may be associated with smaller downstream regional or local broadcast stations, respectively. The large broadcast station 106a may broadcast media channel streams 140 to one or more of the regional broadcast stations 106b. For example, the large broadcast station 106a may broadcast certain media channel streams to specific regional broadcast stations 106b. In turn, each regional broadcast station 106b may receive the media channel streams 140, and may further broadcast the media channel streams 140 to one or more local broadcast stations 106c. The local broadcast station 106c may then, in turn, broadcast the media channel streams 140 to one or more end-user devices 106n.

In other cases, rather than providing a plurality of downstream regional or local broadcast stations, a single station (e.g., media system) may be responsible for generating a multitude of regional or local broadcasts (e.g., hundreds of regional or localized broadcast streams).

Media channel streams, output by media systems 106, may be output in accordance with a "media program schedule". A media program schedule is a schedule that includes the ordered output times for different media streams, on a given media channel.

Figure 2B:
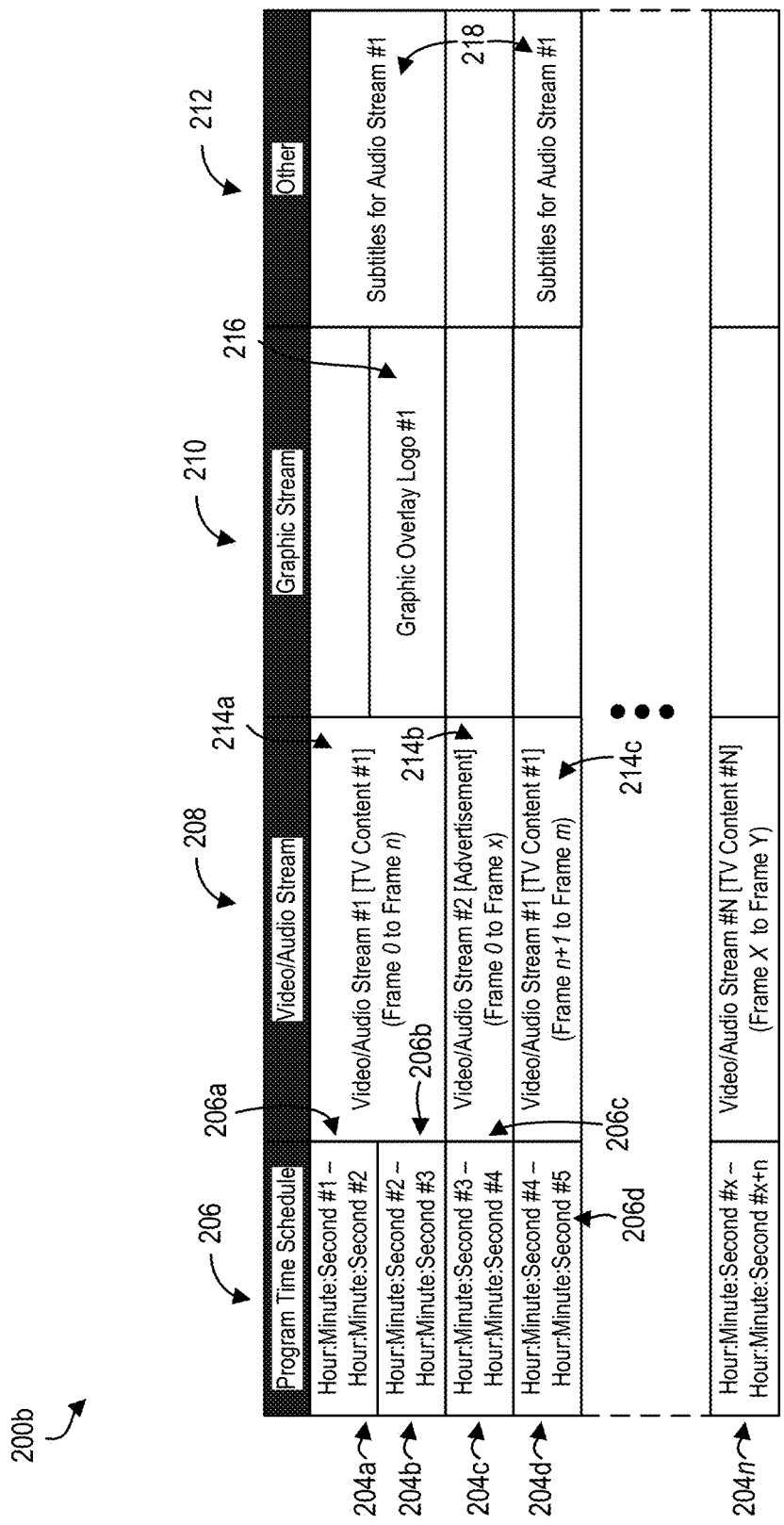
FIG. 2B is an example media program schedule.

Reference is now briefly made to FIG. 2B, which shows an example media program schedule 200b.

As shown, the media program schedule 200b can include one or more media program entries 204a-204n. Each media program entry 204 can include, for example: (i) an output schedule timeslot 206, as well as (ii) one or more media streams 208-212 for output during that scheduled timeslot.

In more detail, timeslots 206 can include scheduled times, or time ranges, for outputting media streams. In this example, each timeslot 206a-206n can include a time range expressed by units of "Hours (hh):Minutes (mm):Seconds (ss)" (and optionally frames (ff)). For instance, the first timeslot 206a may correspond to a time range between "Hours:Minutes:Seconds #1" to "Hours:Minutes:Seconds #2". Further, the second time slot 206b may correspond to a next time range of "Hours:Minutes:Seconds #2" to "Hours:Minutes:Seconds #3".

Each timeslot 206 can be associated with one or more media streams. These media streams are scheduled for output, during that timeslot, by a media system 106. For example, at timeslots 206a and 206b—a corresponding video and audio stream #1 214a may be synchronously output. The video and audio streams may be associated with TV content. Further, at timeslot 204b, a graphic logo content 216 is also scheduled to be output. The graphic logo content 212 may, for example, the video stream. Other streams 212 may also be synchronously output at timeslots 204a-204b and 204d. Other streams 212 may include, for example, embedded triggers. As used herein, graphic streams 210 (e.g., graphic overlays), as well as other "other" scheduled data 212, may be collectively referred to herein as "auxiliary data", or "auxiliary data streams". In some examples, multiple auxiliary data streams may be output in a given time slot (e.g., subtitles and graphics).

In at least one example, each media stream scheduled for output—in program schedule 200b—may be referenced by a corresponding unique media stream identifier. For example, this can include unique video and audio stream identifiers 214a-214c, graphic stream identifier 216, subtitle identifier 218 etc.

The unique identifiers can be defined in various ways. For example, synchronized video and audio streams may share a common media stream identifier 214. In other cases, a video stream may be synchronized with different audio stream languages or tracks. Accordingly, each pair of video and audio track/language may have a unique identifier.

In still other examples, a single stream identifier is used for all related video and audio track/language pairings. In these cases, a separate identifier is provided, in the program schedule, for selecting an audio track or language pairing. In other cases, separate media stream identifiers are provided for each of the scheduled video stream and each scheduled audio stream.

Each media stream identifier 214, 216, 218 may also include an indication of the media stream frames that are expected to be output during that timeslot 206. In other examples, this information is implicitly determined based on the time slot scheduling information (e.g., expressed in the format of Hours (hh):Minutes (mm); Seconds (ss): frames (ff)).

As explained herein, when a media system 106 receives the media program schedule 200b (or a copy thereof), it may extract and use the media stream identifiers to retrieve the appropriate video, audio of auxiliary data streams (or copies thereof), e.g., from memory.

For example, in FIG. 1A, a media system 106 may use the media stream identifiers to retrieve the media streams from the memory database 108. For instance, the memory database 108 may pre-store various media streams included in the program schedule 200b. The media streams stored in memory database 108 may be pre-sorted and classified using the media stream identifiers to allow for quick retrieval.

In an example application where system 100 of FIG. 1A is part of a broadcast distribution system—the first media system 106a in the "pipeline" is responsible for receiving the media program schedule 114, for a given media channel. Further, this media system 106a is also responsible for retrieving the appropriate media streams from the memory database 108. At the appropriate scheduled timeslots, the media system 106a may then broadcast the retrieved media streams to downstream media systems 106. In some cases, downstream media systems 106b, 106c (e.g., regional or local broadcast stations) may supplement the media program schedule 114 with further regional or local media content.

While media program schedule 200b, in FIG. 2B, is shown by way example, other types and/or formats of program schedules 200b may also be used.

Referring now back to FIG. 1A, an important task of the system 100 is ensuring that, for each media system 106—the actual media stream output is synchronized with the expected media stream output. In other words, ensuring that each media system 106 is outputting the expected media channel streams, at the correct scheduled times (e.g., in accordance with a corresponding media program schedule 114).

To facilitate this process, the system 100 can further include: (i) a media channel monitoring system 116, as well as (ii) one or more signature generating modules 118a-118n (also referred to herein as "signature generating probing modules", "probing modules", or "probes").

Each signature generating module 118, or probing module 118, is communicatively coupled to at least one corresponding media system 106. The communicative coupling may comprise, for example, being integrally embedded in a media system 106, or otherwise, being partially or fully in external communication with a media system 106. Each probing module 118 is operable to monitor output of media channel streams, on the corresponding media system 106.

As explained herein, each probing module 118 may generate an output data stream 120a-120n. The output data stream 120 is a "processed version" of media frames output by a corresponding media system 106, monitored by that probing module 118. The processed versions, of output media frames, may be referred to herein as "observed media frame signatures" 120, or simply, "observed media signatures" and/or "observed signatures".

As shown in the system 100, the observed signatures 120—generated by each probing modules 118—can be transmitted to the media channel monitoring system 116 (e.g., via a network 105). As provided in greater detail herein, the media channel monitoring system 116 can, in turn, analyze the observed media frame signatures to determine whether the actual media channel output, from a media system 106 (e.g., as expressed by the received observed signatures), is generally synchronized with the "expected" media channel output (e.g., based on a corresponding media program schedule). Media channel monitoring system 116 may also analyze observed signatures to determine other media channel output errors, including issues with the media output being "frozen".

In some examples, media channel monitoring system 116 may be hosted on a server 102. That is, while the server 102 and the media channel monitoring system 116 are shown separately for ease of description—the media channel monitoring system 116 may in fact be stored on a server memory as computer-executable instructions that may be executable by a server processor. The server 102 may, in turn, connect to the network 105 to receive or transmit data to and from the various subsystems which comprise the media channel monitoring system 116. In at least some embodiments, the server 102 may be a virtual or "cloud" server, rather than a physical server. Further, as with all components of the system 100, more than one server 102 may be present in the system 100.

In more detail, media channel monitoring system 116 may include a number of subsystems, including: (i) an expected signature generating subsystem 122, (ii) an assertion schedule generating subsystem 124, and/or (iii) a signature analysis subsystem 126.

Expected signature generating subsystem 122 is a subsystem that is operable to generate "processed versions" of media stream frames expected to be output on a media channel at given time instances (e.g., according to the channels' media program schedule). The processed versions of these media frames may be referred to herein as "expected media frame signatures", or simply, "expected signatures". For greater clarity, this is contrasted to the function of probing modules 118—which generate processed version of media frames that are actually output by media systems 106 (i.e., the observed media frame signatures, or observed signatures).

As explained next, in some example cases, a comparison is performed between the expected signatures—generated by the subsystem 122—and the observed signatures, received from the probing modules 118. This comparison allows determining whether a media system 106 is outputting the correct media stream content, at the correct time. For example, if the expected and observed signatures are substantially similar, then the media system 106 is operating correctly. The comparison can be performed by the signature analysis subsystem 126.

Assertion schedule generating subsystem 124 is configured to generate a timed schedule of logical assertions (or conditions) requiring validation to ensure correct output of media channel streams, on a media system 106. These assertions are validated using a combination of observed and expected signatures. The assertion schedule may be referred to herein as a "media assertion schedule" 134.

The assertion schedules, generated by subsystem 124, are explained in greater detail herein. However, at a high level, each assertion schedule can include various types of assertions. Some example types of assertions include "content match assertions", "frozen media frame assertions" and "silent (muted) audio assertions".

Content match assertions validate, at pre-defined time instances (or time intervals), that the actual media channel output, from a media system 106, is synchronized with the excepted media channel output (e.g., in accordance with a media channel's programming schedule). As stated previously, this may be performed, for example, by comparing observed media frame signatures, received from one or more probing modules 118, to corresponding expected media frame signatures (e.g., generated by the expected signature generating subsystem 122).

In contrast, frozen media frame assertions may validate that media frames (e.g., video frames), being output by a media system 106, are not "frozen". In various cases, these assertions can be validated by comparing multiple received observed signatures to ensure that those observed signatures are not substantially identical. Silent (e.g., muted) audio assertions may be used to validate that the audio output is not inadvertently muted or silent.

Significantly, in generating the assertion schedules, the time instances (or time intervals) for validating specific assertions may be selected in a content-sensitive, or content aware manner. That is, as compared to prior media channel output monitoring systems (e.g., exception-based systems), the current system does not monitor media channel output in a "content agnostic" manner. Rather, the current system may localize the monitoring having regard to the type of media channel streams being output at given time instances, as well as the actual content being output on each media channel stream. By using content aware monitoring, the overall monitoring efficacy and accuracy of the system in flagging output errors may be improved as compared to prior conventional systems.

Media channel monitoring system 116 also includes the signature analysis subsystem 126. The signature analysis subsystem 126 may validate assertion conditions located in an assertion schedule 134.

As shown, for each assertion in the assertion schedule, the media analysis subsystem 126 may generate an output 138 indicating either a successfully or unsuccessfully validated assertion. A successful validated assertion may indicate correct and/or expected output of media channel streams on a media system 106. In contrast, a failed or unsuccessfully validated assertion may indicate incorrect, or non-expected, output of media channel streams on a media system 106.

In at least some embodiments provided, the output of the signature analysis subsystem 126 may also indicate an ambiguous output. This may result where there is insufficient data to determine whether the assertion is successfully or unsuccessfully validated.

In at least some examples, the state of each assertion, in each assertion schedule, may also be expressed and monitored using a state machine model.

In some cases, the signature analysis subsystem 126 may generate separate outputs 134a-134n in respect of each monitored media channel on each media system 106a-106n. The output may indicate the specific assertion condition that was being validated, and the output state of that assertion (e.g., success, failure, ambiguous, etc.). By generating separate outputs, the system can trace back errors to the particular faulty media channel output on a given media system.

A. Other Features of the System

Continuing reference to FIG. 1A, the system 100 may also include an administrator computer 112 and the memory database 108, which may each also be coupled to the network 105.

Administrator computer 112 may be any computer that can be used to communicate with one or more of the media channel monitoring system 116 and/or the one or more media systems 106. The administrator computer 112 may allow, for example, a system operator to view and monitor the monitoring output of the media channel monitoring system 116.

For example, the administrator computer 112 may receive the output results 138 of the signature analysis subsystem 126 (e.g., output state of assertions). The output results can be displayed to the operator as, for example, an event notification (e.g., via a display interface 112a). In response to certain output results (e.g., failed or ambiguous validations), the administrator computer 112 may also transmit one or more control signals 116 to a relevant media system 106 associated with a poor output result.

The control signals 116 can be used to effect one or more remediating actions to that media system (e.g., debugging a malfunctioning system and/or auditing). For example, the control signals 116 may cause a particular media system 106 to output the correct or expected media streams, in association with a media channel, such as to re-synchronize the media system playout with a media program schedule. In some other embodiments, the control signals 116 may also be transmitted directly from the media channel monitoring system 116 to the corresponding media system 106.

Although not shown, as with most other components of the system 100, the administrator computer 112 may include one or more processors, a network interface and a storage memory. In some cases, the administrator computer 112 may also include a display interface 112a (e.g., an LCD screen).

Memory database 108 may include one or more computer servers, each comprising at least a processor, a network interface and a storage memory. In some cases, memory database 108 may be configured to provide a scalable distributed storage system (e.g., "cloud" storage) in which memory database 108 may comprise multiple nodes or computers connected via a network, such as network 106. For example, memory database 108 may be configured to provide a NoSQL database storage scheme. In some cases, memory database 108 may comprise one or more encoders for encoding or re-encoding media streams.

In at least some embodiments, the memory database 108 may store media streams for output by one or more of the media systems 106a-106n. In various cases, the media streams may be indexed inside the memory database 108 according to corresponding unique media stream identifiers. This may allow the media channel monitoring system 116 and/or the media systems 106 to retrieve media streams (or copies thereof) from the memory database 108 using a respective media stream's identifier.

In some cases, where the same video stream may be output with different audio languages/tracks, different video and audio language or track pairings may also be indexed in the memory database 108 according to the different possible audio language/track selections.

In various cases, the memory database 108 may also store metadata associated with the various video and audio streams (as well as other auxiliary data streams). The metadata may be embedded into the streams, or separately stored, and may in some cases be retrievable using the corresponding media stream's media stream identifier. The memory database 108 may also store various outputs generated by the various subsystems of the media channel monitoring system 116.

While shown separately from the server 102 for ease of description, in some embodiments, the memory database 108 may form part of the server 102. For example, the memory database 108 can comprise a memory portion of the server 102. In other cases, the memory database 108 may be a separate component that is directly connected to the server 102.

Network 105 may be any network capable of carrying data. In some embodiments, network 105 may be connected to the internet. Typically, the connection between network 105 and the Internet may be made via a firewall server (not shown). In some cases, there may be multiple links or firewalls, or both, between network 105 and the Internet. Some organizations may operate multiple networks 105 or virtual networks 105, which can be internetworked or isolated. These have been omitted for ease of illustration, however it will be understood that the teachings herein can be applied to such systems. Network 105 may be constructed from one or more computer network technologies, such as IEEE 802.3 (Ethernet), IEEE 802.11 and similar technologies. In some embodiments, network 105 may also include Ethernet, integrated services digital network (ISDN), digital subscriber line (DSL), coaxial cable, fiber optics, satellite, mobile, wireless (e.g., Wi-Fi, WiMAX), SS7 signaling network, fixed line, local area network and/or wide area networks.

B. Example Hardware/Software Architecture for Server

Reference is now made to FIG. 1B, which shows a simplified block diagram for an example embodiment of the server 102.

Server 102 may include a server processor 102a that is communicatively coupled to one or more of a server memory 102b and a server communication interface 102c.

Server processor 102a is a computer processor, such as a general purpose microprocessor. In some other cases, processor 102b may be a field programmable gate array, application specific integrated circuit, microcontroller, or other suitable computer processor. In at least one embodiment, the server 102 may include more than one processor (e.g., a multi-processor device), with each processor being configured to execute the same or different program instructions. In such embodiments, a single processor may perform all acts of a method (e.g., executing instructions, etc.) or multiple processors may be used for performing different (or overlapping) acts of the method in any manner, order or arrangement.

Server processor 102a is coupled, via a computer data bus, to server memory 102b. Server memory 102b may include both volatile and non-volatile memory. Non-volatile memory stores computer programs consisting of computer-executable instructions, which may be loaded into volatile memory for execution by server processor 102a as needed. It will be understood by those of skill in the art that references herein to the server 102 as carrying out a function or acting in a particular way imply that server processor 102a is executing instructions (e.g., a software program) stored in the server memory 102b and possibly transmitting or receiving inputs and outputs via one or more interface. Server memory 102b may also store data input to, or output from, server processor 102a in the course of executing the computer-executable instructions.

As noted previously, server memory 102b may store one or more of the subsystems 122-126 which comprise the media channel monitoring system 116. In various cases, the server memory 102b may also store a control program 130 which can manage and control the flow of data between each of the subsystems 122-124, as well as the operation of each one of these subsystems.

Communication interface 102c is one or more data network interface, such as an IEEE 802.3 or IEEE 802.11 interface, for communication over a network, such as network 104.

In some cases, the server processor 102a may also couple to a server input/output (I/O) interface, which may be used to couple other external devices or systems to the server processor 102a.

C. Example Hardware/Software Architecture for Media Systems

Reference is now made to FIG. 1C, which shows a simplified block diagram for an example embodiment of a media system 106.

As shown, similar to the server 102, the media system 106 may also include one or more media system processors 142 coupled, via a data bus, to a media system memory 144, as well as one or more of a media system communication interface 146, a media system input/output (I/O) interface 148 and/or a media system display 150. The processor 142, memory 144 and communication interface 146 may be analogous to the server processor 102a, memory 102b and communication interface 102c.

In some embodiments, the media system memory 144 may store one or more probing modules 118. For example, as explained herein, the probing modules 118 may comprise computer executable instructions that are operable to be executed by the media system processor 142.

The media system display 150 may include any type of device for displaying data outputs, as well as media stream outputs (e.g., an LCD screen).

In some cases, the media system 106 may also include an input interface (not shown), such a mouse and keyboard, etc., for receiving user inputs. In some cases, the display 150 may itself act as an input interface, as is the case with touchscreen displays.

D. Example Method for Monitoring of Media Stream Output

Figure 3:
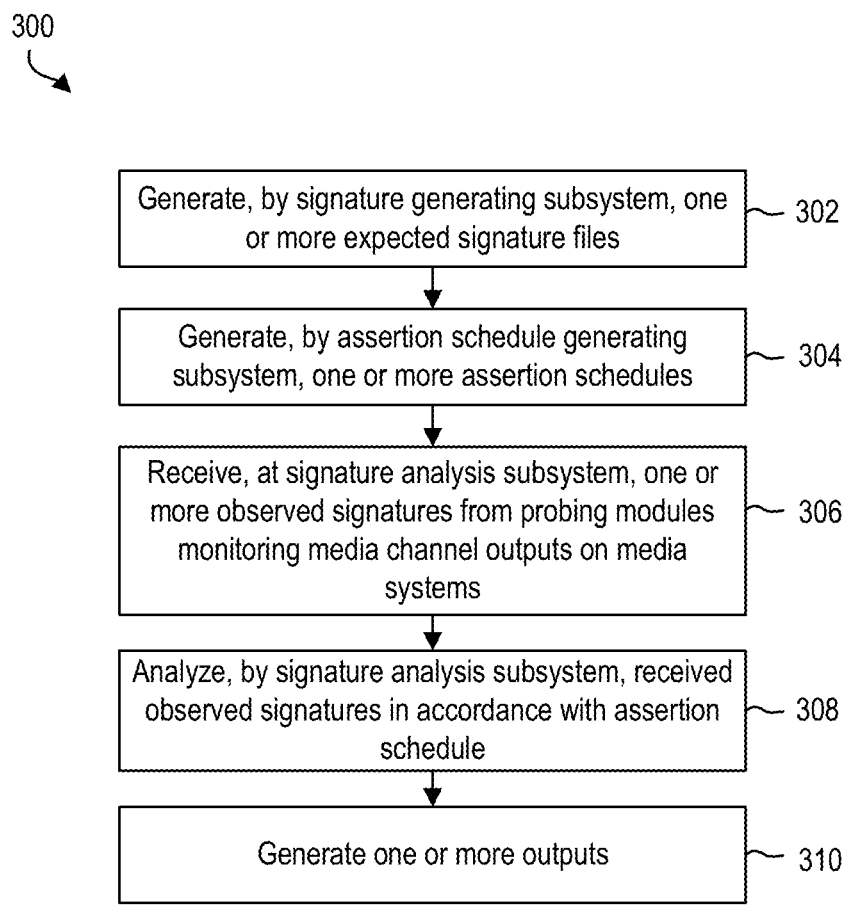
FIG. 3 is an example method for content aware monitoring of media stream output in one or more media channels.

Reference is now made to FIG. 3, which shows an example embodiment of a method 300 for content aware monitoring of media stream output in one or more media channels. Method 300 provides a general overview of the operation of the system 100, which is discussed in greater detail herein. Method 300 may be performed, for example, by the server processor 102*a*.

As shown, at 302, the expected signature generating subsystem 122 may generate one or more expected media frame signatures 128. To this end, the subsystem 122 can generate the expected signatures using various techniques.

For instance, in one example case, the expected signature generating subsystem 122 can generate expected signatures for one or more media streams that are stored (e.g., registered or catalogued), for example, in the memory database 108.

For instance, media streams that may be potentially scheduled for output by a media system 106 may be stored in the memory database 108 (or any other database). Accordingly, the expected signature generating subsystem 122 may automatically access all, or some, of the media streams to generate corresponding expected signatures. In this manner, the subsystem 122 can generate, ahead of time, a "library" of expected signatures for each or some of the stored media streams.

In other examples, to generate the expected signatures, the signature generating subsystem 122 may access and/or retrieve select media streams. For example, this can include media streams referenced in one or more pre-generated media program schedules 114. The program schedules can be associated with one or more media channels output by one or more of the media systems 106.

For each media program schedule 114, the signature generating subsystem 122 may access and/or retrieve the media streams 130 (or copies thereof) referenced in the program schedule 114. For example, the subsystem 122 can extract media stream identifiers included in the program schedule 114 and can use the media stream identifiers to access and/or retrieve the actual media streams (or copies thereof) from the memory database 108.

In still other examples, the subsystem 122 may not automatically generate expected media frame signatures, but may only generate expected signatures 128 for select media frames "on request", or "on demand", e.g., from the assertion schedule subsystem 124.

For example, as explained, the assertion schedule subsystem 128 may request only specific expected signatures to be generated by the subsystem 122. These expected signatures may be used for inclusion into a content match assertion generated by the assertion schedule subsystem 124. Accordingly, the signature generating subsystem 122 may only generate the requested expected signatures, and may return these signatures to the assertion schedule subsystem 123.

The expected signatures, generated by the subsystem 122, may comprise processed versions (e.g., compressed versions) of one or more media frames (or portions of media frames) of the accessed and/or retrieved media streams. As explained previously, the expected signatures, generated by the subsystem 122, can represent the expected output of a media system and may be used to validate content match assertions generated by the assertion schedule subsystem 124. For example, this may involve comparing the expected signatures to observed signatures received from a probing module 118 at specific time intervals to determine if there is a sufficient match. If there is a sufficient match, this may indicate that the actual channel output from a media system 106 is substantially similar to the expected channel output (e.g., as expressed by the expected signatures).

In some embodiments, the expected signatures generated by the subsystem 122 may be transmitted for storage in the memory database 108. In other cases, they may be transmitted directly to other subsystems 124, 126 of the media channel monitoring system 116.

At 304, the assertion generating subsystem 124 may generate one or more assertion schedules 134. As previously explained, each assertion schedule may include one or more assertion conditions, and one or more time instances or intervals for validating these assertion conditions (also referred to herein as assertion timecodes). The assertions may include, for example, content match assertions (e.g., comparing observed and expected signatures to ensure correct media stream playout) as well as video media frame assertions and/or muted (e.g., silent) audio assertions, among other types of assertions.

While act 304 is shown as occurring after act 302, act 304 may also occur before act 302. For example, this may occur where the assertion schedule is primarily comprised of frozen media frame assertions, and accordingly, does not necessarily require expected signatures to be pre-generated at act 302.

In other cases, acts 302 and 304 may occur at least partially concurrently. For example, while the assertion schedule generating subsystem 124 is generating assertion checks, it may request expected signatures "on demand" from the signature generating subsystem 122 for incorporation into content match assertion checks.

At 306, at a subsequent point in time, the signature analysis subsystem 126 can receive one or more observed media frame signatures 120*a*-120*n* from one or more probing modules 118. The observed media frame signatures may represent processed (e.g., compressed) versions of media stream frames that are being output by a media system 106. As provided herein, the observed media frame signatures 120 may be received continuously, or at pre-defined time intervals, or in response to a request initiated by the signature analysis subsystem 126.

At 308, the signature analysis subsystem 126 may access and/or retrieve a relevant assertion schedule 114 (e.g., from the memory storage 108). The subsystem 126 may proceed to validate one or more assertion conditions, identified in each assertion schedule 114, at corresponding time instance or time intervals. The assertion conditions can be validated using the received observed signatures 120. For example, this may involve validating content match assertions, or frozen media frame assertions. Act 308 is explained in greater detail throughout this document.

At 310, the signature analysis subsystem 126 can generate one or more outputs 138*a*-138*n* based on the analysis performed at act 308. For example, for each assertion condition in each assertion schedule, the subsystem 126 may generate an output indicating whether the assertion condition has been successfully validated, or otherwise whether the assertion condition has failed and/or the outcome is ambiguous. The output 138 can be transmitted, for example, to the administrator computer 112 or otherwise archived in the memory database 108 for subsequent analysis The various components and subsystems of the system 100 are now described in greater detail.

II. Observed Signature Generating Module (Probing Modules)

As explained previously, and with reference to FIG. 1A, the system 100 may include one or more observed signature generating or probing modules 118. Each probing module 118 may be communicatively coupled to one or more media systems 106. Each probing module 118 may be operable to monitor (e.g., in real-time or near real-time) media channel stream output on a corresponding media system 106.

In the illustrated example, probing module 118a is communicatively coupled to the media system 106a to monitor media stream output (e.g., broadcast and/or played out) from the media system 106a in one or more media channels. Similarly, probe modules 118b and 118c are communicatively coupled to each of media systems 106b and 106c, respectively, to monitor the media channel stream output from these media systems.

Probing modules 118 can be disposed in various locations relative to corresponding media systems 106. For example, probing modules 118 may be located directly in the media systems 106. For instance, the probing modules 118 may be software modules or software plug-ins (e.g., computer-executable instructions) that are stored on a memory of each media system, and that may be executable by one or more processors of the media system. In these cases, the probing modules 118 may represent an extended functionality of the media systems' 106 capabilities (e.g., software capabilities).

In other cases, one or more of the probing modules 118a-118n may be disposed at any other location relative to the media systems 106a-106n, insofar as each probing module 118 is in direct or indirect communication with a respective media system 106 to receive output media streams (or copies thereof) for monitoring purposes. For example, the probing modules 118 may be hosted on one or more separate hardware units (or devices) which communicatively couple to respective media system 106. Such hardware devices may, themselves, include one or more of a processor, memory and a communication interface, and whereby the memory may store the probing modules 118. The hardware devices may communicate directly with the media systems (e.g., a wired connection), or may communicate via the network 105.

Each media system 106 may have any number of corresponding probes 118. For example, each media system 106 may have only a single associated probing module 118, designated for monitoring media stream output from that media system. In other examples, a media system 106 may have multiple associated probing modules 118. For instance, a separate probing module 118 may be designated to monitor each separate media channel output from the media system 106. For instance, as shown in FIG. 1A, the media system 106a may include a first probing module 118a1 for monitoring media streams output on a first media channel, and a second probing module 118a2 for monitoring media streams output on a second media channel.

A single probing module 118 can also be designated to monitor outputs for multiple media channels, on the same media system 106. For example, where multiple media channels are not broadcasting media streams simultaneously, the probing module 118 can monitor multiple media channel outputs by monitoring one media channel output at a time.

Still further, a single probing module 118 may provide concurrent monitoring of more than one media channel output, across more than one media system 106. For example, this is possible where the media systems 106, which are coupled to the probing module 118, are not concurrently outputting media channel streams. In this case, the probing module 118 is able to service one media channel, on a given media system 106, at a given time instance.

As stated previously, each probing module 118 may generate monitoring data for media channel outputs, on monitored media systems 106. The output data, generated by each probing module 118, can correspond to processed versions of the output media frames on a given media system (also referred to herein as "observed media frame signature data", or "observed signatures").

In cases where the probing modules 118 are located directly in the media systems 106—probing modules 118 can generate monitoring data by directly accessing the media streams (or copies thereof) output by the monitored media system 106.

In cases where the probing modules 118 are located externally to the media systems 106 (e.g., hosted in separate hardware units), the media system 106 may transmit the output media streams to the probing modules 118. In turn, this allows the probing modules 118 to generate the monitoring data (e.g., observed signatures).

Once the probing modules 118 generate the monitoring data, the probing modules 118 can then transmit the media streams to further downstream devices. For example, probing modules 118 may be interposed in the transmission pathway, between the media system 106 and other downstream devices. In this location, probing modules 118 may intercept original media streams, generate observed signatures, and forward the media streams to other downstream devices.

In other examples, probing modules 118 may not receive the original media streams. For example, probing modules 118 can receive a copy of the output media channel streams from media system 106. Accordingly, the external probing device may generate observed signatures based on the received copy. In other cases, the media systems 106 may be configured for multicast networking to achieve the same outcome.

A. Example Observed Signature File

Figure 4A:
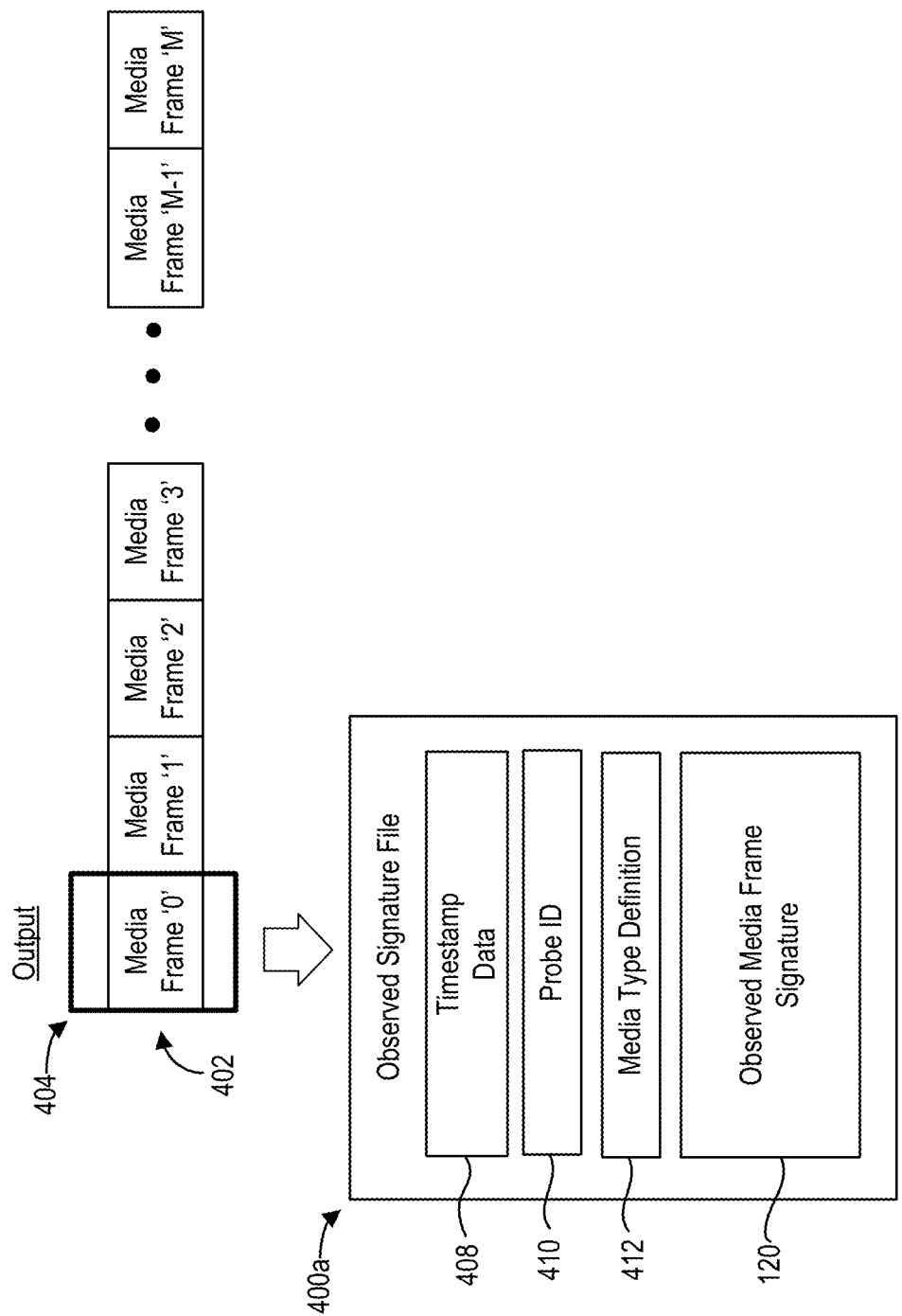
FIG. 4A is an illustration showing an example embodiment of an observed signature file.

Reference is now made briefly to FIG. 4A, which illustrates an example observed signature file 400a. The observed signature file 400a can be generated by a probing module 118. The observed signature file 400a can package an observed media frame signature corresponding to an output media frame, in a media channel stream.

FIG. 4A shows an example media stream 402 (e.g., video, audio or auxiliary data stream) that may be output by a media system 106 on a given media channel, and which may comprise one or more media frames (e.g., frame '0' to frame 'M'). At a given time instance, the media system 106 may output at least one of the media frames (e.g., media frame 404).

As the media frame 404 is being output by a media system 106, the probing module 118, which is designated to monitor the media channel output, can generate an observed signature file 400 corresponding to that output media frame 404. The observed signature file 400a can include a number of fields, including a field corresponding to the observed media frame signature 120, as well as fields that include one or more of timestamp data 408, a probe ID 410 and a media type definition 412.

As stated previously, the observed media frame signature 120 may include the processed version (e.g., a compressed version) of the actual content of the output media frame 404.

For example, as explained in greater detail herein with reference to FIG. 5A-5E, where the media frame is a video frame, the observed media frame signature 406 can correspond to a perceptual hash (e.g., an alpha numeric hash) of the video frame content (or a portion thereof). A similar perceptual hashing technique can also be used to generate the observed signatures for various types of auxiliary data frames that include image graphic or logo content.

In other cases, also explained in greater detail with reference to FIGS. 5F to 5G—where the media frame is an audio frame, the observed signature can correspond to a number expressing, for example, the number of zero crossings of the audio signal in the audio frame.

In at least some examples, the observed media frame signature 406 may also correspond to a portion of a media frame (e.g., rather than the entire media frame). For example, as provided herein with reference to FIGS. 6A-6D, where the media frame is a video frame—the observed signature 406 may correspond to a processed version of a portion of the video frame. For example, in FIG. 6A, the video frame may include a top frame portion 602a and a bottom frame portion 602b, and the observed signature may comprise a processed version of either the top or bottom frame portions 602a, 602b.

Timestamp data 408 may include a time indication of the time instance (e.g., Hours:Minutes:Seconds: Frames) the media frame 404 was output by the media system 106. In some embodiments, the time clocks used by each component of the system 100 may be synchronized, such as by the use of precision time protocol (PTP). Accordingly, the timestamp data 408 may be locked to PTP.

In various examples provided herein, when the observed signature file 400a is received by the signature analysis subsystem 126, the timestamp data can be extracted to match (e.g., pair) the observed signature file to one or more corresponding assertion checks, in a corresponding media assertion schedule (e.g., to validate the assertion checks).

Probe ID 410 may be a unique identifier (e.g., a numeric, or alpha numeric identifier) that is assigned to the probing module 118 transmitting the observed signature file 400a. In some embodiments, each probing module 118 in the system 100 may be assigned a unique probe ID. The probe ID assigned to each probing module 118 may be known in advance to the media channel monitoring system 116.

In various cases, based on the probe ID included in the observed signature file 400a, the signature analysis subsystem 126 can identify the probe which is transmitting the observed signature file 400a. If the probe is designated to monitor a specific media channel output for a specific media system, identifying the transmitting probe (e.g., via the probe ID) can also allow the system to determine which media channel or media system is associated the observed media frame signature. For example, the signature analysis subsystem 126 may store look-up data correlating different probe IDs to known media systems and/or media channels being monitored by that probe.

Media type definition field 412 can include an indication of the type of media frame (e.g., video, audio or various types of auxiliary data) that was processed to generate the observed signature file.

In some examples, the observed signature files may also include an indication of the media channel and/or media system that is outputting the media frame 402.

In some cases, a probing module 118 can generate multiple observed signature files 400a for each type of media stream frame being output by a media system on a media channel. For example, at a given time instant, a probing module 118 can concurrently generate one or more separate observed signature files 400 corresponding to one or more synchronized video, audio and auxiliary media frame outputs.

Figure 4B:
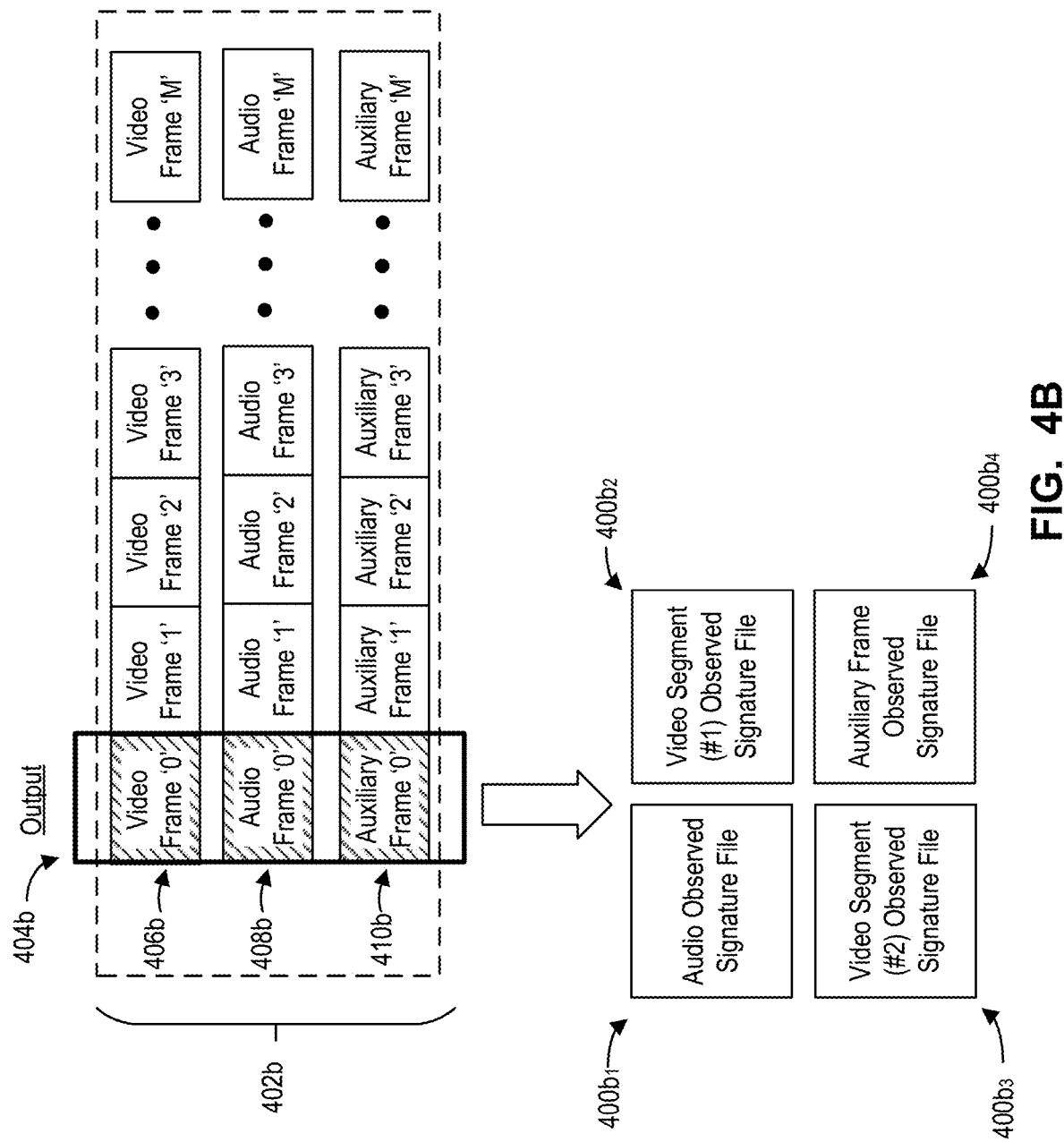
FIG. 4B is an illustration showing one or more observed signature files generated from one or more output media frames.

For example, as shown in FIG. 4B, a media channel output on a media system 106 may include more than one media stream 402b (e.g., synchronized media streams), including a video stream 406b, an audio stream 408b and one or more auxiliary data streams 410b. At a given instance in time, the media system 106 may therefore output one or more media frames 404b corresponding to each media stream type. To address this situation, the probing module 118 may generate one or more corresponding observed signature files 400b1-400b4 corresponding to each output media frame.

In some cases, the probe module 118 may generate more than one observed signature file 400 for the same output media frame (e.g., 400b2 and 400b3). For instance, as discussed previously with reference to FIGS. 6A-6D, a separate observed signature can be generated for different frame portions of a single video frame.

B. Example Observed Media Frame Summary

In some example cases, rather than generating separate observed signature files for each type of output media frame (e.g., video, audio and auxiliary data) as shown in FIG. 4B, a probing module 118 may generate an observed "media frame summary".

An observed media frame summary may contain and aggregate multiple observed signatures for one or more output media frames. For example, an observed media frame summary may contain multiple observed signatures for one or more media frames that are synchronously or concurrently output on a media channel by a media system.

Figure 4C:
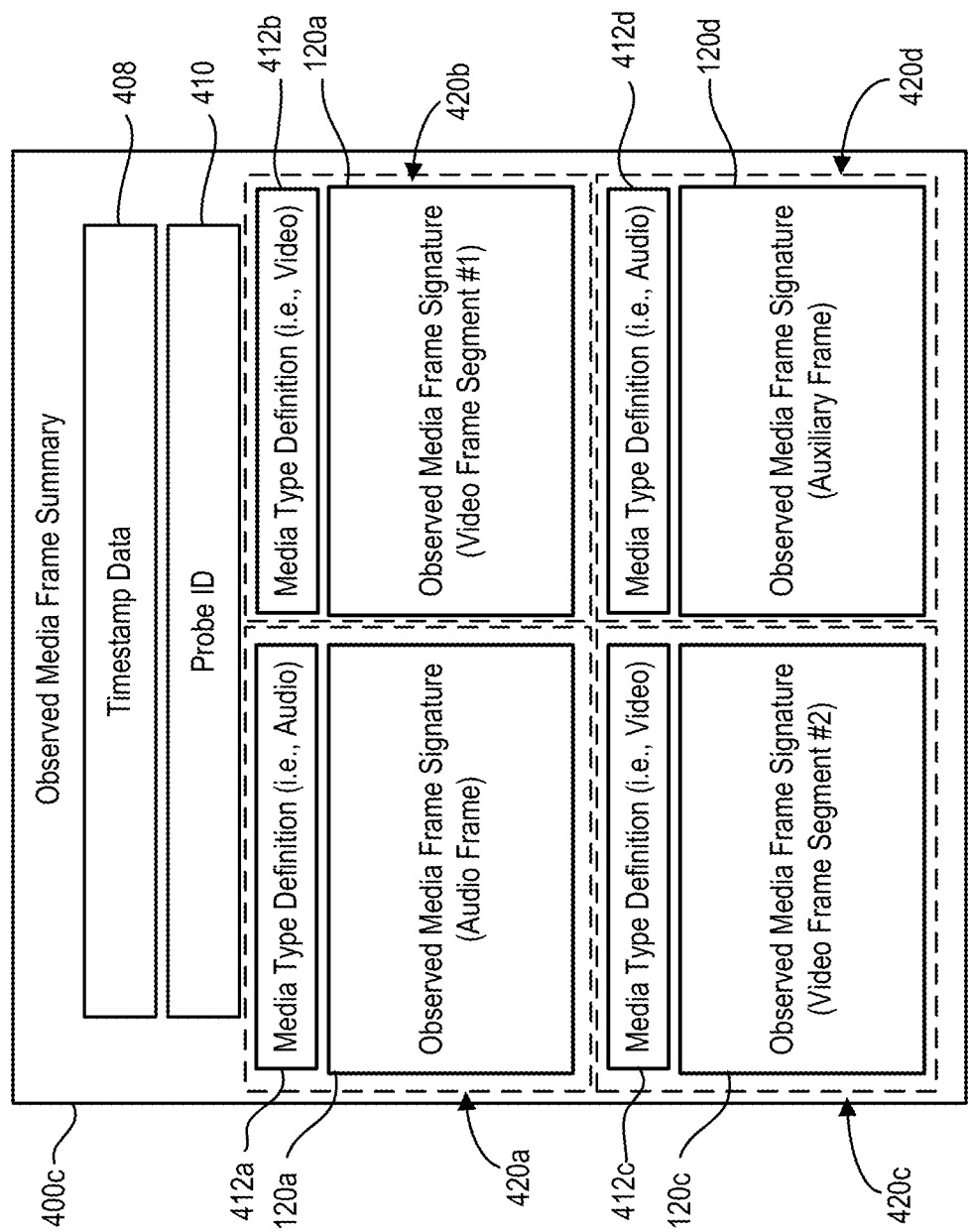
FIG. 4C is an illustration showing an example embodiment of an observed media frame summary.

Reference is now briefly made to FIG. 4C, which shows an example observed media frame summary 400c which can be generated by a probing module 118, in accordance with some embodiments.

As shown, the media frame summary 400c may package together one or more observed signatures 120a-120d associated with output media frames in a media channel. For example, in the illustrated embodiment, the frame summary 400c can include a first observed signature 120a corresponding to an output audio frame, a second observed signature 120b corresponding to a first output video frame portion, a third observed signature 120c corresponding to a second output video frame portion, and a fourth observed signature 120d corresponding to an auxiliary data frame. Similar to the observed signature file 400a of FIG. 4A, each media frame summary 400c may also include timestamp data 408 and a probe ID 410.

In some embodiments, each media frame summary 400c can include one or more frame sections 420a-420d. Each frame section 420 may include an observed media frame signature for one type of media frame or media frame portion. For example, the frame section 420a can include the observed signature data 120a for the audio frame, and the frame section 420b can include the observed signature data 120b for the first video frame portion, and so forth.

In cases where a media stream frame is not available (e.g., no audio stream output), the respective frame section 420 for that media stream frame may be simply elided from the media frame summary (e.g., the frame section may be blank). A frame section 420 may also be elided from the frame summary 400c if the probing module 118 is not configured to generate observed signatures for that particular type of media stream, or media frame portion (e.g., video frame portion). For example, a probing module 118 may not be configured to generate observed signatures for certain types of media streams, or media frame portions, on a permeant or intermittent basis.

Similar to the observed signature file 400*a*, each frame section 420 can also include a media type definition field 412*a* which can indicate the type of media frame associated with the observed signature included in that frame section (e.g., audio, video and auxiliary data). In some cases, however, the media type definition field 412 may be omitted from one or more frame sections 420. For example, in some cases, the frame summary 400*c* may be pre-formatted such that each frame section 420 is pre-designated to hold observed signatures for a known media frame type. Accordingly, based on the pre-defined designations for each section 420, the signature analysis subsystem 126 may automatically determine what type of media frame, or media frame portions, are included in each section 420 of the frame summary 400*c* without requiring the media type definition field 412.

In other embodiments, rather than generating a single frame summary 400*c*, the contents of the frame summary 400*c* may be divided as between multiple frame summaries. For example, the probing module 118 can generate more than one frame summary such that one frame summary includes, for instance, video and audio observed signatures, while a second frame summary includes observed signatures for different types of auxiliary data.

In some example embodiments, a frame summary 400*c* can include observed signatures from multiple types of media frames that are not necessarily concurrently output by a media system 106.

For example, a probing module 118 can buffer several observed video frame signatures, corresponding to consecutively (or non-consecutively) output video frames in a media channel, and can generate a frame summary that includes each video frame signature in a separate frame section. In this case, each frame section 420 may also include a separate timestamp field in respect of the output time of the corresponding video frame.

In some embodiments, each of the observed signature files 400*a* and the media frame summaries 400*c* may be expressed as JSON files.

C. Example Methods for Generating Observed Media Frame Signatures

Reference is now made to FIGS. 5A-5G, which show various example embodiments for methods for generating observed media frame signatures (e.g., observed signatures 120 in FIGS. 4A and 4C).

The methods illustrated in these figures may be performed, for example, by various probing modules 118. The methods may represent different executable software instructions or software routines. In at least some examples, the probing modules 118 may perform the illustrated methods by executing the methods on a processor of a media system 106 and/or any other suitable processor.

Figures 5A, 5B:
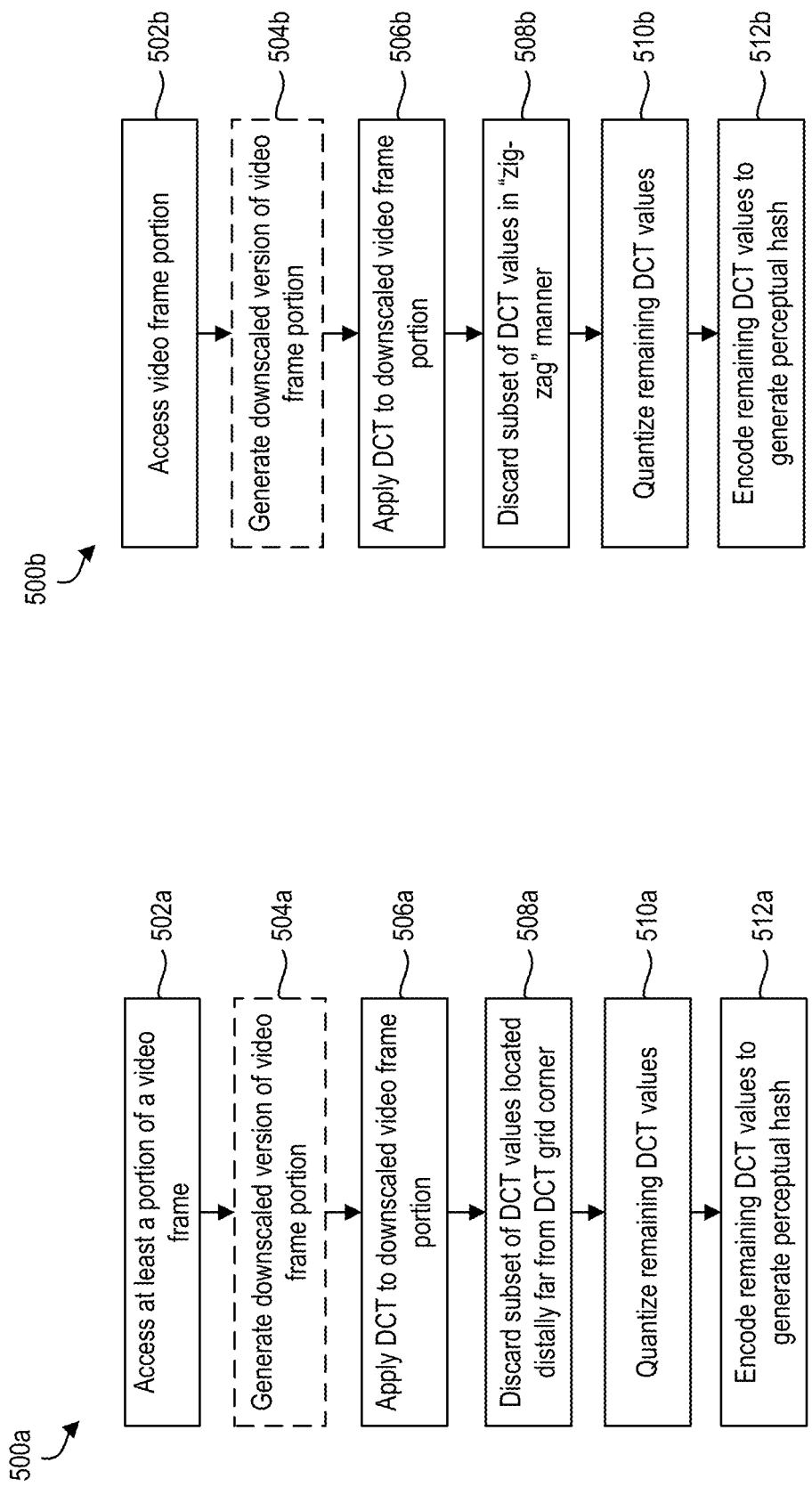
FIG. 5A is an example method for perceptual hashing.
FIG. 5B is an example method for modified perceptual hashing.

Referring first to FIGS. 5A and 5B, which show example methods 500*a* and 500*b* for generating observed media frame signatures, by a probing module 118, for a video frame. Methods 500*a* and 500*b* may also be applied to generate observed signatures for auxiliary data frames that comprise images (e.g., graphic images, logos, etc.)

In more detail, methods 500*a* and 500*b* allow for generating observed signatures of video frames using perceptual hashing techniques. Perceptual hashing algorithms convert an input image, of a variable and arbitrary resolution, into a small fixed-size hash which represent the image.

In contrast to other cryptographic hashing techniques, perceptual hashes offer unique advantages in that they provide greater tolerances to small variances or changes in an image or video frame. In this manner, two "perceptually similar" images, which otherwise have small variances (e.g., variances in resolution, brightness or presence of video artifacts), will generate similar perceptual hashes.

By way of example, the perceptual hash of a video frame that may have experienced slight distortions will be substantially similar to the perceptual hash of the original video frame. The distortions may be caused, for example, due to transmission faults during broadcasting, or compression/decompression processing.

As explained herein, the expected signature generating subsystem 122 may also generate expected signatures using perceptual hashing techniques. In this manner, when the signature analysis subsystem 126 validates a content match assertion (e.g., by comparing the observed video frame signature to the expected video frame signature), the assertion may still be validated despite small variances in the video frames being output from the media system 106 (e.g., owing to transmission and processing distortions).

In particular, this is because the perceptual hash of the original video frame (e.g., corresponding the expected signature) and the output video frame (e.g., corresponding the observed signature) are substantially identical. In various cases, this can prevent the signature analysis subsystem 126 from generating false negatives when validating content match assertions as a result of minor distortions between the expected and output video frames.

Reference is now made to FIG. 5A, which shows an example for a conventional method 500*a* for generating a perceptual hash of a video frame using a probing module 118.

At 502*a*, the probing module 118 can access at least a portion of a video frame (or a copy thereof) being output by a media system 106 that is coupled to the probing module 118. In some examples, the probing module 118 may access the entire output video frame. In other examples, the probing module 118 may access only a subset portion of the output video frame. The portion of the video frame accessed at 502*a* (e.g., the subset or entire video frame) may be referred to herein as the "processible portion" of the video frame.

At 504*a*, in some cases, the probing module 118 can generate a downscaled version of the processible video frame portion. For example, the probing module 118 can generate a lower resolution version of the processible video frame portion to generate a downscaled video frame portion. Any known method for downscaling image resolution, as may be known to one skilled in the art, may be employed at act 504*a*.

At 506*a*, a discrete cosine transform (DCT) is applied to the downscaled video frame portion to generate a transformed video frame portion. The DCT operation transforms image pixels from a spatial domain into a frequency domain.

Figures 5C, 5D:
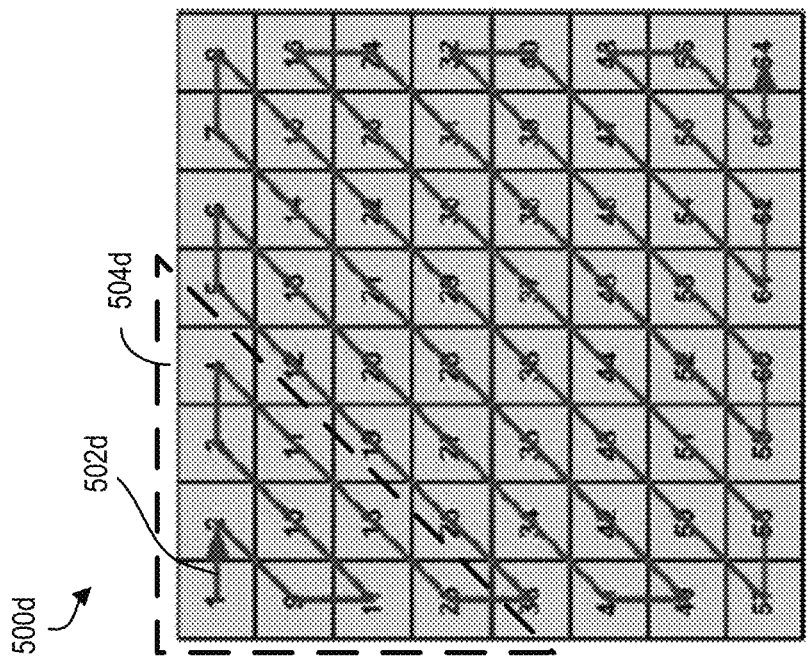
FIG. 5C is an example grid of discrete cosine transform (DCT) values used in the method of FIG. 5A.
FIG. 5D is an example grid of discrete cosine transform (DCT) values used in the method of FIG. 5B.

FIG. 5C shows an example transform matrix grid 500*c* after a DCT operation is applied to an image. The grid of values is the same dimension as the source image, but is an alternate representation of that image in a frequency domain. Each pixel in the grid 500*c* represents a DCT value, with frequency values that are more significant in the image being concentrated around the top-left corner of the grid.

At 508*a*, the DCT values in the transform matrix, which are located distally furthest from a top left corner area of the grid (e.g., corner 502*c*) are discarded to provide lossy image compression.

At 510*a*, the remaining DCT values (e.g., DCT values inside the area 502*c*) are quantized. At 512*a*, the remaining quantized DCT values are encoded to generate a perceptual hash (e.g., an alpha numeric hash value).

Reference is now made to FIG. 5B, which shows an example embodiment for a modified method 500b for perceptual hashing which may offer improvements in accuracy.

Method 500b is generally analogues to the method 500a, with the exception that at act 508b, DCT values are discarded using a "zig-zag" pattern. For example, FIG. 5D shows an example transform matrix after a DCT operation is applied, which is analogous to the grid 500c of FIG. 5C.

At act 508b, the DCT values are re-arranged in a "zig-zag" pattern 502d. For example, the DCT values are arranged in a pattern that repeats by starting at the top left corner and, (i) counting right by one pixel, (ii) diagonally down and left until a grid edge is reached, (iii) down by one pixel, and (iv) and diagonally up and right until a grid edge is reached.

Once the DCT values are re-arranged in this fashion, the first few DCT values are maintained and quantized while the remaining DCT values are discarded at act 508b. The DCT values that are maintained are represented by the triangular area 504d in FIG. 5D. In some cases, where the DCT grid has 4096 values, the first 1024 values in the re-arranged order are maintained and quantized.

The observed video frame signature can also be generated using other perceptual hashing techniques.

Figure 5E:
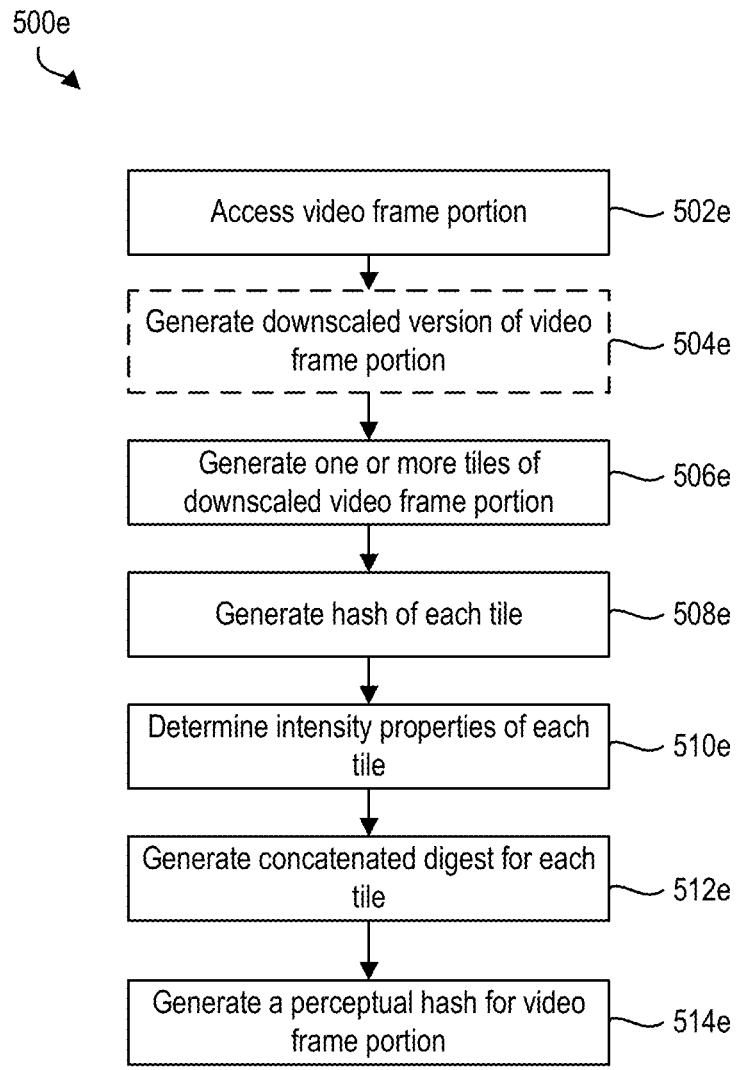
FIG. 5E is another example method for perceptual hashing.
Figure 5F:
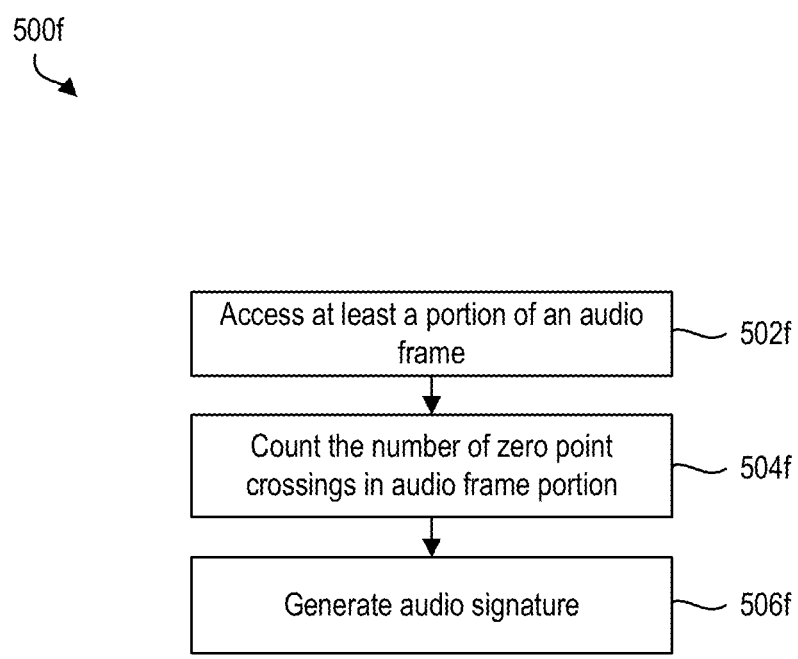
FIG. 5F is an example method for generating signatures of audio frames.
Figure 5G:
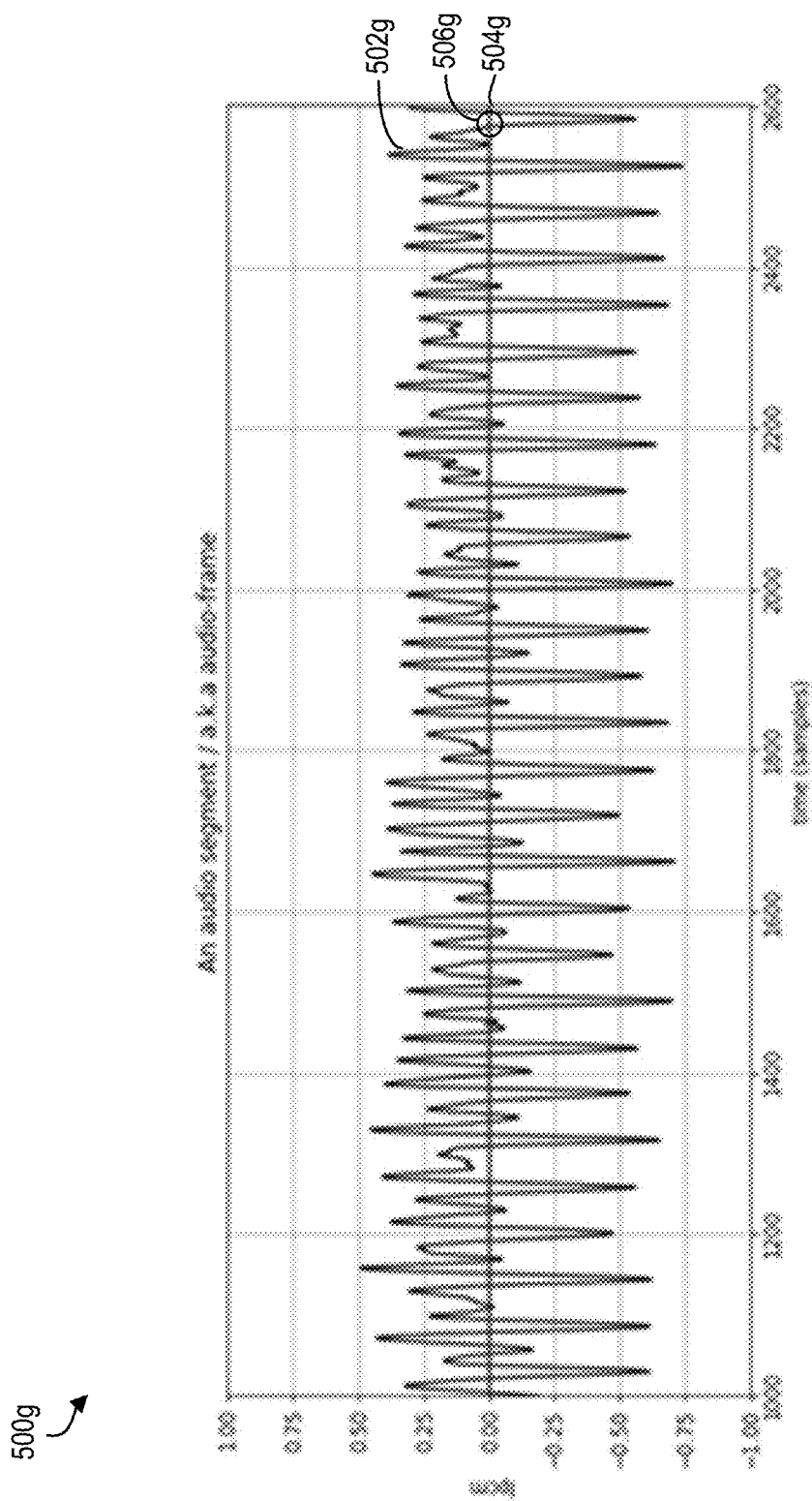
FIG. 5G is an example embodiment of an audio signal plot corresponding to one or more audio frames.

Reference is made to FIG. 5E, which shows an example method 500e for generating a perceptual hash using a modified average hashing (aHash) technique.

At 502e, the processible video frame portion is accessed (e.g., analogous to acts 502a and 502b in methods 500a and 500b, respectively).

At 504e, a downscaled version, of the processible video frame portion, is generated. For example, the downscaled version can have dimensions of 120-pixel columns×60-pixel rows.

At 506e, the downscaled version of the video frame portion is divided into a plurality of tiles. For example, the downscaled version can be divided into a grid of equally sized tiles. For instance, this can involve dividing the downscaled image into a tiled grid of 10 columns×6 rows. Accordingly, each tile is 12 downscaled pixels wide by 10 downscaled pixels high, At 508e, a hash is generated for one or more tiles of the plurality of tiles. In one example, the hash comprises an aHash technique. An example aHash technique is described at https://hackerfactor.com/blog/index.php %3F/archives/432-Looks-Like-It.html, which is incorporated herein in its entirety by reference. In particular, this approach divides each tile into a grayscale 8×8 pixel tile, and sets the 64 bits in the hash based on whether the pixels' values is greater than the average color for the tile. In other examples, other types of hashes can also be used (e.g., pHashes and dHashes).

In some examples, an aHash is generated for each tile of the downsized video frame portion. In other examples, any other hashing technique can be used for each tile.

At 510e, intensity properties are determined for the one or more tiles. Intensity properties can include the maximum pixel intensity value in the tile, minimum pixel intensity value in the tile and the mean pixel intensity value for all pixels in the tile.

At 512e, a concatenated digest is generated for each of the one or more tiles. The concatenated digest includes the aHash for the tile, as well as associated metadata. The metadata can comprise the intensity properties for that tile. For example, a concatenated digest may be expressed as: [aHash of tile; Intensity properties for tile].

A 514e, a perceptual hash is generated for the video frame portion. The perceptual hash comprises the aggregate of the concatenated digests for the one or more tiles, as determined at act 512e. For instance, the perceptual hash can be expressed as; [Digest of tile #1; Digest of tile #2; Digest of tile #3, etc.].

Method 500e can also allow generating perceptual hashes for image-based auxiliary data frames (e.g., graphic logos, etc.).

In other example cases, rather than using a perceptual hash, any other hashing technique may also be used to generate the observed video frame signature data. Similar hashing techniques can also be used to generate an observed signature for image-based auxiliary data frames. Reference is now made to FIG. 5F, which shows an example embodiment for a method 500f for generating an observed media frame signature 120 for an audio frame, according to some embodiments. Method 500f can be performed, for example, by a probing module 118.

At 502f, the probing module 118 can access at least a portion of an audio frame being output by a media system 106 coupled to the probing module 118. In some embodiments, the probing module 118 may access the entire output audio frame. In other embodiments, the probing module 118 may access only a subset portion of the output audio frame. In some cases, each audio frame may be represented as a stream of pulse modulated samples of the true audio waveform. FIG. 5G shows an example audio frame 500g.

At 504f, the number of zero-point crossings in the audio frame portion is determined. A zero crossing may represent an instance when the audio wave form changes from a positive to a negative value. For example, in FIG. 5G, this may correspond to each time the audio frame signal crosses the zero-point line 504g (e.g., point 506g).

At 506f, an observed audio frame signature is generated corresponding to the counted number of zero crossings in the audio frame portion.

In various cases, where an audio stream comprises multiple channels, the observed audio frame signature may include (e.g., concatenate) more than one zero crossing value corresponding to each separate audio channel in an audio frame. For example, this may be expressed in a matrix format (e.g., zero crossings: [96, 98] may express 96 zero crossing for a first audio channel, and 98 zero crossing for a second audio channel). In some embodiments, the observed audio frame signature can also include the maximum extrema or average volume for each audio channel in the audio frame.

D. Example Methods for Generating and/or Transmitting Observed Signature Data by Probing Modules Observed signature data can be generated and/or transmitted, by probing modules 118, using various techniques. The observed signature data can comprise, for example, observed signature files 400a or observed media frame summaries 400c.

In some examples, the observed signature data may be automatically generated by each probing module 118. For example, each probing module 118 may automatically generate observed signature data for each output media frame, of each monitored media channel.

In other cases, the probing modules 118 may only automatically generate observed signature data at pre-defined intervals. For example, a probing module 118 may only generate observed signature data for pre-determined output media frames (e.g., every second, third or fourth consecutive media frame in a media stream), or for media frames that are output at pre-defined time intervals. In some cases, the pre-defined intervals for generating observed signature data may also vary for different output media streams (e.g., video, audio and auxiliary data streams).

In still other examples, a probing module 118 may generate and transmit observed signature data "on demand", and in response to receiving a request from the media channel monitoring system 116. For example, as provided herein, the signature analysis subsystem 126 may transmit requests to one or more probing modules 118 to generate and transmit observed signature data. The signature analysis system 126 may either request that the probing module 118 generate the observed signature data instantaneously, or otherwise, at a specific pre-defined time instance or interval occurring at a future point in time.

To this end, in some examples, the signature analysis subsystem 126 may receive or access an assertion schedule 134 generated by the assertion schedule subsystem 124. The signature analysis subsystem 128 may then identify a probing module 118 associated with the assertion schedule. That is, the subsystem 126 may identify a probing module 118 that is monitoring media streams and/or media channels that require validating by the accessed assertion schedule. The signature analysis subsystem 126 may then analyze the assertion schedule to identify time instance or intervals when the assertions requiring validating. At the relevant time instances or time intervals, the signature analysis subsystem 126 may transmit a request to the relevant probing module 118 to generate and transmit corresponding observed signature data, e.g., for use in validating the relevant assertion.

In at least some cases, the signature analysis subsystem 126 may also simply transmit (e.g., ahead of time) a schedule of times to a probing module 118 when the signature analysis subsystem 126 requires the probing module 118 to generate observed signature data, e.g., for specific media stream. In response, at the relevant times, the probing module 118 may automatically transmit the requested observed signature data to the signature analysis subsystem 126.

In still other cases, rather than sending the scheduled times, the media channel monitoring system 116 may also simply transmit the media assertion schedules itself directly to the probing module 118. The probing module 118 may then automatically parse the schedule and determine the time instances and intervals, and for which media channel streams, it is required to generate and transmit the observed signature data to the media channel monitoring system 116.

Probing modules 118 may also generate and/or transmit the observed signature data in real time or near real-time, as the media streams frames are being output by a media system 106. In other cases, the probing modules 118 may generate the observed signature data in real-time or near real-time but may transmit the observed signature data at any other subsequent time, after the media streams are output by a media system 106.

In still yet other cases, the probing module 118 may generate and/or transmit observed signature data after the media streams have been output by a media system 106. For example, the probing module 118 may access a recording of a media stream previously output by the media system 106 (e.g., a recording stored on the media system 106), and may generate observed signatures retroactively. In this case, the timestamp included in the observed signature file may correspond to the time a recorded media stream frame was actually output by the media system.

The observed signature data generated by the probing module 118 may, in some examples, be transmitted directly to the media channel monitoring system 116 (e.g., via network 205). In other cases, the generated observed signature data may be transmitted for storage, for example, in the memory database 108. The stored (e.g., archived) observed signature data may then be retrieved at a later point in time, e.g., by the media channel monitoring system 116, for subsequent analysis.

In at least one example, each probing module 118 may have one or more adjustable configuration settings. The adjustable configuration settings may allow for adjusting, for example, the types of media streams and/or media channels that are monitored for generating the observed signature data, the frequency of generating and/or transmitting the observed signature data for given media channels, streams, as well as whether the observed signature data is automatically generated and/or transmitted or whether it is generated and/or transmitted only in response to receiving requests from the media channel monitoring system 116. The adjustable configuration settings may be adjusted through control signals transmitted by the media channel monitoring system 116, the administrator computer 112 and/or an operator of the media systems 106.

III. Media Channel Monitoring System

As shown in FIG. 1A, the media channel monitoring system 116 may include one or more subsystems including the expected signature generating subsystem 122, the assertion schedule generating subsystem 124 and the signature analysis subsystem 126. Each of the subsystems is now described in greater detail.

A. Expected Signature Generating Subsystem

The expected signature generating subsystem 122 generates signatures 128 based on the original media frames (or copies thereof). The media frames can be associated with media channel streams scheduled for output by media systems 106.

The signatures generated by the subsystem 122 are referred to herein as "expected media frame signatures", or "expected signatures". As provided herein, the expected signatures can be used, by the signature analysis subsystem 126, to determine whether the media channel output, from one or more media systems 106, is synchronized with the expected media channel output (e.g., in accordance with a media program schedule). This may occur, for example, by comparing, at specific time instances or intervals, the observed media frame signatures, received from one or more probing modules 118, to the expected signatures for media frames generated by the subsystem 122 and that are otherwise expected to be output.

By comparing the observed and expected signatures, the system can assess how similar the media frames actually output by a media system (e.g., as expressed by the observed signatures) are to the media frames expected be output by the media system at certain time instance or intervals (e.g., as expressed by the expected signatures).

Similar to the observed signatures generated by the probing modules 118, the expected media frame signatures 128 may also comprise processed versions of media frames, or media frame portions (e.g., compressed versions).

In various cases, the expected signatures may be generated in an analogous manner as previously explained with reference to FIGS. 5A-5G for the observed signature. In some cases, for a given media stream type, the probing modules 118 and the expected signature generating subsystem 122 may use identical methods for generating signatures to allow for a one-to-one comparison between observed and corresponding expected signatures.

Figure 7A:
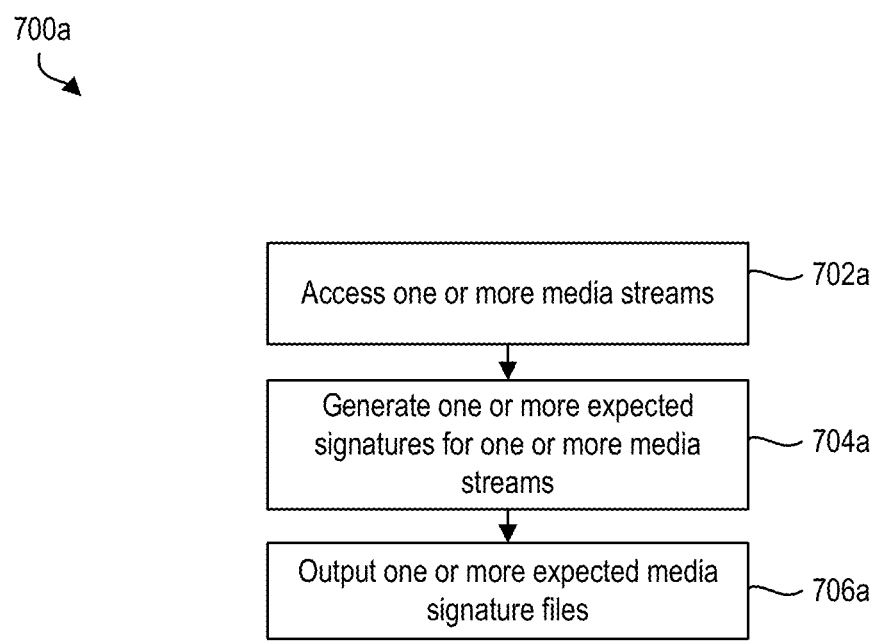
FIG. 7A is an example method for generating expected media frame signatures, according to some embodiments.

Reference is now made to FIG. 7A, which shows an example method 700a for generating expected signatures 128 using the expected signaturing generating subsystem 122. Method 700a may be performed, for example, by the server processor 102a.

At 702a, the signature generating subsystem 122 can access one or more media streams (e.g., video, audio and auxiliary data streams) (or copies thereof) to generate one or more expected signatures.

In some embodiments, the media streams accessed at 702a may be pre-stored media streams, such as media streams stored in the storage database 108. For example, the storage database 108 may store one or more, or a plurality of media streams, that are registered in the system for possible output by one or media systems 106. Accordingly, the signature generating subsystem 122 can access each, or one or more, of the registered (or stored) media streams to generate respective expected signatures. The signature generating subsystem 122 may then generate a "library" of expected signatures, corresponding to each of the accessed media streams.

In other cases, the signature generating subsystem 122 may only access select media streams. For example, the signature generating subsystem 122 may only access media streams identified in a pre-generated media program schedule 114. For instance, the signature generating subsystem 122 can receive a media program schedule 114 (or a copy thereof). In these example cases, the signature generating subsystem 122 can receive (or retrieve) a copy of the media program schedule 114 from the memory database 108 or server memory 102b.

In other cases, the subsystem 122 may directly receive the media program schedule 114 from the media program scheduling system 110 (e.g., FIG. 1A). As explained previously with reference to FIG. 2B, the signature generating subsystem 122 can access media streams in the media program schedule by identifying (e.g., extracting) one or more media stream identifiers 214, 216, 218 in the media program schedule 114, and using these identifiers to access (e.g., retrieve) the media streams (or copies thereof) from the memory database 108 to generate corresponding expected signatures.

At 704a, the signature generating subsystem 122 can analyze the one or more accessed media streams at 704a to generate one or more expected signatures.

In some examples, at act 706a, the signature generating subsystem 122 can analyze each media stream accessed at 704a and may generate expected media frame signatures for each media frame of that media stream. The method of generating the expected media frame signatures may be analogous to those described in FIGS. 5A-5F, depending on the media stream type. In this manner, the signature generating subsystem 122 may accordingly generate a repository of all possible expected signatures for all media frames associated with all media streams scheduled for output on a given media channel. This may offer the media channel monitoring system 116 the flexibility of retrieving any required expected signature as needed.

In some embodiments, as explained previously with respect to generating observed signatures—the signature generating subsystem 122 may also generate multiple expected signatures for the same media frame. For example, as explained with reference to FIGS. 6A-6D, a video frame may be partitioned into one or more frame portions. For example, and as provided in further detail, a video frame 600a may be divided into an upper frame portion 600a and a lower frame portion 600b. The expected signature generating subsystem 122 may accordingly generate separate expected signatures corresponding to one or more of the frame portions. In embodiments provided herein, the expected signatures generated for the individual frame portions may allow the signature analysis subsystem 126 to compare observed and expected signatures associated with the same corresponding video frame portions (e.g., rather than comparing signatures generated using the entire video frame).

At 706a, the signature generating subsystem 122 can output the one or more generated expected signatures 128. In some example embodiments, the output expected signature 128 may be transmitted for storage in the memory database 108, or the server memory 102b, for subsequent retrieval.

In some example cases, the signature generating subsystem 122 may output the expected signatures in a compact block format. For example, in respect of each media stream, a compact binary file may be generated, whereby the compact file may include a file header portion (e.g., identifying a media stream, such by its media stream identifier) followed by a block of concatenated expected signatures corresponding to each (or one or more media frames) in that media stream (e.g., Header Portion+Expected Signature (Media Stream Frame 1)+Expected Signature (Media Stream Frame 2)+ . . . ). In other cases, rather than including identifying information in a header portion, the compact file may include the identifying information in any other location in the file.

Multiple expected signatures may also be generated for the same media frame, such as is the case when generating multiple expected signatures for different portions of the same media frame (FIGS. 6A-6D). In these cases, the compact file may include multiple subblocks of expected signatures, each subblock comprising expected signatures for different portions of the same media frame. For example, each subblock may concatenate the expected signatures for different portions of the same media frame in a standardized order (e.g., Subblock #1: Expected Signature (Top Portion of Media Stream Frame 1)+Expected Signature (Bottom Portion of Media Stream Frame 1)+ . . . ).

Each expected signature in the compact file, may be expressed by a fixed binary string (e.g., 100 length byte string). This, in turn, can allow the system to quickly seek into the compact file and retrieve the expected signatures for the desired media stream frame. For example, to extract the expected signatures for media frames #210 to #220 in an example media stream (e.g., 10 media frames), the system can seek into the relevant compact file and locate a string of bytes corresponding to: known byte length of header+(100 bytes×210 frames). This may mark the beginning of a bit string for the expected signature for media frame #210. The system can then proceed to retrieve (e.g., extract) the subsequent 1,000 bytes which correspond to the expected signatures for media frames #210 to #220. In cases where the compact file includes multiple subblocks of expected signatures for different portions of the media frames, a similar method can be used to extract the expected signatures for a particular media frame portion (e.g., calculating the number of bytes to access the correct subblock, and further calculating the number of bytes to access the correct expected signature within the relevant subblock).

In other cases, rather than storing the expected signatures in a binary format, they may be stored in a JSON base64 format, or any other suitable format.

Figure 7B:
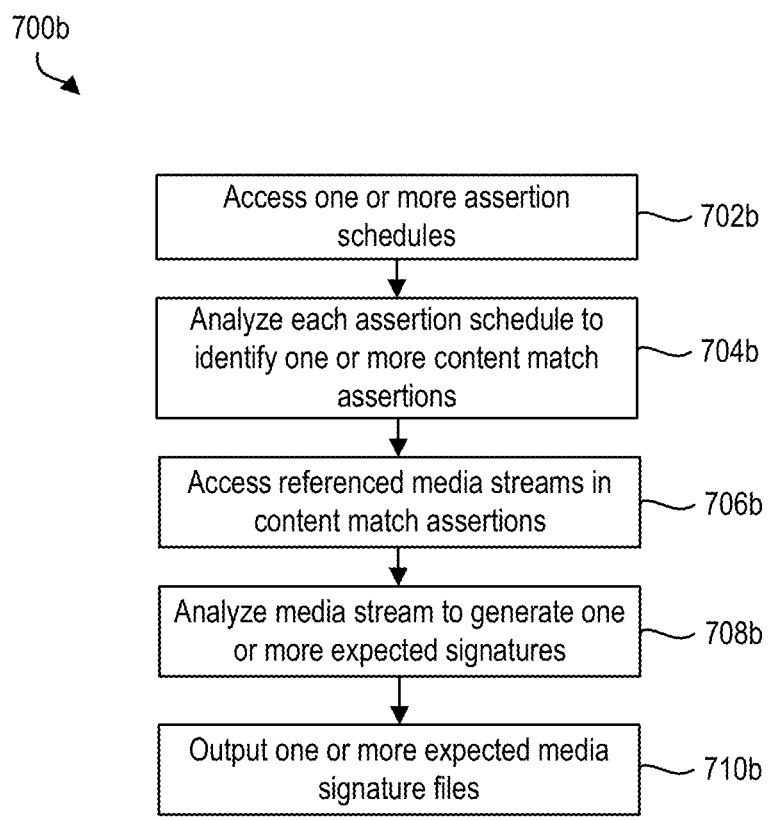
FIG. 7B is an example method for generating expected media frame signatures, according to some other embodiments.

Reference is now made to FIG. 7B, which shows an example method 700b for generating expected signatures 128 using the expected signaturing generating subsystem 122, according to some other embodiments. Method 700b may be performed, for example, by the server processor 102a.

In contrast to the method 700a, the method 700b can be used to generate expected signature "on request" from the assertion schedule generating subsystem 124. That is, rather generating expected signatures for each media stream or media stream portion, the expected signature generating subsystem 122 can generate specific expected signatures that are required by the assertion schedule generating subsystem 124.

As explained previously, the assertion schedule generating subsystem 124 may generate an assertion schedule that includes content match assertions, or assertions that require validating that, at specific time instances or intervals, the media frames being output by a media system 106, as expressed by the corresponding observed media frame signatures generated by a probing module 118, are substantially identical to the media frames expected to be output during that time instance or interval (e.g., as expressed by one or more corresponding expected signatures).

Accordingly, in the method 700b, only those expected signatures that are required for validating a content match assertion may be generated by the expected signaturing generating subsystem 122, and on request from the assertion schedule subsystem 124. This, in turn, can reduce the number of expected signatures generated by the expected signaturing generating subsystem 122.

As shown, at 702b, the expected signaturing generating subsystem 122 can access one or more assertion schedules (or copies thereof) generated by the assertion schedule generating subsystem 124. For example, the assertion schedules may be stored on the memory database 108 or server memory 102b and accessed therefrom. In other cases, the assertion schedules may be directly, or indirectly, received from the assertions schedule generating subsystem 124.

At 704b, the signaturing generating subsystem 122 can analyze each assertion schedule to identify one or more content match assertions. For each identified content match assertion, the subsystem 122 can identify the active timecode range for that media content match assertion.

At 706b, the signature generating subsystem 122 may access the referenced media streams in each content match assertion. For example, the assertion schedule may include the media stream identifiers for the media stream identified in the content match assertion (e.g., media stream IDs 804b in FIGS. 8B and 8C) and may use the media stream identifiers to access the relevant media streams in the memory storage 108 or server memory 102b. Otherwise, the subsystem 122 may access a relevant media program schedule 114 to retrieve the appropriate media stream identifier for that media stream.

At 708b, the signature generating subsystem 122 may analyze the media stream frames at the active timecode range identified at act 704b, and may generate one or more expected signatures for media frames in this timecode range At 710b, the signature generating subsystem 122 may output the one or more generated expected signatures. In some cases, the output expected signatures may be stored in the memory database 108. In other cases, the signature generating subsystem 122 may transmit the expected signatures back to the assertion schedule generating subsystem 124. As explained herein, the subsystem 124 may receive the expected signatures, and embed the expected signatures into the corresponding content match assertion, such that each content match assertion includes the expected signatures that are required to validate that assertion condition.

In other embodiments, rather than accessing the entire assertion schedule 702b, the signature generating subsystem 122 may only access a portion of an assertion schedule, e.g., as requested by the assertion schedule subsystem 124. In still other embodiments, the assertion schedule subsystem 124 may transmit discrete requests (e.g., rather than the entire assertion schedule), whereby each request includes the desired or requested expected signatures. For example, each request can identify a media stream, and a time interval range (e.g., expected output time range in the media program schedule) for media frames in that media stream and/or specific media frames in the media stream. Based on this information, the signature generating subsystem 122 may generate expected signatures for the identified media frames.

B. Assertion Schedule Generating Subsystem

Assertion schedule generating subsystem 124 can generate one or more assertion schedules 134. Each assertion schedule 134 may include a timed schedule of assertion conditions that are validated at pre-determined time instances or time intervals. The logical assertions, in the assertion schedule 134, can be used to monitor correct output of media channel streams, at a media system 106.

(a) Example Assertion Schedule

Figure 8A:
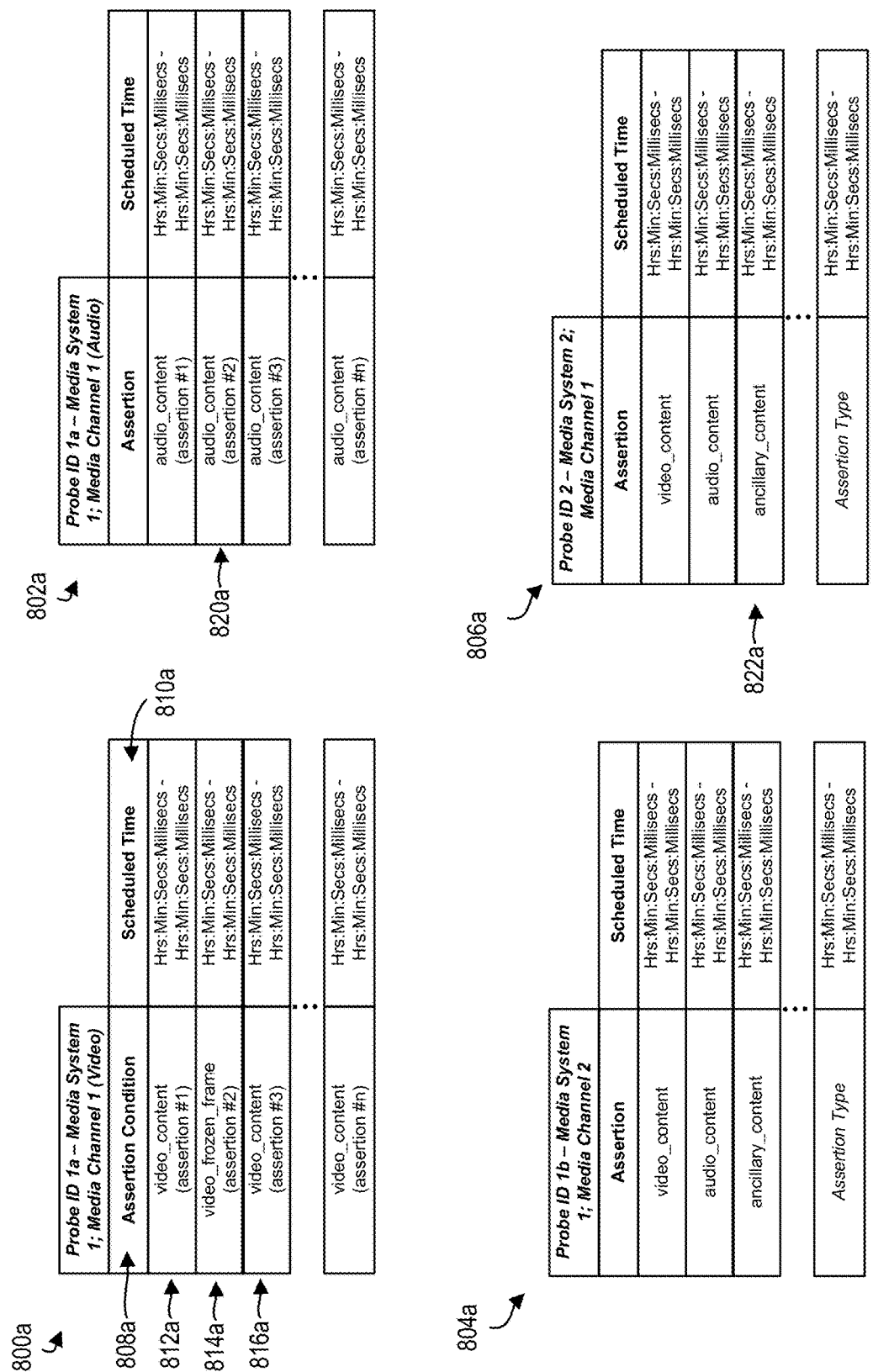
FIG. 8A shows various example media assertion schedules.

Reference is now made to FIG. 8A, which shows various example assertion schedules that may be generated by the assertion schedule generating subsystem 124.

As shown, within each assertion schedule 800a-806a, there may be a number of assertion checks 812a-816a. As used herein, an "assertion check" refers to: (i) an assertion condition 808a, and (ii) its corresponding timecode 810a or timecode range (e.g., assertion check 812a, 814a and 816a in assertion schedule 800a). Accordingly, each assertion schedule may comprise one or more assertion checks.

Different types of assertion checks can be included in an assertion schedule. Two example types of assertions checks include: (i) a content match assertion check, and (ii) a frozen media frame assertion check.

(b) Content Match Assertion Check

Content match assertions are used to confirm that the actual media channel, output from a media system 106, is synchronized with the expected media channel output. A content match assertion can be validated at a specific timecode, or timecode range 810a.

For instance, a content match assertion may state that: within a time interval 810a, a sequence of media frames, output on a channel in media system 106, should be substantially identical to media frames that expected during that time interval. In other words, the content match assertion confirms that the actual content output, on the media system, is substantially identical (e.g., synchronized) with the expected channel content output at a given time instance, or time range.

Validating a content match assertion can involve comparing: (i) the expected signatures for media frames, expected to be output during the timecode range 810a, to (ii) observed signatures for media frames, that are actually output during that time interval. Observed signatures may be generated by a monitoring probing module 118. If there is a substantial match between the two sets of signatures, this may indicate a correct, and synchronized channel play-out by the media system 106.

To further clarify the concept, FIG. 8E illustrates an example 800e for validating a content match assertion.

As shown, the content match assertion may include a number of expected signatures 802*e* (e.g., 802*e*1-802*en*). Each expected signature 802*e* may correspond to a different media frame, or media frame potion. These are media frames, or media frame portions, that are expected to be output by a media system 106 during a given time interval "X".

During actual media channel output, by the media system 106, the probing module 118, associated with the media system 106, may monitor the actual channel stream output. The probing module 118 may generate one or more observed signatures 804*e* (e.g., 804*e*1-804*en*). Each observed signature 804*e* may correspond to a media frame, or a media frame portion, that is actually output by the media system 106 during the same time interval "X".

Accordingly, to validate the content match assertion, each observed signature 804*e* is compared to a corresponding expected signature 802*e*. This comparison is performed, for example, by calculating a similarity metric 806*f*. For example, a similarity metric is calculated between each pair of observed signatures and expected signatures. For instance, a similarity metric is calculated between expected signature 802*e*1 and observed signature 804*e*1. These two signatures should correspond to the same media frame, or media frame portion. For instance, the expected signature 802*e*1 is the media frame that was expected to playout at time Y, while the observed signature 804*e*1 is the media frame that was actually played-out at time Y. Expected and observed signatures can be paired based on timestamp data 408 included in each observed signature file or frame summary 400*c*, 400*c* generated by the probing module 118.

If the similarity level, for each comparison, is above a pre-determined threshold, it is determined that the actual channel output, on the media system 106, is synchronized with the expected channel output, at least for the time interval "X".

(c) Example Similarity Metrics/Scores

Various types of similarity metrics/scores are described herein which can be used to validate a content match assertion. The described similarity metrics/scores can also be used, more generally, in any other case requiring determination of some type of similarity.

In one example, the calculated similarity metric is a hamming distance. That is, a hamming distance is calculated between observed and expected signatures.

In another example, the similarity metric is a Jaccard score. By way of an example, a Jaccard score can be determined between two-bit sequences: A [0110011010] and B [001100110]. For example, bit sequence "A" can be a perceptual hash comprising an expected frame signature, while bit sequence "B" can be a perceptual hash comprising an observed frame signature.

In determining the Jaccard score, the union count of two-bit vectors (A, B) is the count of bit indices where there is a "1" bit in either vector at the index. Further, the intersection of two-bit vectors is the count of bit indices where there is a "1" bit in both vectors at the index. The fraction of the intersection count over the union count determines the Jaccard score. In other examples, the Jaccard score is determined based on the number of indices in either and both bit-vector having a "0" bit.

In various cases, the Jaccard score reflects the expected result more accurately as the union count becomes larger. In some examples, the union count of "0"-bits and the union-count of "1"-bits are initially determined, and the decision to use the Jaccard score over 0s or 1s is based on which has the larger union-count.

In still another example, the similarity metric is a modified Jaccard score. In particular, the use of a Jaccard score can generate a large number of false positives in some specific cases. That is, false positives may be generated when determining a Jaccard score between an expected and observed signature for a given video frame portion, or video frame tile (FIG. 5E). The most common error across the majority of false positives corresponds to perceptually blank tiles having minimal detail.

Accordingly, the modified Jaccard score provides the advantage of eliminating, or at least reducing, such false positives. The modified Jaccard score can be used for observed and expected signatures generated using the perceptual hashing technique described in method 500*e* (FIG. 5E).

In more detail, the modified Jaccard score comprises determining, for any given two video frame tiles, the "coverage" for these tiles. For example, the coverage is determined based on the concatenated digest for that tile (512*e* in FIG. 5E), for both the expected and observed tile signatures. The concatenated digest includes the intensity properties for that tile (e.g., min, max and mean intensity values). Determining the coverage includes determining: (i) a minimum coverage=minimum of (minimum intensity for expected tile signature and minimum intensity for observed tile signature); (ii) a maximum coverage=maximum of (maximum intensity for expected tile signature and maximum intensity for observed tile signature); and (iii) a union distance=maximum coverage−minimum coverage.

Once the coverage is determined, a determination is made as to whether the union distance is below a threshold. If below the threshold, the observed and expected tiles can be considered to be "essentially" blank. Accordingly, in this case, the Jaccard score between the observed and expected tile signatures is overridden as having a union and intersection count equal to the number of pixels in the tile. In this manner, if both expected and observed tile signatures have a small dynamic range (i.e., the difference in the intensity between the darkest pixel and brightest pixel is very small), and both tiles are relatively close to each other in average value, these tiles would be treated as a perfect score.

Otherwise, if the union distance is above the threshold, then a regular Jaccard similar score is determined between the expected and observed tile signatures.

In some examples, the threshold is a user-configurable threshold, which allows users to tweak the threshold for different sensitivities.

In some other examples, the similarity score can comprise a Jaccard score determined for the same tile, over an aggregate of sequential frames. For example, the aggregate union count and intersection count is determined for all observed and expected tile signatures, for the same tile in a video frame, over a sequence of frames, to generate a single union count and a single intersection count for that tile. The Jaccard score for that tile can then be determined based on the aggregate union count and intersection count for that tile.

(d) Example Content Match Assertion Check

FIGS. 8B and 8C show examples formats for video content match assertion checks 800*b*, 800*c*. The video assertion checks can be generated by the assertion schedule subsystem 124.

As shown, each content match assertion 800*b*, 800*c* includes a plurality of data fields. The data fields include, for example: (i) a media assertion type field 802*b*, (ii) an assertion ID field 804*b*, (iii) one or more timecode fields

806*b*, (iv) an assertion condition filed 808*b*; (v) a frame tolerance field 812*b* and/or (vi) a mismatch tolerance field 814*b*.

Media assertion type field 802*b* may include information about the type of media associated with the assertion. For example, this field can indicate whether the assertion is associated with video, audio and/or auxiliary data assertion. The assertion ID field 804*b* may include a unique ID for the assertion check. For example, the unique ID can be a universally unique identifier (UUID). In some example cases, each assertion check 800*b*. 800*c* is referenced by its unique assertion ID 804*b*. For example, an assertion check can be referenced by its assertion ID 804*b* in messages and logs.

Timecode field 808*b* includes assertion timecodes. The assertion timecodes correspond to time instances, or times intervals, when the assertion condition is validated (i.e., the assertion condition associated with the assertion check). For example, the assertion timecodes can be analogous to the scheduled times 810*a* in FIG. 8A. The timecodes 808*b* are expressed relative to the expected output time, of media channel stream frames, on a given media system (e.g., in accordance with a media program schedule).

In some examples, a single timecode is included in the timecode field 808*b*. For example, this is shown in the assertion check 800*b* (FIG. 8B). A single timecode can be used where a content match assertion requires validating only a single media frame, output at a single expected time instance.

In other examples, the assertion check may include a timecode range. This is shown in assertion check 800*c* (FIG. 8C). Timecode field 808*b* may include a start timecode 806*b*1 and an end timecode 806*b*2. The timecode range indicates an active time range for validating the assertion check. A timecode range can be used where the content match assertion requires validating a plurality of video frames played-out over the course of a time interval range.

Each content match assertion may also include the actual assertion condition 808*b* that requires validating. For example, the assertion condition can include one or more expected signatures 810*b* that require validating. To validate the content match assertion, the expected signatures are compared to corresponding observed signatures.

The assertion condition can include one or more expected signature 810*b*. For example, assertion check 800*b* includes a single expected signature. In contrast, assertion check 800*c* includes multiple expected signatures 810*b*1 to 810*bn* (e.g., FIG. 8E). The multiple expected signatures can correspond to different media frames, or media frame portions. These are media frames, or media frame portions, expected to be output by a media system 106, within the timecode interval 806*b*1 to 806*b*2.

An expected signature 810*b* can have different representations. For example, each expected signature 810*b* can be represented by an alpha numeric hash. The alpha numeric hash can be a perceptual hash of a media frame, or media frame portion. In other cases, for expected signatures of audio frames, each expected signature may comprise a value. The value can indicate the number of zero crossings for an audio frame. This type of expected signature 810*b* can be useful for audio content match assertions.

The assertion condition field 808*b* can also be populated using different techniques. In other words, different techniques can be used to populate the assertion condition 808*b* with expected signatures 810*b*.

In one example, the expected signaturing subsystem 122 may pre-generate expected signatures. The pre-generated signatures can be stored on the memory database 108 and/or server memory 102*b*. In this case, the assertion schedule subsystem 124 may access and/or retrieve the pre-generated expected signatures, or copies thereof. The assertion schedule subsystem 124 may then populate the assertion condition field 808*b* with the retrieved, and pre-generated expected signatures.

In more detail, as discussed previously, the expected signaturing subsystem 122 can store pre-generated expected signatures in compact files (e.g., binary string files). The compact files can be prepended, or appended, with header portions. The header portions can include an indication of the media stream associated with the pre-generated expected signature (e.g., a media stream identifier). Accordingly, to locate and retrieve a desired expected signature—assertion schedule subsystem 124 may search within the compact file to identify the header portions. The assertion schedule subsystem 124 may search and retrieve expected signatures associated with media frames expected to be output, by a media system 106, at the timecode 806*b*, or within the timecode range 806*b*. The retrieved signatures are then embedded into the expected signature field 810*b*.

In other examples, assertion schedule subsystem 124 can populate the assertion condition 808*b* "on demand". In these examples, the expected signatures may not necessarily have been pre-generated by the expected signaturing subsystem 122.

For example, as explained with reference to method 700*b* of FIG. 7B—the signaturing generating subsystem 122 may only generate expected signatures "on demand" or "by request". For example, the assertion schedule subsystem 124 may transmit—to the signature generating subsystem 122—a request for generating expected signatures for media frames, or media frame portions. The requested expected signatures can correspond to media frames, or media frame portion, of: (i) a media stream identified in the assertion check 800*a*, 800*b*, and (ii) which are expected to be output within a timecode instance 806*b*, or timecode range 806*b*.

In response to that request, the expected signaturing subsystem 122 may generate the desired expected signatures. The subsystem 122 may then transmit the expected signatures back to the assertion schedule subsystem 124. In other cases, the subsystem 122 may store the expected signatures in the memory database 108 and/or server memory 102*b*, for subsequent retrieval. The assertion schedule subsystem 124 may receive, or retrieve, the expected signatures and embed the expected signatures into the expected signature field 810*b*. This may be another way of populating the assertion conditional field 808*b*.

Assertion checks 800*b*, 800*c* can also include a mismatch tolerance subfield 712*b*, and a frame tolerance field 814*b*.

Frame tolerance subfield 812*b* can indicate the maximum discrepancy between an observed signature and an expected signature during the signature matching (e.g., FIG. 8E). For example, upon validating a content match assertion 800*b*, 800*c*, for each comparison between an expected and corresponding observed signature, a similarity measure is calculated. For example, where the observed and expected signatures are hash values (e.g., perceptual hashes), a hamming distance or a Jaccard score may be calculated between the observed and expected signature hashes. In the case of signatures for audio frames, a cosine similarity measure may be calculated as between the zero-point crossing values comprising the observed and expected audio frame signatures. If the hamming distance, Jaccard score or cosine measure exceeds the frame tolerance (e.g., a frame tolerance '16') for any given comparison, then the content match assertion may fail, subject to the mismatch tolerance.

Mismatch tolerance subfield 714b may indicate the maximum number of allowed mismatches between observed and expected signatures before the assertion check fails. A mismatch may result if the calculated difference (e.g., hamming distance, Jaccard score or cosine similarity), between an observed and expected signature exceeds the frame tolerance (FIG. 8E). For example, if there are eleven expected signatures 810b, and the mismatch tolerance 812b is one ('1'), this indicates a maximum of one allowable mismatch before the content match assertion check fails. As such, the assertion only succeeds if a minimum of ten ('10') out of the eleven ('11') received observed signatures are matched (i.e., below the frame tolerance) to corresponding expected signatures 810b. The mismatch tolerance therefore provides a latitude of flexibility to accommodate various errors (e.g., network transmission errors) that may result in outlier observed signatures that may not provide a perfect match to corresponding expected signatures.

Each of the frame tolerance value 812b and the mismatch tolerance value 814b may be adjustable to achieve a higher or lower level of sensitivity for the media stream monitoring system 116. For example, these values can be adjustable by an operator of an administrator computer 112.

In some cases (not shown), each of the assertion checks may include a probe ID field that can be used to match individual assertion checks to observed signatures generated by certain probes.

While FIGS. 8A and 8C illustrate content match assertion checks 800b, 800c in the case of video stream frames, the same principles may equally apply for other types of media streams (e.g., audio and auxiliary).

For example, a content match assertion for a graphic logo may also include a timecode instance, or timecode range 806b, for confirming the graphic logo was output at the right time by a media system 106. In these cases, the expected signature may correspond to a signature (e.g., a perceptual hash) of the graphic logo.

In other cases, where the content match assertion relates to an audio frame, the expected signature can relate to the number of zero crossings for the audio signal that is expected to output within the timecode interval 806b. In this case, a cosine measure can be used to determine whether the observed and expected signatures are below the frame tolerance. In at least some examples, the content match assertion check can require comparing approximately one hundred and twenty expected zero crossings (e.g., 120 expected audio frame signatures) to corresponding observed zero crossings to determine whether the audio content match assertion is validated. It has been appreciated that one hundred and twenty zero crossings can provide an accurate validation for a content match assertion.

(e) Frozen Media Assertion Check

Referring back to FIG. 8A, another type of assertion check that can be included in an assertion schedule is a frozen media frame assertion (e.g., assertion check 814a). A frozen frame assertions can validate that media frames (e.g., video frames), being output by a media system, are not "frozen", or otherwise, that the same frozen media frame is not being output over time.

As provided herein, a frozen frame assertion may be validated by analyzing consecutive, or substantially consecutive, media frames being output by a media system 106 to determine whether these media frames are substantially identical (e.g., frozen).

FIG. 8F shows an example illustration 800f of a consecutive series of observed signatures 802f1-802fn that can be received from a probing module 118. Each observed signature can correspond to a media frame being output by a media system 106. To determine whether there is an issue with frozen media frames, the consecutive observed signatures can be compared to determine whether they are substantially identical. For example, the observed signature 802f2 (e.g., received at a time "t+1"), can be compared to the observed signature 802f1 (e.g., received at a time "t") to determine their similarity level.

In cases where signatures comprise hashes, the similarity level can be determined by calculating a hamming distance 804f, or Jaccard score, between the two consecutive observed signature hashes.

A similar comparison may be made between the observed signatures 802f3 (e.g., received at a time "t+2") and the observed signature 802f2.

If the similarity level, between consecutive observed signatures, is consistently above a pre-determined threshold (e.g., within 3% of a perfect match)—this may indicate the consecutive media frames being output by the media system 106 are frozen.

(f) Example Frozen Media Assertion Check

Reference is now briefly made to FIG. 8D, which shows an example format for a frozen frame assertion 800d that can be included in an assertion schedule.

As shown, the frozen frame assertion 800d may include: (i) an assertion type field 802d, (ii) an assertion stream ID 804d, (iii) a timecode interval 806d for validating the assertion check, and (iv) the assertion condition 808b.

Similar to the content match assertion checks in FIGS. 8B and 8C, the assertion type field 802d can state the type of assertion check requiring validation (e.g., checking that a video is not frozen). Further, the assertion ID field 804d may specify a unique ID for the assertion check (e.g., a UUID). The timecode range 806d can include a start timecode 862d1 and an end timecode 806d2 for validating the assertion condition. That is, the assertion validates the absence of frozen media frames (e.g., as expressed by their corresponding observed signatures) during the timecodes 806d1, 806d2. In some example cases, at least two to four seconds of consecutive frames are analyzed to validate a frozen media frame assertion. This may be performed to avoid false positives from scene transitions as well as other intentional repeated frames that are included to achieve higher desired frame rates.

The assertion condition 808b can include a number of subfields, including: (i) a distance tolerance 810d, (ii) a failure threshold 812d, and (iii) an outlier tolerance 814d.

Distance tolerance 810d states that minimum level of similarity between two consecutive observed signatures (e.g., received from a probing module 110) for the corresponding media frames to be considered "frozen". For example, the distance tolerance 810d may express the minimum calculated hamming distance, or Jaccard score, between two consecutive observed video frame signatures. If the hamming distance, or Jaccard score, is above the distance tolerance 810d, then it may be determined that the media frames corresponding to the observed signatures are frozen, as their observed signatures are nearly identical.

Failure threshold 812 can specify the maximum (e.g., threshold) number of consecutive frozen frames that may be detected prior to the assertion condition failing. If the number of consecutive frozen frames matches or exceeds the failure threshold 812, and the outlier tolerance 814d is zero, then the assertion condition fails.

Outlier tolerance 814d provides a flexible tolerance for the number of consecutive frames that can be determined as frozen prior to the assertion failing. For example, if the outlier tolerance is greater than zero, then the assertion fails if within failure threshold plus outlier tolerance there are a failure tolerance number of frames. Accordingly, if the failure threshold is '15' and the outlier tolerance is '1', and there are seven consecutive frozen frames, followed by one non-frozen frame, and then eight more frozen frames, then the assertion condition will fail.

Figure 8G:
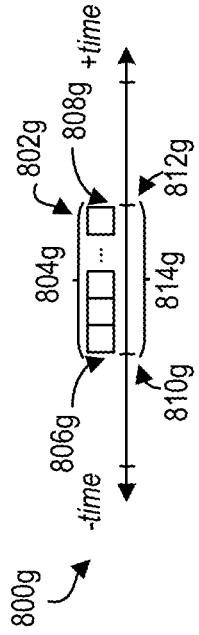
FIG. 8G is an illustration showing an example method for defining a timecode range for an assertion check, according to some embodiments.
Figure 8H:
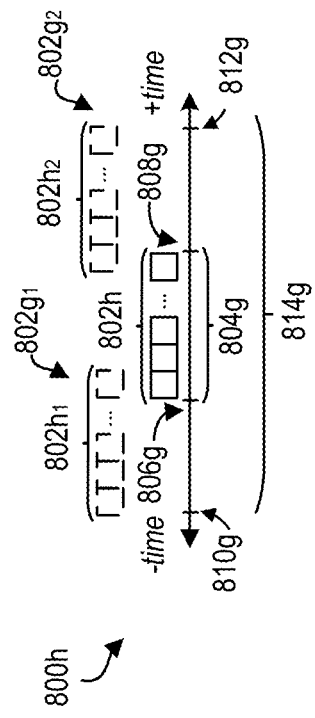
FIG. 8H is an illustration showing an example method for defining a timecode range for an assertion check, according to some other embodiments.
Figure 8I:
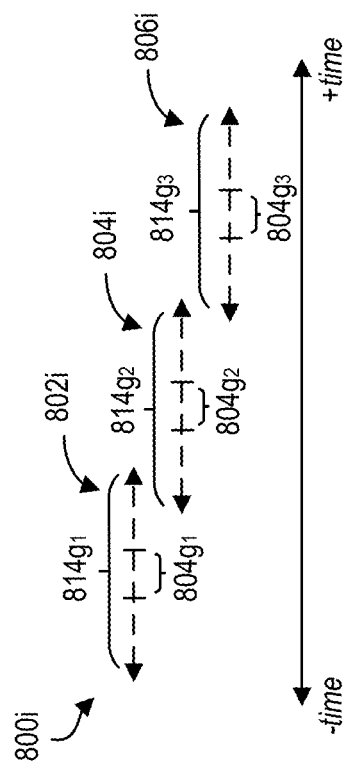
FIG. 8I is an illustration of various example assertion checks having overlapping timecode ranges.

In some embodiments, based on the type of assertion condition that is included in the assertion schedule (e.g., content match assertions or frozen frame assertions), there may be various methods for specifying the timecode interval (e.g., 804b or 804d in FIGS. 8B-8D) for validating the respective assertion check. To this end, FIGS. 8G to 8I illustrate various methods for defining the timecode, or timecode range, for validating an assertion condition in an assertion schedule.

(g) Audio Silence Assertion Check

Still another type of assertion check may be an audio silence assertion check to determine whether the audio is missing in a media segment. This assertion check may require considering the audio peak level for one or more audio frames (also referred to as audio extrema for volume) and ensuring that several contiguous audio frames (e.g., N frames) have an audio peak above a certain pre-determined threshold. In some cases, the audio silence check is validated based on audio maxima/extreme information contained in an observed audio signature file for each audio frame.

(h) Example Methods for Defining Timecode Ranges in Assertion Checks

FIG. 8G illustrates a first example method 800g for defining the timecode range for validating an assertion check. In this example, the timecode range is simply defined as the exact time range the one or more media frames, which are the subject of the assertion check, are expected be output by a media system (e.g., in accordance with a media program schedule).

For example, a sequence of video frames 802g may be expected to be output at a time range 804g (e.g., during the day) between a start time 806g and an end time 808g. In this case, the timecode interval in the assertion check may start and end exactly with the time range 804g. That is, the start timecode 808g may align with the expected media frame output start time 806g, and the end timecode 810g may align with the expected media frame output end time 812g. As such, only observed signature files (FIG. 4A), or observed frame summaries (FIG. 4C), having a timestamp within the timecode range 814g are analyzed to validate the assertion check (e.g., validate a content match assertion).

FIG. 8H illustrates another example method 800h for defining the timecode range for an assertion check, and which may be suited for content match assertions. In this example, the timecode range is a larger or wider time range 814g, than the time range 804g corresponding to when the media frames 802g are expected to be output by a media system 106. For example, the assertion check may have a start timecode 810g that is a few milliseconds before the expected output start time 806g for the media frames 802g and/or an end timecode 812g that is a few milliseconds after the expected output end time 808g for the media frames 802g.

In this example, insofar as the observed signatures are received within the larger or wider timecode range 814g, and otherwise satisfy the assertion check condition, then the assertion check may be successfully validated. For example, if the observed signatures are received at a time range 802h1 or at a time range 802h2, e.g., within the timecode range 814g, and the observed signatures satisfy the assertion check condition, then the assertion check is validated. In particular, wider timecode ranges 814g is in appreciation of the fact that media frames, corresponding to the observed signatures, may not always be output by a media system 106 at the exact expected time range 804g. The wider timecode range 814g accordingly offers a greater degree of flexibility and tolerance for the system to validate an assertion check in an assertion schedule.

As best shown in FIG. 8I, in example cases where wide timecode ranges are used in an assertion schedule (e.g., FIG. 8H), it is possible that separate assertion checks in the schedule may have "overlapping" timecode ranges. For example, an assertion schedule may include multiple assertion checks 802i, 804i and 806i, whereby each assertion check 802i-806i may be in respect of validating output media frames that are expected to output at respective time frames 804g1-804g3. Accordingly, due to the overlapping timecode ranges 814g, more than one assertion check may require validating at a given time instance.

(i) Example Methods for Generating Assertion Checks and Assertion Schedules

Reference is now made to FIGS. 9A to 9E, which show various process flows of example methods 900a-900e for generating assertion schedules by the assertion schedule generating subsystem 124.

In various cases, methods 900a to 900e may allow generating assertion checks in a content-sensitive, or content aware manner. That is, as compared to prior systems that monitor media channel output in a content agnostic manner (e.g., exception-based systems), the current methods allow for selecting and localizing the timing of the assertion checks having regard to the type of media channel streams being output on each media system 106.

a. Example Method for Generating Assertion Checks

Figure 9A:
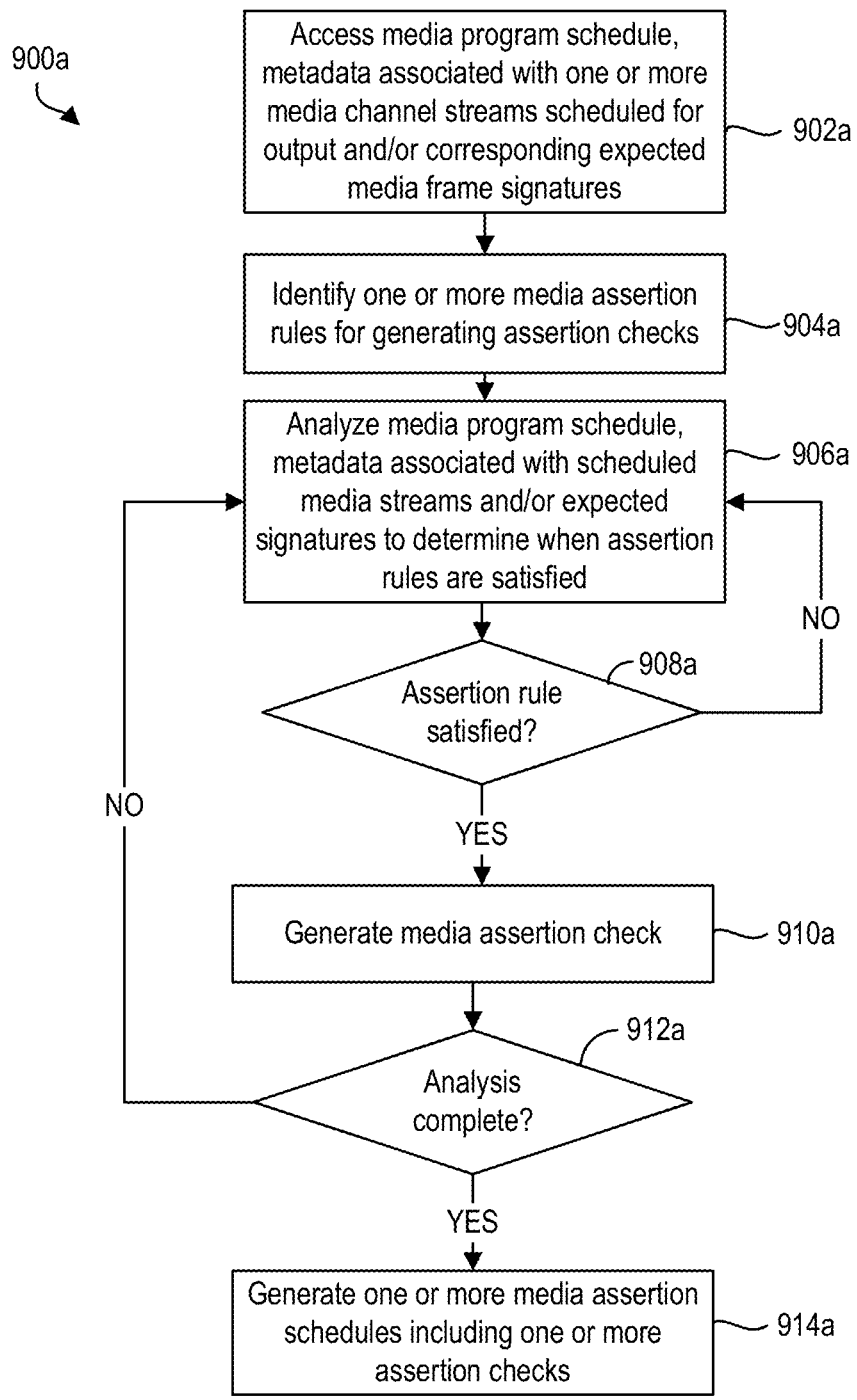
FIG. 9A is an example method for generating a media assertion schedule.

Reference is first made to FIG. 9A, which shows an example method 900a for generating assertion schedules using the assertion schedule generating subsystem 124.

In particular, method 900a provides a high-level method for generating media assertion schedules, while methods 900b-900e (FIGS. 9B-9E) provide example applications of method 900a for specific types of media streams (e.g., video, audio, etc.).

At 902a, the assertion schedule generating subsystem 124 can access: (i) a media program schedule, as well as (ii) metadata associated with one or more media streams that are scheduled to be output on a media channel by a media system (e.g., as indicated in the media program schedule).

In some examples, the assertion schedule subsystem 124 can access the metadata, associated with programmed media streams, by extracting, from the media program schedule 114, media stream identifiers for one or more scheduled media streams. The media stream identifiers may then be used to retrieve metadata associated with the scheduled media streams. For example, the metadata can be retrieved from the memory database 108. The media stream identifiers can be used to reference the appropriate media streams to retrieve relevant stored metadata. For example, the metadata may be embedded in the media streams, or stored separately in association with the media streams.

In at least some example cases, the assertion schedule generating subsystem 124 may also access the actual media streams (or copies thereof). In at least some embodiments, the assertion schedule generating subsystem 124 may also access and/or retrieve expected media frame signatures (or copies thereof) for the one or more media streams. For example, these can be retrieved from the memory database 108, e.g., by querying the memory database 108. For example, the assertion schedule generating subsystem 124 may use a media stream identifier to query compact expected signature files that include header portions that includes the relevant media stream identifier. In other cases, the assertion schedule generating subsystem 124 can query file names associated with the compact expected signature files.

At 904a, the assertion schedule subsystem 124 can determine one or more media assertion rules. Media assertion rules are a set of rules for determining when to generate an assertion check for a given media stream. For example, a media assertion rule may state: generate a video content assertion check when an opening scene is detected in a TV program. FIGS. 9B-9C provide more tangible examples of media assertion rules.

As provided herein, media assertion rules may be applied to one or more of: (i) the media program schedule, (ii) the media streams scheduled for output on a media channel, and/or (iii) the expected signatures that are generated based on these media streams. That is, any of (i)-(iii) can be analyzed, using media assertion rules, to determine at which time instance(s) to generate an assertion check. For example, an opening scene can be detected by analyzing the media program schedule, the actual media streams or corresponding expected signatures.

More generally, different media assertion rules can be used to generate different types of assertion checks. For example, different media assertion rules can be used for generating content match assertions checks versus frozen media frame assertion checks. Media assertion rules may also vary as between different media channels media systems, and media stream types.

In some examples, the media assertion rules may be pre-defined, or pre-determined in the system. For example, an operator of the administrator computer 112 may access the server 102 to input desired media assertion rules. This can be performed via a user interface of the computer 112. The media assertion rules may then be stored, for example, in the server memory 102b and/or memory database 108.

While act 904a is shown as being performed after act 902a, act 902a may also be performed after and/or at least partially concurrently, with act 904a.

At 906a, the assertion schedule subsystem 124 can apply the media assertion rules. For example, the subsystem 124 can analyze (e.g., scan) one or more of: (i) the media program schedule, (ii) accessed metadata associated with relevant media streams (act 902a) and/or (iii) the accessed expected media frame signatures, to determine time instances or ranges where the media assertion rules are satisfied. For example, this can include determining where an opening scene of a TV program is located. In some cases, the assertion schedule subsystem 124 may also analyze the actual media streams (or copies thereof) against the media assertion rule.

At 908a, throughout the analysis at act 906a, the subsystem 124 can determine whether any of the assertion rules are satisfied. If no assertion rules are satisfied at act 908a, then the method 900a may return to act 906a to iterate and otherwise continuing the analysis.

Otherwise, at act 910a, if an assertion rule has been satisfied, then the subsystem 124 can identify the point when the assertion rule was satisfied, and can generate an assertion check at that point.

At 912a, it is determined whether the assertion schedule subsystem 124 has completed its analysis. For example, this may involve determining whether each media program schedule, each scheduled media stream and/or each corresponding expected signature has been analyzed in view of each media assertion rule. If not, then the method 900a can return to act 902a to iterate and continue its analysis. Otherwise, at 914a, the subsystem 918a can generate one or more media assertion schedules comprising the one or more assertion checks.

b. Example Method for Generating Video Assertion Checks

Reference is now made to FIG. 9B, which shows an example method 900b for generating video assertion checks. Method 900b is generally analogous to the method 900a, but illustrates an example application where assertion checks are generated for video streams.

At 902b, the schedule generating subsystem 124 can access one or more of: (i) a media program schedule that includes a schedule of video stream outputs on a media system, (ii) the one or more scheduled videos streams (or copies thereof), and/or (iii) expected video frame signatures that are generated based on the video streams.

At 904b, the subsystem can identify one or more video assertion rules for generating the video assertion checks. The video assertion rules may allow for generating either video content match assertion checks, or frozen video frame assertion checks.

Examples of video assertion rules for generating video content match assertion checks can include determining, based on analyzing a media program schedule (e.g., FIG. 2B), that a video stream is starting or ending. The start and end of scheduled video streams typically align with content transitions in a media program schedule (e.g., the end of a television program, and the start of a new television program). Accordingly, inserting a content match assertion at the start or end of a scheduled video stream may be a timely opportunity to ensure that the video streams, output by a media system 106, are synchronized with the scheduled and expected video stream outputs. In these cases, the content match assertion may include a timecode range corresponding to the expected output time of the first few, or last few, video frames in a given scheduled video stream program (e.g., frames corresponding to beginning or end of the scheduled video stream).

In other cases, it may be desirable to avoid placing content match assertions at the start or end of video program content. For example, episodic title sequences or closing credits, at the beginning or end of an episodic television series, may be substantially identical for each episode of the same television series. Accordingly, while inserting a content match assertion at the start or end of the television episode may be helpful in generally confirming that the correct television series is being output, it may be insufficient to determine whether the correct episode of that television series is being output. In these cases, to ameliorate such concerns, another example video assertion rule, for generating video content match assertions, may involve determining, based on a media program schedule, the midpoint of a video stream (e.g., a mid-point of scheduled video program content).

Inserting a content match assertion at a video stream midpoint may be another opportunity to ensure actual channel output, by a media system 106, is synchronized with the expected output. Further, this may be more suited, for example, for episodic television series. For example, the assertion rule may state that if the media program schedule indicates an episodic television series, then an assertion check may be generated at a midpoint of the corresponding video (or audio) stream. In some cases, determining that a video (or audio) stream corresponds to a television series (e.g., an episodic television show) may be based on analyzing metadata associated with the video/audio stream. It may also be determined directly from information contained in the media program schedule.

Examples for video assertion rules for generating frozen video frame assertion checks may include determining time intervals where the video frame sequence is not in slow motion, or otherwise, where video sequences are not intentionally "still" (e.g., an artistic blackout frame sequences). By placing frozen video frame assertions around these events, the system may not accidentally mistake a slow-motion scene and/or a still frame scene as an error in the channel output.

In some examples, determining that a video frame sequence does not include a slow motion or still frame sequence may involve, for example: (i) accessing pre-generated expected signatures for these video streams, and (ii) determining frame sequences where consecutive expected signatures are substantially similar (e.g., less than 3% difference). In particular, as the expected signatures are generated based on the original video stream frames (or copies thereof), when consecutive expected video frame signatures are substantially similar, this may indicate that the original video stream includes an intentional slow motion or still video frame sequence.

In some cases, to determine the level of similarity between consecutive expected video frame signatures, the assertion schedule subsystem 124 may calculate the hamming distance or Jaccard score between consecutive expected signatures (e.g., similar to FIG. 8F, however using expected video frame signatures), and may determine frame sequences where, e.g., the root mean square distance of distances or L2-normalized Euclidean distance, between consecutive expected signatures is below a pre-determined threshold. This, in turn, may flag sequences of expected signatures that are substantially similar. In some cases, as shown in FIG. 8D, an assertion rule may require that a frozen video frame assertion check be generated where a sequence of expected signatures is not substantially similar (e.g., above a distance tolerance), and the number of similar video frames is below a pre-defined outlier tolerance.

At 906b, it can be determined if a video assertion rule has been satisfied. If not, the method 900b can return to act 906b to continue the analysis. Otherwise, at act 910b, a video assertion check can be generated. The video assertion check may identify the video stream which is the subject of the assertion check, as well as a timecode or timecode range for validating the assertion check (e.g., the time instance or ranges where an assertion rule was satisfied).

c. Example Method for Generating Video Assertion Checks to Address Overlayed Content Reference is now made to FIG. 9C, which shows another example method 900c for generating video content match assertion checks. Method 900c may correspond to act 912b in method 900b.

During media stream output on a media system 106, video frames can be overlayed with various auxiliary graphic data (e.g., logos, advertisements, subtitles, etc.). In some cases, this can generate a false negative when validating a content match assertion check. This is because the expected signatures, corresponding to these video frames, may have been generated based on the original video frames. In particular, the original video frames may not have included the graphic overlay, which was only included later-on during output by a media system 106. In other words, despite the similarity between the actual output video frame and the expected output video frame, the content match assertion may still fail because the observed video frame signature includes artifacts of the overlayed auxiliary graphic data. The overlayed graphic data, however, is not otherwise included in the expected signature of the original video frame.

To obviate this problem, at 902c, the assertion schedule subsystem 124 may identify time instances where auxiliary data streams are present in the media channel output. For example, in FIG. 2A, auxiliary data may be a small graphic logo 202c overlayed in the top right-hand corner of the video frame (e.g., a television channel logo). Subsystem 124 may analyze the media program schedule 114 and identify time instance, or intervals, where an auxiliary data stream is present.

At 904c, in the identified time instance or intervals, subsystem 124 may analyze the properties (e.g., metadata properties) of the auxiliary data streams to determine their type, size and/or placement overtop output video frame.

At 906c, the assertion schedule subsystem 124 may identify one or more "safe regions" in the video frames, which can be selected for generating the video assertion check. A safe region may define a portion of the video frame which does not include the auxiliary overlay data stream.

For example, as best shown in FIGS. 6A-6D, each video frame may be portioned into one or more video frame portions. For instance, video frame 600a may be portioned into: (i) a top portion 602a (e.g., comprising the top ⅔rd of the frame), and (ii) a bottom portion 604a (e.g., comprising the bottom ⅓rd of the frame). Accordingly, if it is known that the auxiliary data streams correspond to subtitle data—the top portion 602a may be selected as the "safe" video frame region. This is because subtitles are often displayed in the bottom third of a video frame. Accordingly, upon generating a video content match assertion check, the subsystem 124 may only include the expected signature for the "safe" top portion 602a.

In other cases, each video frame can be portioned as shown in video frame 600b. For example, each video frame 600b may include a top portion that includes a left upper panel 606b, a center upper panel 602b and a right upper panel 608b. The video frame 600b may also include a lower portion 604b. As graphic and content logos are often inserted (e.g., displayed) on the side panels 606b, 608b—when a graphic or logo assertion is detected, the assertion scheduling subsystem 124 may select the center panel 602b or lower portion 604b for the safe video frame portion for the content match assertion check.

Other techniques for portioning a video frame are also shown in the video frame 600c of FIG. 6C, and video frame 600d of FIG. 6D.

For example, the video frame 600c includes a central portion 602c, top and lower corner portions 608c, 610c respectively where graphic content may generally appear, as well as an upper longitudinal portion 606c and a lower longitudinal portion 604c where ribbon advertisement content and/or subtitles also commonly appear. By increasing the number of video frame portions as shown in FIG. 6C, more flexibility is afforded in selecting an appropriate video frame safe region, depending on the type of overlay auxiliary data streams.

Video frame 600d includes still yet further video frame portions, and comprises four quadrants 602d, 604d, 606d and 608d, whereby each quadrant is, itself, comprises four other quadrants 602d1-602d4, 604d1-604d4, 606d1-606d4 and 608d1-608d4. In this case, if a logo is expected to appear in the quadrant 604d2, then the content match assertion may be validated using the expected signatures for the quadrants 602d, 606d, 608d as well as 604d1, 604d3, 604d4 (e.g., the areas around the quadrant 604d2). While the example in video frame 600d illustrates a grid of 4×4 overlapping regions, in other embodiments, any dimension grid of non-overlapping regions may be employed (e.g., a grid of 6×10 regions).

To this end, the signature generating subsystem 122 may pre-generate multiple expected signatures for one or more video frame portions (e.g., FIGS. 6A-6D). For instance, as discussed previously, subsystem 122 may generate a compact block of expected signatures. The compact block may include one or more subblocks for each video frame. Each subblock may include one or more expected signatures for different portions of that same video frame. For example, a subblock may include a sequence of expected signatures corresponding to: (i) the top left, top right, and center portions of the same video frame, as well as (ii) the expected signature for the entire video frame.

When generating an assertion check, the assertion schedule subsystem 124 may access a relevant subblock for a video frame, and retrieve only the expected signature for the safe regions (e.g., top frame portion) 602a. These expected signatures can then be inserted into the assertion check at 808b.

To facilitate retrieval of "safe" expected signatures by subsystem 124, the order (or sequence) of expected signatures in each subblock may be consistent as between subblocks. For example, each subblock may include the signatures for the top left, right and center portions of a video frame, and in a pre-defined sequenced order (e.g., [Top Signature; Left Signature; Right Signature; Center Signature]). Accordingly, each subblock may have a consistent and known order of expected signature corresponding to media frame portions. This, in turn, allows system to automatically identify where—in each subblock—to extract a relevant expected signature for a safe region.

In other examples, the signature generating subsystem 122 may not necessarily pre-generate the expected signature for all video frame portions. Rather, the assertion schedule subsystem 124 may request the expected signature "on-demand" from the signature generating subsystem 122. For example, the subsystem 124 can request only the expected signatures for the "safe regions". Once received, the subsystem 124 can embed these signatures into the assertion check 800c.

In some more detail, to generate content match assertions using only "safe" expected signatures—the assertion schedule subsystem 124 may generate an assertion check as shown in FIG. 8C. The assertion check 800c may include the expected signatures corresponding to the one or more safe regions.

Probing modules 118 may also generate observed signatures 118 for one or more video frame portions. Accordingly, to validate the content match assertion 800c, the observed signatures for the safe regions (e.g., top portion 602a in FIG. 6A) may be compared to corresponding "safe" expected signatures, embedded in the assertion check.

To facilitate this comparison, the expected signatures in the assertion check may be ordered according to a pre-determined order. For example, within an assertion check 800c, first expected signature 810b1 may always correspond to a "safe" top left portion a video frame, second expected signature 810b2 may always correspond to a "safe" top right portion of a video frame, etc. The system may have knowledge of this pre-defined order. Accordingly, system can rely on this pre-defined order to always compare the correct "safe" expected signature, in each assertion check, to the correct corresponding received observed signature.

To this end, "safe" regions in a video stream can be selected using various techniques. For example, "safe" regions can be determined by analyzing a media program schedule. The media program schedule can assist in determining the size and placement of the auxiliary data stream. In this manner, the system can select "safe regions" that avoid the auxiliary data stream.

For example, the media program schedule may include identifiers for auxiliary stream identifier scheduled for output (e.g., graphics, logo or subtitles). Further, the assertion schedule subsystem 124 may have pre-determined knowledge of different properties of different types of auxiliary data streams. For example, if the auxiliary stream identifier, in the media program schedule, references program subtitles: subsystem 124 may immediately determine that subtitle information always appears in the lower third of a video frame. Accordingly, the assertion scheduling subsystem 124 can select video safe regions which that avoid the lower third of the video frame. Expected signatures, for those video safe regions, can then be incorporated into the assertion check. In other examples, where auxiliary stream identifiers—in the media program schedule—references a channel logo, the system may have pre-determined knowledge that channel logos always appear in a top right corner of the video frame. Accordingly, video safe regions can be selected on this basis.

Alternatively, or additionally, "safe" regions can be determined by analyzing metadata. For example, the size and placement of the auxiliary data stream can be ascertained from metadata associated with the auxiliary stream itself, rather than from the media program schedule.

For example, the system can extract the auxiliary data stream identifiers from the media program schedule, and the system can retrieve metadata associated with the actual auxiliary data stream. For example, this metadata can be retrieved from memory database 108. In the memory storage, the metadata may be embedded in the stored auxiliary data stream, or otherwise stored separately. Subsystem 124 may then analyze the auxiliary metadata to determine various properties of the auxiliary data (e.g., location coordinate overlay placement on the video frame, size, etc.). In other cases, it may be possible to directly analyze the actual auxiliary data stream, or a copy thereof, to ascertain relevant properties (e.g., the size and placement information of a graphic logo).

At 908c, the video assertion check is generated. The video assertion check includes the expected signatures of the identified, or selected, safe video frame regions for each video frame. The expected signatures correspond to video frame regions that satisfy the video assertion rule (908c).

d. Further Example Method for Generating Video Assertion Checks to Address Overlayed Content Method 900d of FIG. 9D provides one example method of obviating problems with overlay auxiliary data streams. This method relies on selecting video safe regions. However, other techniques are also available for obviating problems with overlay auxiliary data streams. The techniques can be used in addition to, or in alternative to, method 900d (FIG. 9D).

In at least one example, a further technique can involve simply including all expected signatures in the assertion check, for all video frame portions (FIGS. 6A-6D). That is, no differentiation is made at the outset between safe and non-safe video frame regions or portions.

To further clarify this concept, the assertion schedule subsystem 124 may directly include, into the content match assertion, the expected signatures for each (or one or more) video frame portion of a video frame. For instance, if a content match assertion is generated for the video frame 600c of FIG. 6C—the subsystem 124 may include, in the assertion check, the expected signatures for all video frame portions 602c-610c.

To validate the content match assertion, the system 124 may compare each video frame portion, in the expected signatures, to the corresponding received observed signatures (e.g., generated by a probing module 118). The system 124 may then use the comparison to localize where the auxiliary data overlay is located in the observed video stream.

By way of further example, in FIG. 6C, the expected and observed signatures for the entire video frame 600c may not initially match owing to the presence of a logo in the bottom right corner 610c. Rather than generating a failed content match assertion, the system can localize the area of discrepancy by comparing the expected and observed signatures for various video frame portions 602c-610c. For example, the system can determine that the signatures (e.g., expected and observed) for the central region 602c match, but the signatures (e.g., expected and observed) for the bottom right corner portion 610c do not match. Accordingly, this may indicate the potential presence of a logo or image icon in the bottom right corner 610c.

To confirm this suspicion, the system may also reference the relevant media program schedule, which may indicate that a logo or image icon is expected to be output on the channel at the bottom right corner during the time the assertion is validated. Therefore, despite an initial perceived discrepancy between the expected and observed signatures for the entire video frame 600c, the content match assertion may still be validated by confirming that the discrepancy results from an ancillary data stream. This provides an alternative method to generating safe video regions ahead of time, as discussed in method 900c (FIG. 9C).

A further example technique for obviating problems with overlay auxiliary data streams can rely on high-to-low localization of error discrepancies.

For example, using the video frame 600d of FIG. 6D, the system may initially compare the expected and observed signatures for the entire frame 600d. If a discrepancy is detected, the system may then compare the expected and observed signatures for each quadrant 602d-608d to further localize the area of discrepancy. If the discrepancy is only evident, for example, in the top right quadrant 604d, the system may then compare the expected and observed signatures for each sub-quadrant 604d1-604d4 to further localize the discrepancy to one sub-quadrant. The system may then determine, for example, that the expected and observed signatures only fail to match for the top sub-quadrant 604d4.

In this manner, a hierarchy of overlapping regions are analyzed in sequence to also localize the area of discrepancy. In other embodiments, rather than initially comparing each quadrant 602d-608d to localize the error to a specific quadrant, the system may simply localize the error by immediately commencing to compare each sub-quadrant in turn.

In still other examples, rather than generating safe video regions (e.g., method 900c), or performing signature comparisons for video frame portions (e.g., as discussed above), the subsystem 124 may simply avoid inserting content match assertions at points when auxiliary data streams are expected to be output. In these examples, the video assertion rule can comprise: (i) initially, analyzing the media program schedule or auxiliary data metadata to determine time instances, or ranges, where there are no scheduled auxiliary data; and (ii) generating a video content match assertion only during these time instances or ranges.

Still yet a further example technique for detecting, and obviating, problems with auxiliary data overlays involves generating signatures, over multiple video frames, for the same video frame portion.

For example, assuming a sequence of video frames: $A[0]$, $A[1]$, $A[2]$, ..., $A[n]$, wherein $A[i]$ is the pixel data of the $i^{th}$ video frame. Further, assuming the expected signature of a video frame $A[i]$ is expressed as $f(A[i])$.

In this example, the expected signature $f(A[i])$ is determined according to method 500e (FIG. 5E). Accordingly, the expected signature $f(A[i])$, for the $i^{th}$ video frame, includes an aggregate, of the concatenated digests, for one or more tiles of the video frame. For instance, the perceptual hash can be expressed as: [Digest of tile #1; digest of tile #2; etc.]. Accordingly, $f(A[i], j, k)$ as the tile digest of the $i^{th}$ frame, in row j and column k.

Given a tile (j, k), and a sequence of frames $0, \ldots, n$, a new digest is generated concatenating the digest of the same tile, across multiple frames. This is referenced herein as an "expected tile sequence digest" (ETSD). For example, an "expected tile sequence digest" (ETSD)=$[f(A[0], j, k); f(A[1], j, k); \ldots; f(A[n], j, k)]$. The same expected sequence digest can be determined for other tiles in the video frames.

On the other end, for the observed/monitored video frames—a similar digest can be determined. This is referenced herein as an "observed tile sequence digest" (OTSD). For example, an example observed tile sequence digest (OTSD)=$[f(B[0], j, k); f(B[1], j, k); \ldots; f(B[n], j, k)]$.

For a give tile with position j, k—a similarity score is determined between the ETSD and OTSD for that tile. For example, the similarity score for a given tile may be expressed as g(ETSD, OTSD). This score may describe how well the localized tile (j, k) matches across the expected and observed sequences. The same similarity score can be determined for other tiles. The similarity score can be determined based on a hamming distance between ETSD and OTSD, a Jaccard score, etc.

Accordingly, if the expected sequence has a logo (e.g., a logo in the top-right corner), and the observed sequence is identical but is missing this logo, then a failure would be observed in the tile containing the logo, but the score of the entire frame is not spoiled. Accordingly, the tile containing the logo can be identified, localized and possibly ignored for the purposes of the content match validation.

In some examples, tiles that include auxiliary data (e.g., logos) may be identified in advance, such that a similarity metric is not computed between these tiles.

For example, to improve the perceptual digest computation accuracy when a superimposed assert is inserted during live playout, the following method may be employed: (a) first, the superimposed asset may be initially available as an opaque or transparent graphic image, or it may be otherwise available as another video or a sequence of instructions. As there are many forms the auxiliary asset may take, the asset is initially rendered onto a solid background into a new video. The solid background contrasts with the asset being rendered; (b) when computing the perceptual digest, as shown in FIG. 5E, for each frame of video, a determination is made as to which tiles are still blank because the difference between the maximum and minimum intensities (stored in tile metadata) is "0", and the mean value should match the solid background. The mask of which tiles are blank are saved/recorded by this definition.

Accordingly, when comparing perceptual digests when it is known that an overlay asset is present, only the scores of tiles which are marked in the mask are computed. Accordingly, the content match assertion can be validated on this basis.

In some cases, an improvement involves repeating steps (a) and (b) for two different solid backgrounds (e.g., black and white), and subsequently taking the union of the masks for each frame. This provides a more accurate mask when the asset has low contrast with one of the solid backgrounds.

e. Example Method for Generating Audio Assertion Checks

Reference is now made to FIG. 9D, which shows an example method 900d for generating audio assertion checks. Method 900d is generally analogous to the method 900a, but illustrates an example application where assertion checks are generated for audio streams.

At 902d, the assertion schedule subsystem 124 can access one or more of: (i) a media program schedule for programmed audio streams, (ii) the metadata associated with one or more programmed audio streams, and/or (iii) expected audio frame signatures generated for the accessed audio streams. In some examples, the assertion schedule subsystem 124 may also access the actual programmed audio streams (or copies thereof).

At 904d, the subsystem can identify one or more audio assertion rules for generating the audio assertion checks. The audio assertion rules may allow for generating either audio content match assertion checks, or muted (or missing) audio assertion checks.

Examples of audio assertion rules for generating audio content match assertions can include, for example, determining time instances or intervals during the output of the audio stream where dialogue is present (e.g., dense spoken dialogue). By selecting time intervals where audio dialogue is present, the audio content match assertion can be used to determine, for example, whether a media system is outputting the correct audio language. This may be particularly relevant where a media system is broadcasting multi-lingual channels. Determining whether a media system is outputting the correct audio language may not be otherwise possible where the audio match assertion is inserted during periods of muted audio or where the audio stream includes music, or other non-dialogue sounds.

In some examples, determining if dialogue is present may involve analyzing the corresponding subtitle or close caption data for each audio frame. If the subtitle or closed caption data indicates an area of dense spoken dialogue, the corresponding audio frames may be determined to satisfy the audio assertion rule. In various cases, the subtitle or close caption data may be timestamped to allow correlating this data to the correct audio frame(s) to correctly time the audio content match assertion.

Examples of audio assertion rules for generating muted (or missing) audio frame assertion checks may include, for example, determining time instances or intervals where the audio stream is not muted or is not otherwise "monotonic". Avoiding assertion checks at these points may prevent false negatives when validating a frozen audio frame assertion.

In some examples, determining time instances or intervals where the audio frames are not muted or monotonic may involve determining the dissimilarity between consecutive expected audio frame signatures (e.g., similar to FIG. 8F, however using expected audio frame signatures), and further determining whether the dissimilarity is below a predetermined threshold. For example, where the expected audio frame signatures include the number of zero-crossings per audio frame, this may involve calculating the cosine similarity between consecutive expected audio frame signatures, and determining whether the cosine similarity is above a pre-determined threshold. If the cosine similarity value is above a pre-determined threshold, then the group of audio frames may be rejected for a muted (or missing) audio frame assertion check, as this may indicate that the corresponding audio frames are expected to be substantially similar. In other cases, the root mean square (RMS) distance of distances between consecutive expected audio frame signatures may also be calculated and determined if also above a pre-determined threshold.

At 908d, it is determined whether or not any audio frames, of the audio stream, satisfy one or more audio assertion rules. If not, the method 900d can return to act 906d to continue the analysis. Otherwise, at 910d, the subsystem 124 performs an analysis to determine the time instances or ranges where the audio stream frames, that satisfy the audio assertion rules, are expected to be output by a given media system 106. For example, this is determined by reference to a corresponding media program schedule that includes the expected output time of a given set of audio frames. At act 912d, an audio assertion check can be generated and having assertion timecodes that correspond to the identified time instances or intervals identified at 910d.

f. Example Method for Generating Auxiliary Data Assertion Checks

Reference is now made to FIG. 9E, which shows an example embodiment of a method 900e for generating auxiliary data assertion checks. Method 900e is generally analogous to the method 900a, but illustrates an example application where assertion checks are generated for auxiliary data streams.

In this example, the identified auxiliary data assertion rules at 904e may correspond, for example, to determining, based on the media program schedule, the time instances or intervals when the auxiliary data streams are expected to be output on a media channel. The content match or frozen media assertion checks may then be inserted at these points.

In generating at least the content match assertion checks, the assertion schedule subsystem 124 may insert, into the content match assertion, the expected signatures (e.g., perceptual hashes) for graphic, logo or subtitle that are expected to be output on a media channel.

The content match assertion can be validated by comparing the expected signatures to observed signatures, generated by a probing module 118, of the video frame portions that are expected to include the auxiliary data. For example, if a graphic logo or icon is expected to be output at a top right corner of a video frame (e.g., 608c in FIG. 6C), the expected signature of that graphic logo or icon may be compared to an observed signature generated of the video frame portion 608c.

In other cases, in addition to or in the alternative to transmitting observed signatures of relevant video frame portions, the probe 118 may transmit a full video frame (e.g., a JPEG frame image) at a given time instance or interval. The full video frame may be analyzed to detect the presence of a graphic or logo (e.g., via traditional computer vision or image analysis techniques). In other cases, if the auxiliary data is expected in a particular portion of the video frame, the video frame portion may be extracted and analyzed. In still other cases, the probe 118 may be configured to only transmit the relevant video frame portion.

g. Generating Multiple Assertion Schedules

Referring now back to FIG. 8A, in at least some examples, the assertion schedule subsystem 124 may generate multiple assertion schedules. For example, the subsystem 124 may generate different assertion schedules for different media channels. For example, a single media system 106 may output more than one media channel, with each media channel having its own media streams that are output in accordance with that channel's media program schedule. Accordingly, to ensure correct output of media streams on each separate media channel, the subsystem 124 can generate different assertion schedules for the different media channels. Each assertion schedule 114 can accordingly be used to validate correct media stream output on the respective media channel. For example, assertion schedules 800*a* and 802*a*, 804*a* may be associated with output on a first media channel, while assertion schedule 804*a* may be associated with output on a second media channel.

Subsystem 124 may also generate separate assertion schedules for output of media streams on different media systems 106. For example, assertion schedules 800*a*-804*a* may correspond to a first media system 106, while assertion schedule 806*a* may correspond to a second media system 106.

In some example, separate assertion schedules may even be generated for the same media channel, but for output on separate media systems 106. For instance, assertion schedules 800*a* and 800*b* may be associated with a first media channel being output on a first media system, while assertion schedule 806*a* may also be associated with a first media channel but being output on a second media system 106. This is because on separate media systems 106, the same media channel may output media streams at different times.

For example, due to transmission or network delays, the expected media channel stream output, on a second media system 106*b*, may be slightly delayed relative to the expected media channel stream output, on a first media system 106*b* located upstream from the second media system 106*b*. The separate assertion schedules may accordingly reflect the different expected output times for media channel streams on separate media systems.

In other example cases, downstream media systems (e.g., associated with local or regional broadcasters) may add new content to a channel's media program schedule to reflect local or regional television content. This new content may not be reflected in the channel's media program schedule for an upstream media system (e.g., associated with international or national broadcasters). Accordingly, this may be yet another reason for generating different assertion schedules for the same media channel output on different media systems.

In some example cases, each assertion schedule may be associated with a different probing module 118 (or different probe IDs). For example, different probing modules 118 may couple to different media systems 106, and may be designated to monitor different media channel outputs on these media systems. By associating different assertion schedules 114 with different probing modules 118, the system can receive observed signature data from a probing module 118, and can pair the received observed signature data to a corresponding assertion schedule.

For instance, in the illustrated example, the assertion schedules 800*a*, 802*a* may be associated with a first probing module 118 (e.g., a probe ID 1*a*) that is designated to monitor output of first media channel streams on a first media system. Further, assertion schedule 804*a* may be associated with a second probing module 118 (e.g., a probe ID 1*b*) designated to monitor output of second media channel streams also on the first media system. Accordingly, if an observed signature is received having a probe ID 1*a*, it may be paired for validating the assertion schedules 800*a* or 802*a*. Alternatively, if an observed signature is receiving have a probe ID 1*b*, it may be paired for validating the assertion schedule 804*a*.

In various example cases, the association (or pairing) of assertion schedules with different probing modules 118 may occur based on the system's beforehand knowledge of each: (i) probing module 118 located in the system 110, (ii) the probe ID of that probing module 118, as well as (iii) which media channels and/or media systems that probing module 118 is monitoring.

c. Signature Analysis Subsystem

The signature analysis subsystem 126 is configured to: (i) monitor the media channel stream output by various media systems 106 (e.g., as expressed by one or more received observed media frame signatures), and (ii) to validate the media assertion checks included in each media assertion schedule 114.

In some examples, validation of assertion checks, by the signature analysis subsystem 126, may occur in real-time or near real-time. For example, the subsystem 126 can validate assertion checks based on observed media frame signatures received from the probing modules 118, in real-time or near real-time.

In other examples, validation of assertion checks may occur after the fact. For example, signature analysis subsystem 126 may receive observed media frame signatures, from one or more probing modules 118, and may cache or archive the observed signatures (e.g., in the memory database 108). At a subsequent point in time, the observed signatures may be retrieved from storage, by subsystem 126, and used to validate one or more assertion checks in an assertion schedule. As the observed signatures are typically timestamped (e.g., FIGS. 4A and 4C), the subsequent validation of assertion checks is possible by cross-referencing the observed signature timestamps, to the assertion schedule timecodes or timecode ranges.

(a) Example Method for Validating Assertion Checks

Figure 10A:
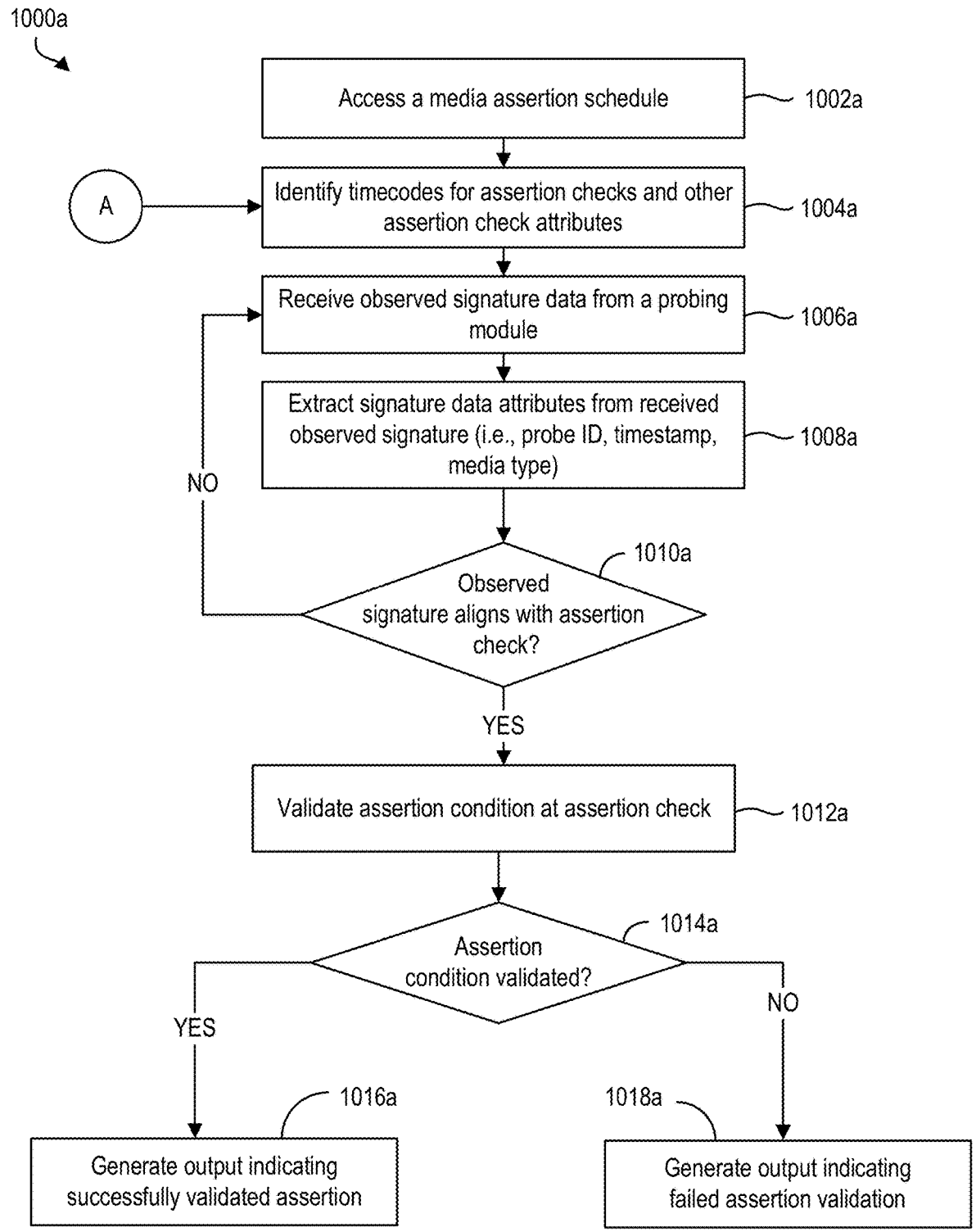
FIG. 10A is an example method for validating assertion checks, according to some embodiments.

Reference is now made to FIG. 10A, which shows an example method 1000*a* for validating assertion checks in a media assertion schedule.

Method 1000*a* can be performed, for example, by the signature analysis subsystem 126 executing on the server processor 102*a*. Method 1000*a* assumes a simple example where each assertion check includes a single timecode, rather than a timecode range. For example, method 1000*a* can validate a simple content match assertion which requires comparing a single expected media frame signature, to a single received observed media frame signature, at a single timecode instance.

As shown, at 1002*a*, the signature analysis subsystem 126 can access one or more media assertion schedules 114. For example, the subsystem 126 can receive media assertion schedules 114, or copies thereof, directly from the assertion schedule generating subsystem 124. In other cases, the subsystem 126 can retrieve previously generated media assertion schedules 114, e.g., from the memory database 108.

As explained previously, with reference to FIG. 8A, each media assertion schedule 114 may be associated with a different probing module 118. Different probing modules 118 may be designated to monitor one or more media channel outputs, on one or more media systems 106.

Further, each media assertion schedule 114 can include one or more assertion checks, each assertion check including: (i) an assertion condition requiring validating in respect of a specific media channel stream (e.g., content match or frozen media frame assertions), as well as (ii) timecode instances for validating that assertion.

At 1004*a*, the signature generating subsystem 126 can accordingly identify and extract—from the media assertion schedule 114—the timecode instances (e.g., Hours:Minutes: Seconds: Frames) for validating each assertion check in the assertion schedule.

At 1006*a*, the signature generating subsystem 126 can receive one or more observed media frames signatures 120 from one or more probing modules 118. For example, the subsystem 126 may monitor for any received observed signatures. In some cases, as shown in FIG. 4A, the observed media frame signatures 120 may be packaged in observed signature files 400*a*. In other cases, as shown in FIG. 4C, multiple observed media frame signatures 120 may be packaged into one or more observed frame summaries 400*c*.

In some examples, where the probing modules 118 are configured to automatically transmit observed media frame signatures—at act 1006*a*, the signature analysis subsystem 126 may simply "wait" to receive the observed signatures from the probing modules 118 (e.g., the signature analysis subsystem 126 may "monitor" to receive any observed signatures).

For example, the probing modules 118 may generate and transmit the observed signatures, in real-time or near real-time, as the media channel streams are output by a media system 106. In other cases, the probing modules 118 may maintain a copy of an associated assertion schedule, and may parse the assertion schedule to determine the relevant times for generating observed signatures for specific media streams. Accordingly, the probing module 118 may automatically generate and transmit observed signatures to the signature analysis subsystem 126 at the relevant times and for the relevant media stream frames.

In other examples, the probing modules 118 may only generate the observed signatures "on request" from the signature analysis subsystem 126. For example, at a time instance, or interval corresponding, to an assertion timecode, the signature generating subsystem 128 can transmit a request to a relevant probing module 118 to generate and transmit observed signatures in relation to the relevant media channel stream.

At 1008*a*, the signature analysis subsystem 126 can analyze the received observed media signature data to extract one or more observed signature data attributes.

For example, at 1008*a*, the signature analysis subsystem 126 may extract the timestamp data 408, probe ID 410, as well as the media type definition 412. In some cases, where an observed frame summary is received—the media type definition 412 may be automatically determined based on frame section that retains the observed signature (e.g., 420*a*-420*d*), as previously discussed.

Observed signature data attributes, extracted at 1008*a*, may allow the signature analysis subsystem 126 to match (e.g., pair) the received observed media signatures, to corresponding assertion schedules 114.

For example, the extracted probe ID 410 can be used to match the received observed signatures to an assertion schedule 114 (or assertion checks) associated with that probe ID (e.g., an assertion schedule associated with media channel streams monitored by a probe having the probe ID).

Still further, the extracted timestamp and media type definition (e.g., video, audio, etc.) can also assist the media analysis subsystem 126 in identifying the relevant assertion check in the assertion schedule to validate.

At 1010*a*, the signature analysis subsystem 128 can identify any relevant assertion checks, within the media assertion schedule 114, that require validation using the received observed signature.

For example, for a given probe ID, the subsystem 128 can determine whether there are any relevant associated assertion schedules. If an assertion schedule is identified, the subsystem 128 can determine—based on the extracted media type definition—if there are assertion checks that relate to that media stream type (e.g., video, audio or auxiliary data assertion checks). The subsystem 128 may then determine if any of these assertion checks have assertion timecodes that aligns with the extracted timestamp from the observed signature data. In at least some examples, each of the media analysis system 116 and the probing modules 118 may be locked or synchronized (e.g., locked to a PTP clock) to allow for comparing timestamps to timecodes.

At 1010*a*, a determination is made as to whether any assertion checks have been identified relating to the observed signature. If not, the method 1000*a* may return to act 1008*a* to continue receiving observed signature data from one or more probing modules 118.

Otherwise, if a relevant assertion check has been identified at act 1010*a*—at act 1012*a*, the assertion check can be validated. For example, in the case where the assertion check is a content match check, then the assertion check is validated by determining a similarity metric between the observed media frame signature and the corresponding expected media frame signature included in the assertion check (e.g., 806*f* in FIG. 8E). If the similarity metric is above a pre-determined threshold, this may be sufficient to validate the assertion check.

In at least some examples, the similarity metric may be determined by calculating a hamming distance or Jaccard score between the observed and expected video frame signature, or calculating a cosine similarity between observed and expected audio frame signature.

At 1014*a*, it is determined whether the assertion check is validated. If the assertion check is validated, then an at act 1016*a*, an output of the successful validation can be generated. Otherwise, if the assertion check is not validated, then at act 1018*a*, an output of failed validation can be generated.

In some example cases, the outputs generated at 1016*a* and/or 1018*a* can be event notifications transmitted to an operator of an administrator computer 112 (e.g., event signal 138), and displayed, for example, on the computer display 112*a*.

Figure 10B:
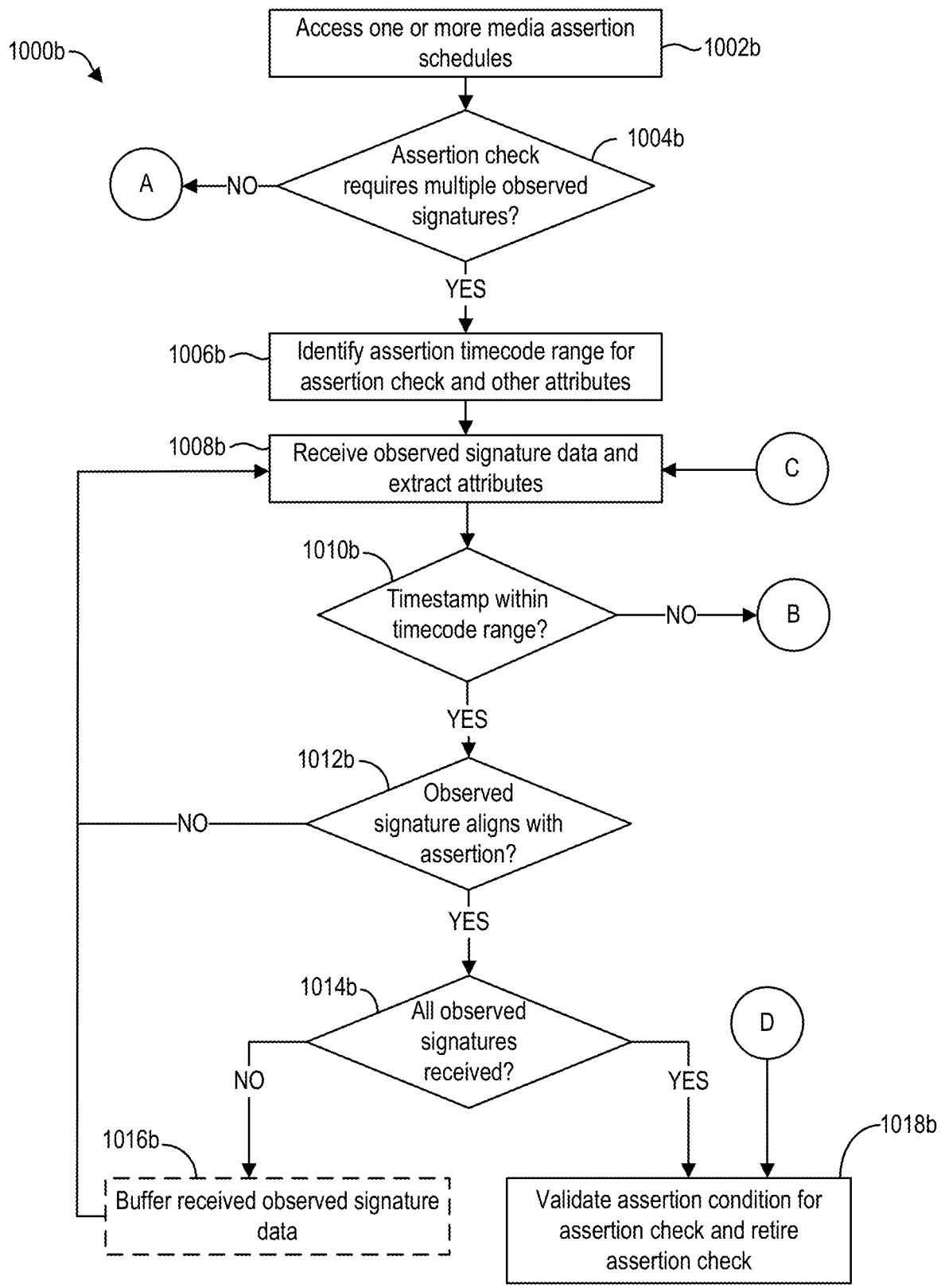
FIG. 10B is an example method for validating assertion checks, according to some other embodiments.
Figure 10C:
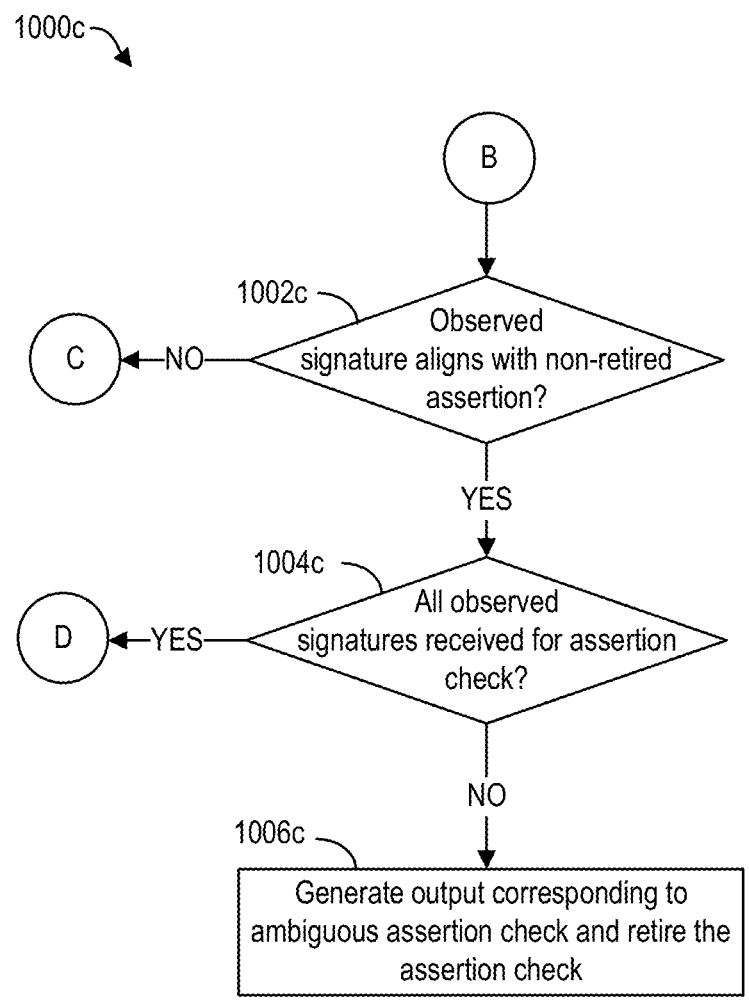
FIG. 10C is an example method for validating assertion checks, according to still some other embodiments.

Reference is now made concurrently to FIGS. 10B and 10C, which show example embodiments of methods 1000*b* and 1000*c* for validating assertion checks. Methods 1000*b* and 1000*c* can be performed, for example, by the signature analysis subsystem 126 executing on the server processor 102*a*.

In comparison to the method 1000*a*, methods 1000*b* and 1000*c* allow for validating assertion checks requiring more than one observed media frame signature. For example, this can include content match assertion checks that require comparing more than one observed signature to more than one expected signature within a timecode range. In other example cases, this may also include validating a frozen media frame assertion, whereby more than one observed signature is analyzed within a timecode range.

As shown, analogous to act 1002*a*, at 1002*b*, the signature analysis subsystem 126 may access one or more media assertion schedules, e.g., generated by the assertion schedule subsystem 124.

At 1004*b*, in analyzing the assertion checks in the assertion schedule, it is determined whether the assertion checks require multiple observed signatures to validate the assertion condition.

For example, this can be determined by determining if the assertion check includes a timecode range for validating the assertion (e.g., rather than a single timecode instance). This, in turn, may indicate a range for receiving more than one observed media frame signature. In cases where the assertion check is a content match assertion, if the assertion check includes more than one expected signature for validation, this may also indicate that more than observed signature is required to validate that assertion.

If, at 1004*b*, an assertion check does not require multiple observed signatures, then the method 1000*b* can proceed back to act 1004*a* of method 1000*a* (FIG. 10A). As stated earlier, method 1000*a* of FIG. 10A provides a simplified method for validating assertion checks that require only a single observed signature.

Otherwise, if it is determined at 1004*b* that an assertion check requires multiple observed signatures for validation, then at 1006*b*, in respect of each such assertion check—the signature analysis subsystem 126 can extract: (i) the timecode range (e.g., 806*b* in FIG. 8C) for validating that assertion check, as well as (ii) one or more attributes of that assertion check. The extracted attributes can include, for example, the type of assertion check 802*b* (FIGS. 8B, 8C) that requires validating (e.g., content match or frozen frame). In the case of a content match assertion, this may also include extracting the media stream ID 804*b*, frame tolerance 812*b* and mismatch tolerance 814*b* (FIG. 8C). In the case of a frozen media frame assertion check, this can include extracting the distance tolerance 810*d*, failure threshold 812*d* and/or outlier tolerance 814*d*.

At 1008*b*, at some subsequent point in time, the signature analysis subsystem 126 can receive observed signature data (e.g., an observed signature file, or observed frame summary). The observed signature data can be received in real-time or near real-time from a probing module 118. Analogous to act 1006*a* of method 1000*a*, the observed signature data may be received automatically or upon request by the signature analysis subsystem 126.

Upon receiving the observed signature data, the signature analysis subsystem 126 can extract one or more attributes from the received observed signature data. For example, in the case of an observed signature file (400*a* of FIG. 4A), this can include extracting the timestamp data 408, the probe ID 410 and/or the media type definition 412. In the case of an observed frame summary (400*c* of FIG. 4C), this may also include extracting the timestamp data 408, the probe ID 410, as well as determining the media type definitions based on the fields 412*a*-412*d*, or the frame section 420*c* carrying the observed media frame signatures.

At 1010*b*, the media analysis subsystem 126 may determine if the extracted timestamp 408 is within the timecode range of any of the assertion checks identified at 1004*b*.

If it is determined that the received observed signature has a timestamp within a timecode range for one or more assertion checks, then at 1012*b*, for those identified assertion checks—the signature analysis subsystem 126 may determine if the identified assertion checks are applicable to that observed signature.

For example, this may involve cross-referencing the extracted probe ID 410 to the identified assertion checks to determine if the assertion check is included in an assertion schedule that is associated with that particular probe ID. In other cases, the assertion check itself may include an indication of the associated probe ID which can be cross-referenced. As well, certain assertion checks may be only applicable to certain types of media streams (e.g., video, audio, etc.). Accordingly, at 1012*b*, it may also be determined whether any of the extracted media definition type(s) 412 corresponds to the media assertion field 802*b*, 802*d* in the assertion checks (e.g., FIGS. 8B-8D).

If the observed media frame signatures do not align with any assertion checks, then the method 1000*b* may return to act 1008*b* to continue receiving new observed signatures.

Otherwise, if one or more relevant assertion checks are identified, then at 1014*b*, it is determined whether all observed media frame signatures have been received in order to validate that assertion check. For example, for a content match assertion, it may be determined whether the number of received observed media frame signatures is equal to the number expected media frame signatures included in the assertion check. This allows for a one-to-one comparison between observed and expected media frame signatures as shown in FIG. 8E.

If it is determined, at act 1014*b*, that the minimum number of observed media frame signatures has been received (if applicable), then at act 1018*b* the assertion condition associated with the assertion check may be validated.

For example, in the case of a content match assertion, this may involve comparing each observed signature to each corresponding expected signature and calculating a similarity metric (FIG. 8E). If the similarity metric (e.g., the hamming distance or cosine similarity measure) is within the frame tolerance (e.g., 812*b* in FIGS. 8B, 8C) for each comparison, and the number of mismatches does not exceed the mismatch tolerance (814*b* in FIGS. 8B, 8C), then the assertion check may be successfully validated. Otherwise, the assertion check may fail.

Otherwise, in the case of a frozen frame assertion check, validating the assertion condition may involve calculating a similarity metric (e.g., a hamming distance or cosine similarity measure) between consecutive (e.g., temporally consecutive) received observed media frame signatures, and determining if the similarity metric is below the distance tolerance in the assertion check (e.g., 810*d* in FIG. 8D). Further, if the similarity metric between two observed media frame signatures is below the distance tolerance (e.g., the frames are too similar), further ensuring that within a subset sequence of frames that equals the failure threshold plus the outlier tolerance (812*d*, 814*d*), there are not a number of frozen frames equal to the failure threshold (812*d*), otherwise the assertion check fails.

Once the assertion check has been either successfully or unsuccessfully validated, the assertion check may be "retired". In other words, the assertion check may be removed from subsequent consideration by the signature analysis subsystem 128.

In other cases, where at act 1014*b*, the required number of observed signatures for validating an assertion check have not been received, then at 1016*b*, in some cases, the received observed signatures may be buffered (e.g., in the server memory 102*b*) in a buffering set of most recently received observed signature. Further, the method 1000*b* may return to act 1008*b* to iterate until the required number of observed signatures has been received (e.g., in the buffering set), at which case the assertion check can be validated at act 1018*b*. In other embodiments, the signature analysis subsystem 126 may automatically begin validating an assertion check as the observed signatures are being received without necessarily waiting and buffering for all observed signatured to be received. As explained in greater detail with reference to FIGS. 10D and 10E, the assertion checks can also be validated on a "rolling basis".

Returning to act 1010*b*, if observed signature data is received which has a timestamp that is outside of any assertion timecode range, then the method may proceed to act 1002*c* of method 1000*c* in FIG. 10C.

At 1002*c*, it is determined whether—despite the observed signature having a timestamp outside any assertion timecode range—the observed signature relates to any non-retired assertion checks (e.g., assertion checks that have not yet been validated in a successful or failed manner). Act 1002*c* may be performed in an analogous manner to act 1012*b* of method 1000*b*. For example, the system may determine if there are any assertion checks are associated with the same probe ID or media stream type corresponding to the received observed signature. If, at 1002*c*, the observed signature is determined not to align with any non-retired assertion checks, then the method may return to act 1008*b* of method 1000*b*.

Otherwise, if a non-retired assertion check is identified at 1002*c*, then at 1004*c* it is determined whether, for the identified non-retired assertion check, whether all observed signatures required to validate that assertion check have been received. Act 1004*c* may be determined in an analogous manner to act 1014*b* of method 1000*b*.

If all observed signatures are determined to be received at act 1004*c*, then the method may return to act 1018*b* to validate that assertion check (e.g., if it has not yet been validated). Otherwise, at act 1006*c*, an output is generated that insufficient observed media frames have been received to allow for validating the assertion check. In this case, an output corresponding to an ambiguous assertion check is generated. An assertion check may be assigned an ambiguous output state where observed media frames were, for example, lost during transmission, thereby preventing a complete validation of that assertion check.

Figure 10D:
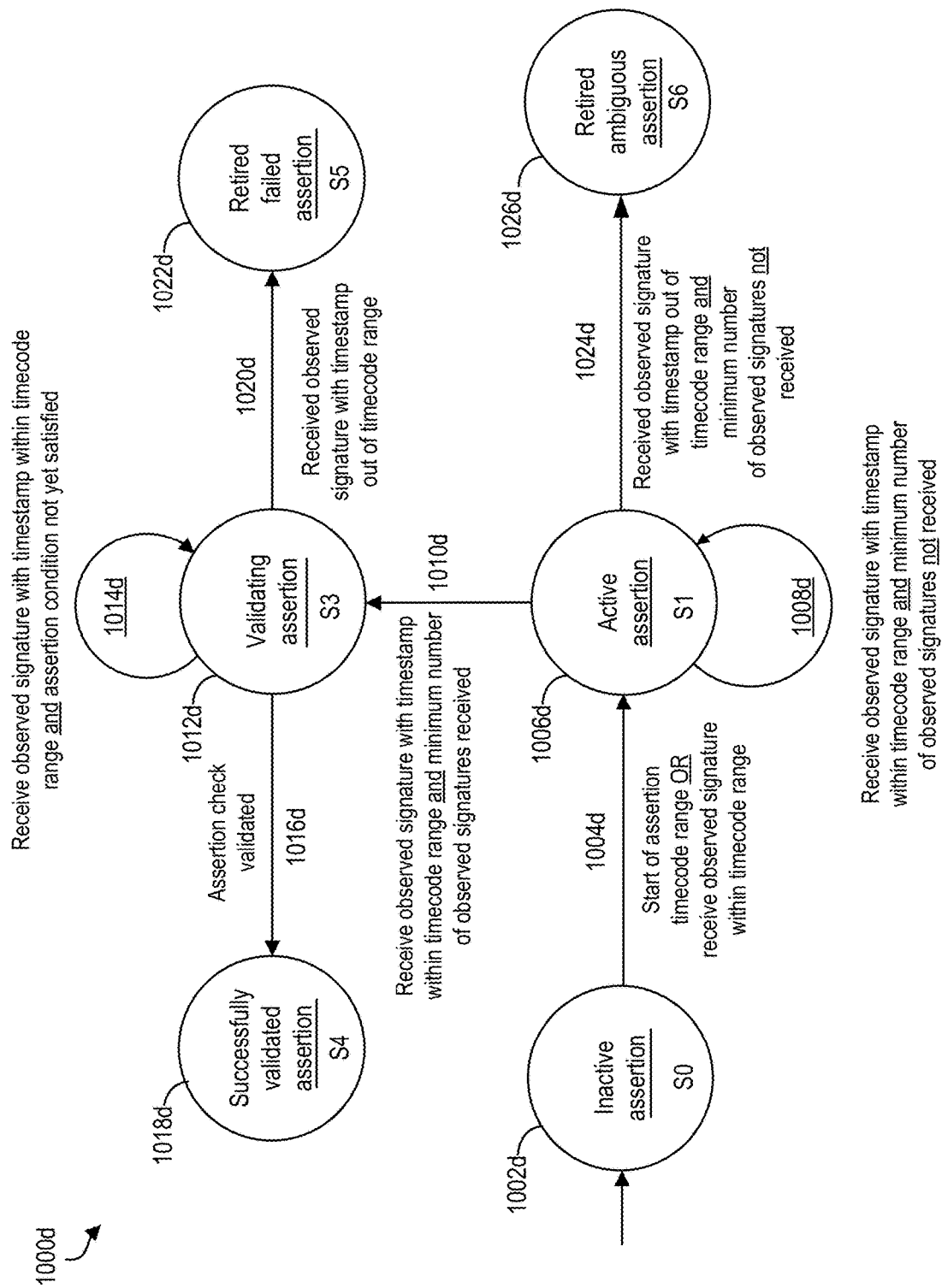
FIG. 10D is an example state diagram for an assertion check in a media assertion schedule.

Reference is now made to FIG. 10D, which shows an example state diagram 1000*d* which illustrates the various states for an assertion check. At any given time instance, the signature analysis subsystem 126 may alternate the state of an assertion check between the various states shown in the state diagram 1000*d*. This may allow the signature analysis subsystem 126 to concurrently manage a plurality of assertion checks having overlapping timecode ranges (e.g., FIG. 8I). Concurrent reference is also made to FIG. 10E, which provides a pictorial example illustration of the state diagram 1000*d* shown in FIG. 10D.

At 1002*d*, the initial state of an assertion check in an assertion schedule may be an inactive state (e.g., an initial inactive '50' state). In this initial state, the timecode for validating the assertion check has not yet commenced.

At 1004*d*, the signature analysis subsystem 126 can determine that the current time is equal to the start timecode (e.g., 806*b*1 in FIG. 8C) for the assertion check. For example, the signature analysis subsystem 126 may have an internal clock (e.g., locked to PTP), and may reference the internal clock to determining the beginning of the start timecode for the assertion check. In other cases, rather than relying on an internal clock, the signature analysis subsystem 126 may simply monitor the timestamps for incoming observed signature, which may themselves be locked to PTP.

At 1006*d*, once the timecode range start for the assertion check, the signature analysis subsystem 126 may transform the state of that assertion check to an active state (e.g., 'S1' at 1006*d*). In this state, the signature analysis subsystem 126 may actively monitor for received observed signatures that are related to the assertion check, and that can be used to validate the assertion check. To this end, the assertion check may be maintained in the active state insofar as the time has not yet reached the end timecode for the assertion check (e.g., 806*b*2 in FIG. 8C) as either determined by an internal PTP clock, or the timestamps in received in observed signatures.

At 1008*d*, in the active state, the signature analysis subsystem 126 may monitor and receive observed signatures having timestamps within the assertion timecode range. For each received observed signature, the signature analysis subsystem 126 may extract and analyze the attributes of that observed signature to determine whether the observed signature is relevant to the assertion check. For example, this may be performed in an analogous manner to acts 1008*b* and 1012*c* in methods 1000*b* and 1000*c*.

During the active state 1006*d*, the signature analysis subsystem 126 may also monitor whether it has received the minimum number of observed media frame signatures required to validate the assertion check. The subsystem 126 may maintain the assertion check in the active state 1006*d* until the minimum number of observed signatures are received.

Figure 10E:
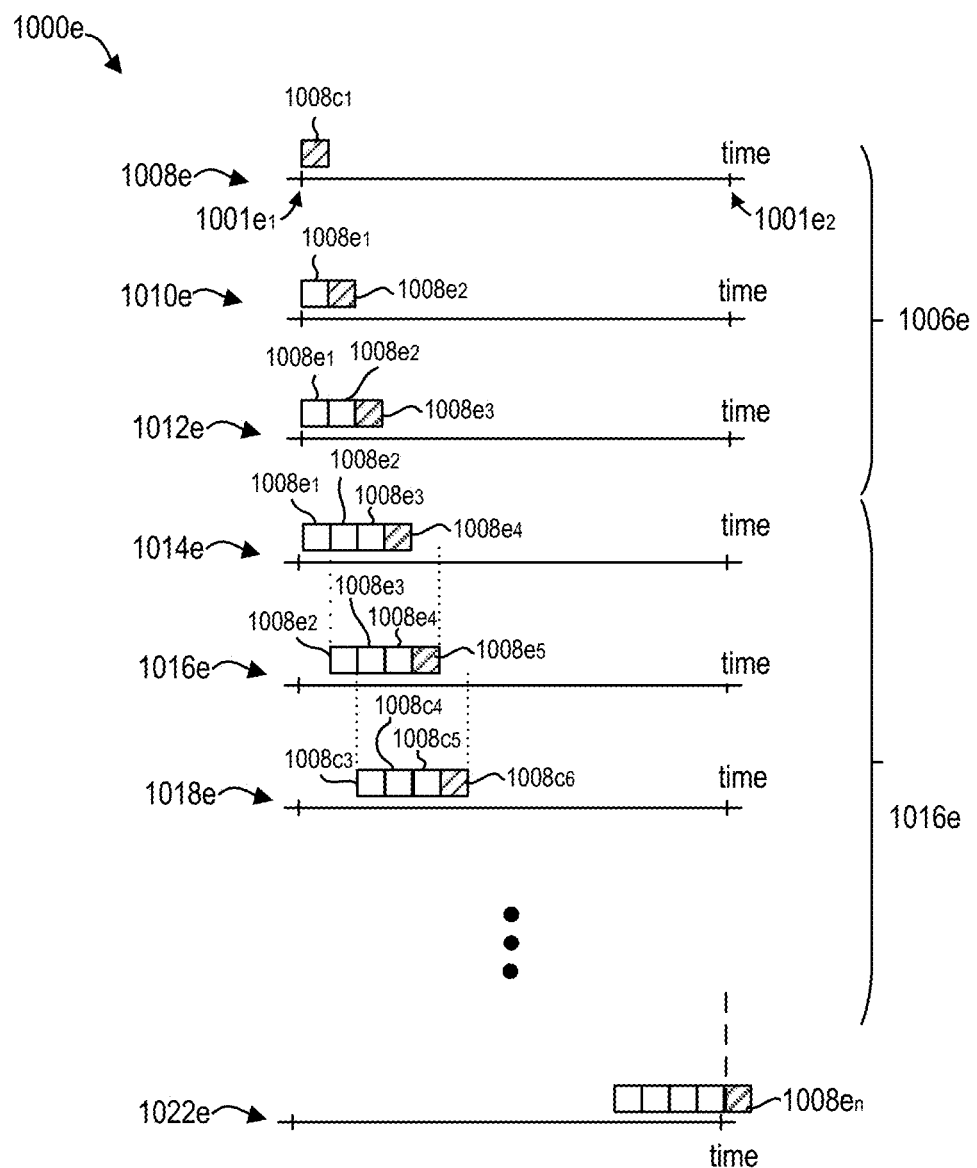
FIG. 10E is an example visualized timeline for receiving observed media frame signatures.

For example, referring briefly to FIG. 10E, which provides a schematic illustration 1000*e* of an example assertion check. In this example, the assertion check (e.g., a content match assertion) requires at least four (4) observed media frame signatures before the assertion check can be validated. The example assertion check has a start timecode 1001*e*1 and an end timecode 1001*e*2. In this example, the timecode range may be a wide timecode range, or a timecode range that is wider than the actual expected output time for the four expected media frame signatures (e.g., analogous to FIG. 8H).

As shown, at time instance 1008*e*, only a single observed media frame signature 1008*c*1 is received, and having a timestamp within the wide timecode range. At time instances 1010*e* and 1012*e*, a consecutive second and third observed media frame signatures 1008*c*2 and 1008*c*3 are further received, and also having timestamps within the wide timecode range. Accordingly, for the duration 1006*e*, the media analysis subsystem 126 maintains the assertion check in the active state, as the minimum number of observed signatures (e.g., four signatures) has not yet been received to validate the assertion check.

Referring back FIG. 10D, at 1010*d*, if the minimum number of applicable observed media frame signatures, having timestamps within the timecode range, are received, then the signature analysis subsystem 126 may transform the state of the assertion check from an active state to a validating state (e.g., 'S3' at 1012*d*).

For example, as shown in FIG. 10E, at the time instance 1014*e*, a fourth observed media frame signature 1008*e*4 is received, and having a timestamp within the wide timecode range. Accordingly, at this point, at least four observed media frame signatures have been received that can be used for validating the assertion check. As such, at the time instance 1012*e*, the assertion check may be transformed to validating state 1012*d*.

In the validating state 1012*d*, the signature analysis subsystem 126 may begin analyzing the received observed media frames signatures to determine whether the assertion check is validated. For example, for a content match assertion, this may involve comparing the received observed signatures to the expected observed signatures as previously discussed.

If the received observed media frame signatures immediately satisfy the assertion check, then at 1016*d*, the signature analysis subsystem 126 may transform the assertion check state to a successfully validated state (e.g., 'S4' at 1018*d*). The assertion check would then be retried and deemed successfully validated. For example, in FIG. 10E, if the first four observed signatures 1008*e*1-1008*e*4 match a corresponding four expected media frame signatures within the frame tolerance and mismatch tolerance parameters (e.g., 812*b*, 814*b* in FIG. 8C) in the assertion check, then the signature analysis subsystem 126 may transform the assertion check state to a successfully validated state.

However, if the received observed media frame signatures (e.g., 1008*e*1-1008*e*4 in FIG. 10E) do not immediately satisfy the assertion check parameters, then at 1014*d*, the media analysis subsystem 126 may maintain the assertion check in the validating state 1012*d*. In the validating state 1012, the media analysis subsystem 126 may continue monitoring and receiving applicable observed signatures having timestamps within the assertion timecode range.

In some embodiments, during the validating state 1012*d*, the media analysis subsystem 126 may also continue re-evaluating (e.g., re-assessing) whether the assertion check has been validated, on a "rolling basis", at each instance one or more new observed signatures are received.

For example, in FIG. 10E, at time instance 1016*e*, the signature analysis subsystem 126 may receive a new relevant observed media frame signature 1008*e*5. The subsystem 126 may then re-assess whether the assertion check is validated by comparing the four (4) most recently received observed signatures (e.g., 1008*e*2-1008*e*5) against the corresponding expected signatures included in the assertion check. That is, upon receiving a new media frame signature 1008*e*5, the subsystem 126 may "drop" the oldest received signature 1008*e*1, and may assess the assertion check in view of the most recently received observed signatures 1008*e*2-1008*e*5.

If the assertion check is still not validated using the most recently received observed signatures (e.g., 1008*e*2-1008*e*5), then at time instance 1018*e*, the subsystem 126 may again receive a new observed signature having a timestamp within the timecode range (e.g., 1008*e*6). Again, the subsystem 126 may "drop" the oldest received observed signature (e.g., 1008*e*2), and may re-assess the assertion check by comparing the four (4) most recently received observed signatures (e.g., 1008*e*3-1008*e*6) against the corresponding expected signatures in the assertion check. Accordingly, for the time duration 1016*e* in FIG. 10E, the media analysis subsystem 126 may continue re-assessing the assertion check on a "rolling basis" in view of the most recently received observed media signatures, and until the assertion check is validated.

In some embodiments, each time the signature analysis subsystem 126 re-assesses the assertion check, it may track the similarity metric as between the observed and expected signatures to determine the level of similarity or dissimilarity between the signature sets (e.g., maximum calculated hamming distance). In other cases, it may track the average calculated similarity as between all compared observed and expected signatures (e.g., average calculated hamming distance). It may then record this value in memory to allow for subsequent auditing or debugging in the case the assertion check is not validated.

Referring back to FIG. 10D, at 1020*d*, if an observed signature is received having a timestamp outside of the timecode range—or otherwise if the internal clock indicates the time has passed the end of the timecode range—and the assertion check has still not been validated, then the signature analysis subsystem may transform the state of the assertion check to a failed assertion (e.g., 'S5' at 1022*d*). In this case, the assertion check has not been successfully validated, and the subsystem 126 may otherwise retire the assertion in the failed validation state.

For example, in FIG. 10E, at time instance 1022*e*, an observed media frame signature 1008*en* is received having a timestamp outside of the timecode range. If, at this point, the four most recently received observed signatures having timestamps within the timecode range do not satisfy the assertion check, then the assertion check fails.

Similarly, in the case where the assertion check is still in an active state 1006*d*, and an observed media frame signature is received having a timestamp outside of the timecode range—or otherwise, the internal clock indicates the time has passed the timecode range—and the minimum number of observed signatures required to validate the assertion check have not been received, then at 1024*d* the assertion check state is transformed to an ambiguous state (e.g., 'S6' at 1026*d*). The ambiguous state indicates that insufficient observed media frame signatures have been received to determine whether the assertion was successfully validated, or otherwise failed.

Figure 11A:
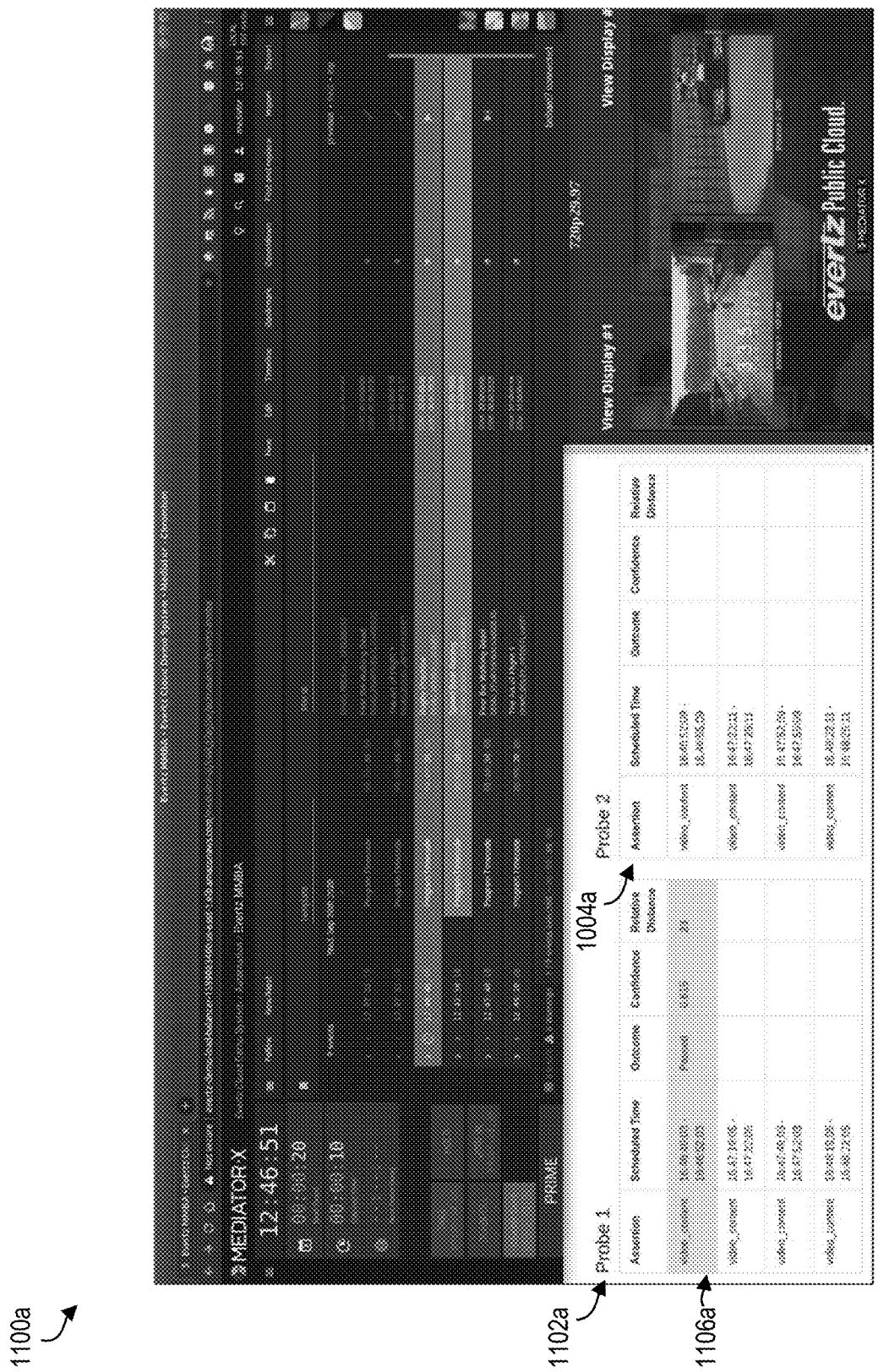
FIG. 11A is an example embodiment of a graphical user interface for displaying the output results of a media channel monitoring system.

Reference is now made to FIGS. 11A and 11C, which show example graphical user interfaces (GUIs) for displaying the output results from the signature analysis subsystem 126. The GUIs in these figures may be displayed, for example, on a display 102*a* of an administrator computer 112.

Figure 11B:
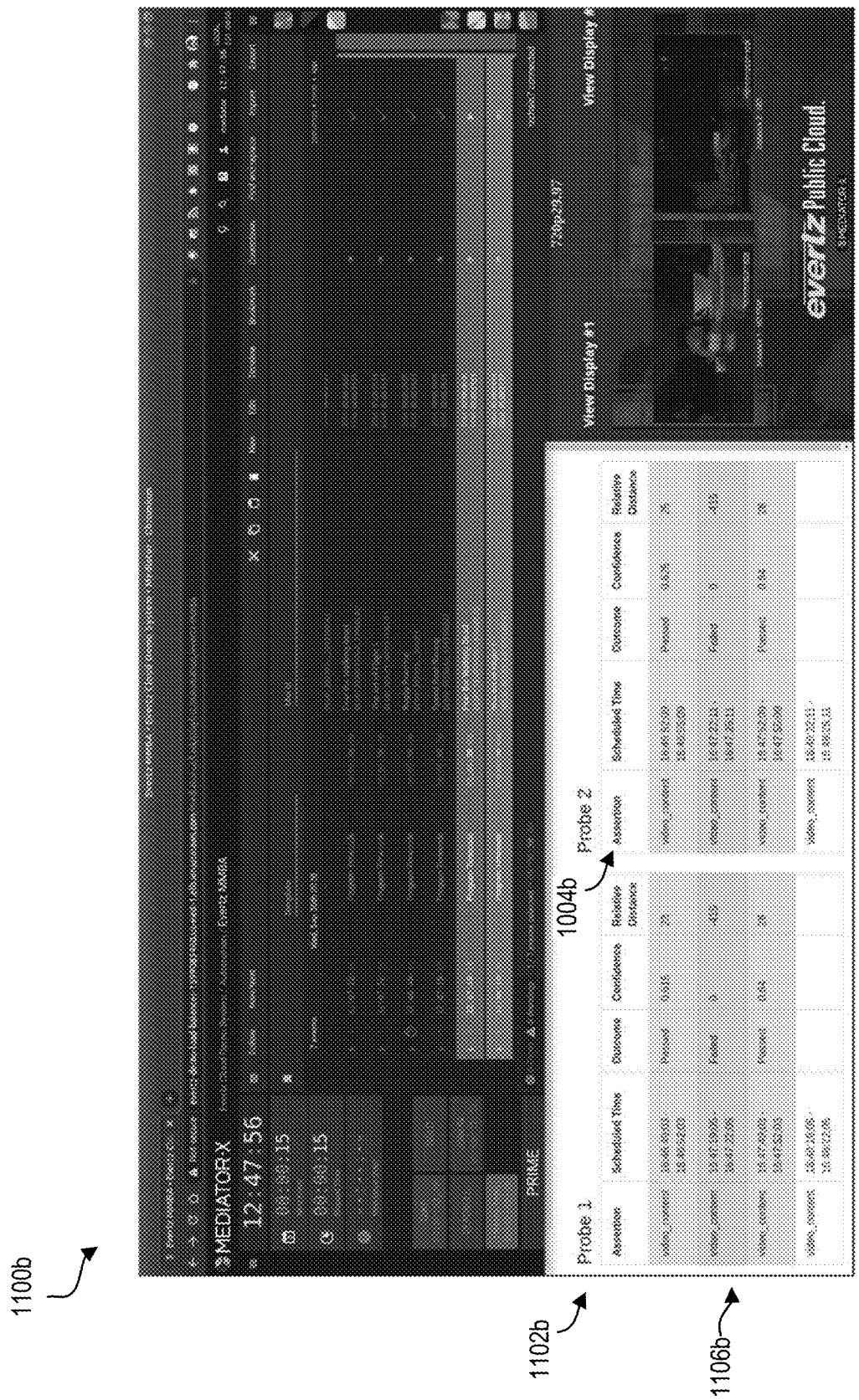
FIG. 11B is another example embodiment of a graphical user interface for displaying the output results of a media channel monitoring system.

FIG. 11A shows a first example GUI 1100*a* and includes an assertion schedule 1002*a* for a first media channel monitored by a first probe and an assertion schedule 1004*a* for a second media channel monitored by a second probe. In this example case, the first assertion schedule 1102*a* includes a video content match assertion check 1106*a* that requires validating at a pre-defined timecode range. In this case, the content match assertion check 1106*a* was successfully validated. In this case, the GUI 1100*a* also expresses a relative distance value (e.g., a mean hamming distance over the time range), as well as a confidence value (e.g., a scaled relative distance). FIG. 11B shows a similar GUI 1100*b* and showing an example where a video content match assertion check 1106 failed.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

Numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Reference throughout this specification to "one embodiment" or "an embodiment" means that a particular feature, structures, or characteristics may be combined in any suitable manner in one or more embodiments.

It should be noted that the term "coupled" used herein indicates that two elements can be directly coupled to one another or coupled to one another through one or more intermediate elements. Furthermore, the term "body" typically refers to the body of a patient, a subject or an individual who receives the ingestible device. The patient or subject is generally a human or other animal.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the programmable computers may be a server, network appliance, embedded device, computer expansion module, a personal computer, laptop, personal data assistant, cellular telephone, smartphone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g., ROM, magnetic disk, optical disc) readable by a general or special purpose programmable computer, for configuring and operating the computer when the storage media or device is read by the computer to perform the procedures described herein.

Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Some elements herein may be identified by a part number, which is composed of a base number followed by an alphabetical or subscript-numerical suffix (e.g., 112a, or $112_1$). Multiple elements herein may be identified by part numbers that share a base number in common and that differ by their suffixes (e.g., $112_1$, $112_2$, and $112_3$). All elements with a common base number may be referred to collectively or generically using the base number without a suffix (e.g., 112).

Items:

Item 1: A method for content aware monitoring of an output of a media channel by a media system, the method comprising:

receiving a media assertion schedule, the media assertion schedule comprising a schedule of assertion checks, the assertion checks allowing validation that the output of the media channel, by the media system, is synchronized with an expected media channel output, wherein each assertion check comprises (i) an assertion condition and (ii) at least one timecode, the at least one time code corresponding to a time instance or time range for validating the respective assertion condition;

receiving, from a signature generating module communicatively coupled to the media system, at least one observed signature file, each of the at least one received observed signature file comprising (i) an observed media frame signature and (ii) timestamp data, wherein each observed media frame signature corresponds to a processed version of at least a portion of a media frame output by the media system on the media channel, and the timestamp data indicates an output time of that media frame by the media system;

determining that the timestamp data, in each of the at least one received observed signature file, aligns with at least one timecode included in an assertion check in the media assertion schedule;

in response to the determination, identifying an assertion condition included in the assertion check;

validating the assertion condition using the observed media frame signatures included in each of the at least one received observed signature file; and if the assertion condition is validated, generating an output indicating that the media channel output, by the media system, is synchronized with the expected media channel output, otherwise if the assertion condition is not validated, generating the output indicating that the media channel output by the media system is not synchronized with the expected channel output.

Item 2: The method of any preceding item, wherein prior to receiving the observed signature file, the method further comprises:
- analyzing one or more media streams expected for output by the media system on the media channel, wherein each of the one or more media streams comprises a plurality of media frames; and
- generating, based on the one or more media streams, one or more expected media frame signatures, each of the one or more expected media frame signatures corresponding to a processed version of at least a portion of a media frame of a corresponding media stream of the one or more media streams.

Item 3: The method of any preceding item, wherein the assertion check comprises a content match assertion check, the content match assertion check including: (i) a timecode range corresponding to a time range for validating the assertion check, and (ii) at least one expected media frame signature corresponding to at least one media frame that is expected to be output by the media system within the timecode range.

Item 4: The method of any preceding item, further comprising validating the assertion condition in the content match assertion check by:
- calculating a similarity metric between each observed media frame signature included in the at least one received observed signature file and a corresponding at least one expected media frame signature included in the assertion check; and
- determining that each calculated similarity metric is above a pre-determined threshold.

Item 5: The method of any preceding item, wherein, (i) each observed media frame signature, in the at least one received observed signature file, corresponds to a hashed version of at least a portion of a video frame that is output by the media system on the media channel, and (ii) each at least one expected media frame signature included in the content match assertion check also corresponds to a hashed version of at least a portion of a video frame that is expected to be output by the media system within the timecode range.

Item 6: The method of any preceding item, wherein (i) each observed media frame signature, included in the received at least one observed signature file, corresponds to one or more zero crossing values of an audio frame that is output by the media system on the media channel, and (ii) each at least one expected media frame signature included in the content match assertion check also corresponds to one or more zero crossing values of an audio frame that is expected to be output by the media system within the timecode range.

Item 7: The method of any preceding item, wherein validating a content match assertion check further comprises using a state machine model, and the method further comprises:
- assigning the content match assertion check an initial inactive state;
- determining, (i) a timecode range for the content match assertion check, and (ii) a minimum number of observed signatures required to validate the assertion check, wherein the minimum number of observed signatures equals the number of expected signatures included in the content match assertion check;
- receiving, from the signature generating module, a first observed signature file including a first timestamp;
- determining that the first timestamp is within the timecode range;
- in response to the determination, varying the state of the content match assertion check to an active state and buffering the first observed signature file in a set of most recently received observed signatures;
- receiving, from the signature generating module, further observed signature files, wherein for each further received observed signature file:
  - determining (i) whether a timestamp of the further received observed signature file is within the timecode range, and (ii) whether the set of most recently received observed signatures includes the minimum number of observed signatures;
  - in response to determining that the timestamp is outside of the timecode range and the minimum number of observed signatures has not been received, varying the state of the content match assertion check to a retired ambiguous state;
  - in response to determining that the timestamp is within the timecode range and the minimum number of observed signatures has not been received, buffering the received observed signature file in the set of most recently received observed signatures and maintaining the content match assertion check in an active state;
  - in response to determining that the timestamp is within the timecode range and the set of most recently received observed signatures includes the minimum number of observed signatures, varying the state of the content match assertion check to a validating state and validating the content match assertion check using the observed signature files in the buffered set, and wherein the method further comprises:
    - in response to validating the content match assertion check, varying the content match assertion check to a successfully validated state; and
    - in response to failing to validate the content match assertion check, dropping the earliest received observed signature from the set of most recently received observed signatures, and monitoring to receive further observed signature files, and
  - wherein if the content match assertion check is in a validating state, and the minimum number of observed signatures has been received, and the timestamp of the further received observed signature file is not within the timecode range, then varying the state of the content match assertion check to a retired failed state.

Item 8: The method of any preceding item, wherein the assertion check comprises a frozen frame assertion check and a timecode range corresponding to a time range for validating the assertion check, and the method further comprises:
- receiving, from the signature generating module, a plurality of observed signature files, each of the plurality of observed signature files having timestamp data within the timecode range, the plurality of observed signature files corresponding to consecutive video frames output by the media system on the media channel; and
- validating the assertion condition in the frozen frame assertion check by:
  - calculating a similarity metric between the observed media frame signatures corresponding to consecutive video frames; and determining that each calculated similarity metric is below a pre-determined threshold.

Item 9: The method of any preceding item, further comprising initially generating the media assertion schedule by:
analyzing at least one of: (i) the one or more expected media frame signatures generated based on the one or more media streams, (ii) a media program schedule comprising a scheduled output of the one or more media streams on the media system, or (iii) metadata associated with the one or more media streams;
based on the analysis, determining one or more time intervals, in the one or more media streams, where the at least one media assertion rule is satisfied; and
if a media assertion rule is satisfied, generating an assertion check including a timecode range corresponding to the one or more time intervals.

Item 10: The method of any preceding item, further comprising:
identifying, in the media program schedule, the presence of scheduled graphic overlay data;
analyzing metadata associated with the graphic overlay data to determine one or more of size and placement of the graphic overlay data over a video frame;
in response to the analyzing, identifying one or more video frame portions, in the video frame, that do not include the graphic overlay data; and
generating a content match assertion check that includes expected signatures for the one or more video frame portions.

Item 11: A system for content aware monitoring of an output of a media channel by a media system, the system comprising:
a signature generating module communicatively coupled to the media system, wherein the signature generating module is operable to generate at least one observed signature file, each of the at least one observed signature file comprising (i) an observed media frame signature and (ii) timestamp data, wherein the observed media frame signature corresponds to a processed version of at least a portion of a media frame being output by the media system on the media channel, and the timestamp data indicates an output time of that media frame by the media system; and
a server processor configured to:
receive a media assertion schedule, the media assertion schedule comprising a schedule of assertion checks for validating that the output on the media channel by the media system is synchronized with an expected media channel output, wherein each assertion check comprises (i) an assertion condition and (ii) at least one timecode, the at least one timecode corresponding to a time instance or time range for validating the assertion condition;
receive, from a signature generating module, the at least one observed signature file;
determine that the timestamp data, in each of the at least one received observed signature file, aligns with at least one timecode in an assertion check in the media assertion schedule;
in response to the determination, identify an assertion condition included in the assertion check;
validate the assertion condition in the assertion check using the observed media frame signatures included in each of the at least one received observed signature file; and
if the assertion condition is validated, generate an output indicating that the media channel output by the media system is synchronized with the expected channel output, otherwise generate an output indicating that the media channel output by the media system is not synchronized with the expected channel output.

Item 12: The system of any preceding item, wherein prior to receiving the observed signature file, the server processor is further configured to:
analyze one or more media streams expected for output by the media system on the media channel, wherein each of the one or more media streams comprises a plurality of media frames; and
generate, based on the one or more media streams, one or more expected media frame signatures, each of the one or more expected media frame signatures corresponding to a processed version of at least a portion of a media frame of a corresponding media stream of the one or more media streams.

Item 13: The system of any preceding item, wherein the assertion check comprises a content match assertion check, the content match assertion check including, (i) a timecode range corresponding to a time range for validating the assertion check, and (ii) at least one expected media frame signature corresponding to at least one media frame that is expected to be output by the media system within the timecode range.

Item 14: The system of any preceding item, wherein in validating the assertion condition in the content match assertion check, the server processor is further configured to:
calculate a similarity metric between each observed media frame signature included in the at least one received observed signature file and a corresponding at least one expected media frame signature included in the assertion check; and
determine that each calculated similarity metric is above a pre-determined threshold.

Item 15: The system of any preceding item, wherein (i) each observed media frame signature, included in the at least one received observed signature file, corresponds to a hashed version of at least a portion of a video frame that is output by the media system on the media channel, and (ii) each at least one expected media frame signature included in the content match assertion check also corresponds to a hashed version of at least a portion of a video frame that is expected to be output by the media system within the timecode range.

Item 16: The system of any preceding item, wherein (i) each observed media frame signature, included in the received at least one observed signature file, corresponds to one or more zero crossing values of an audio frame that is output by the media system on the media channel, and (ii) each at least one expected media frame signature included in the content match assertion check also corresponds to one or more zero crossing values of an audio frame that is expected to be output by the media system within the timecode range.

Item 17: The system of any preceding item, wherein validating a content match assertion check further comprises using a state machine model, and the server processor is further configured to:
assign the content match assertion check an initial inactive state;
determine (i) a timecode range for the content match assertion check, and (ii) a minimum number of observed signatures required to validate the assertion check, wherein the minimum number of observed signatures equals the number of expected signatures included in the content match assertion check;

receive, from the signature generating module, a first observed signature file including a first timestamp;

determine that the first timestamp is within the timecode range;

in response to the determination, vary the state of the content match assertion check to an active state and buffering the first observed signature file in a set of most recently received observed signatures;

receive, from the signature generating module, further observed signature files, wherein for each further received observed signature file:

determine (i) whether a timestamp of the further received observed signature file is within the timecode range, and (ii) whether the set of most recently received observed signatures includes the minimum number of observed signatures;

in response to determining that the timestamp is outside of the timecode range and the minimum number of observed signatures has not been received, vary the state of the content match assertion check to a retired ambiguous state;

in response to determining that the timestamp is within the timecode range and the minimum number of observed signatures has not been received, buffer the received observed signature file in the set of most recently received observed signatures and maintaining the content match assertion check in an active state;

in response to determining that the timestamp is within the timecode range and the set of most recently received observed signatures includes the minimum number of observed signatures, vary the state of the content match assertion check to a validating state and validating the content match assertion check using the observed signature files in the buffered set, and wherein the method further comprises:

in response to validating the content match assertion check, vary the content match assertion check to a successfully validated state; and in response to failing to validate the content match assertion check, drop the earliest received observed signature from the set of most recently received observed signatures, and monitoring to receive further observed signature files, and wherein if the content match assertion check is in a validating state, and the minimum number of observed signatures has been received, and the timestamp of the further received observed signature file is not within the timecode range, then vary the state of the content match assertion check to a retired failed state.

Item 18: The system of any preceding item, wherein the assertion check comprises a frozen frame assertion check and a timecode range corresponding to a time range for validating the assertion check, and the server processor is further configured to:

receive, from the signature generating module, a plurality of observed signature files, each of the plurality of observed signature files having timestamp data within the timecode range, the plurality of observed signature files corresponding to consecutive video frames output by the media system on the media channel; and validate the assertion condition in the frozen frame assertion check by:

calculating a similarity metric between the observed media frame signatures corresponding to consecutive video frames; and determining that each calculated similarity metric is below a pre-determined threshold.

Item 19: The system of any preceding item, wherein the server processor is further configured to initially generate the media assertion schedule by:

analyzing at least one of: (i) the one or more expected media frame signatures generated based on the one or more media streams, (ii) a media program schedule comprising a scheduled output of the one or more media streams on the media system, or (iii) metadata associated with the one or more media streams;

based on the analysis, determining one or more time intervals, in the one or more media streams, where the at least one media assertion rule is satisfied; and if a media assertion rule is satisfied, generating an assertion check including a timecode range corresponding to the one or more time intervals.

Item 20: The system of any preceding item, wherein the server processor is further configured to:

identify in the media program schedule the presence of scheduled graphic overlay data;

analyze metadata associated with the graphic overlay data to determine one or more of size and placement of the graphic overlay data over a video frame;

in response to the analyzing, identify one or more video frame portions, in the video frame, that do not include the graphic overlay data; and generate a content match assertion check that includes expected signatures for the one or more video frame portions.

The invention claimed is:

1. A method for generating a media assertion schedule for content aware monitoring of an output of a media system, the method comprising:

accessing a media program schedule indicating one or more media streams scheduled to be output and metadata associated with the one or more scheduled media streams;

determining one or more media assertion rules for generating one or more assertion checks for one or more of: the media program schedule, the one or more scheduled media streams and one or more expected signatures generated based on the scheduled media streams;

for each media assertion rule, determining if the media assertion rule is satisfied and one or more time intervals corresponding to the media assertion rule being satisfied and generating a corresponding one or more assertion checks including a timecode range corresponding to the one or more time intervals, wherein determining if the media assertion rule is satisfied comprises analyzing one or more of: the media program schedule, the accessed metadata and the one or more expected signatures generated based on the scheduled media streams; and generating the media assertion schedule including the one or more assertion checks.

2. The method of claim 1, wherein accessing the metadata associated with the one or more scheduled media streams comprises:

extracting, from the media program schedule media stream identifiers for the one or more scheduled media streams; and retrieving the metadata using the media stream identifiers.

3. The method of claim 2, comprising retrieving the media streams associated with the media stream identifiers and retrieving the metadata from the retrieved media streams.

4. The method of claim 1, wherein each expected signature comprises a processed version of at least a portion of a media frame in a corresponding media stream.

5. The method of claim 4, comprising determining the one or more expected signatures by querying a corresponding one or more compact expected signature file using a media stream identifier.

6. The method of claim 1, wherein determining the one or more media assertion rules comprises retrieving from a storage the one or more pre-defined media assertion rules.

7. The method of claim 1, wherein each assertion check comprises a content match assertion check, the content match assertion check including: (i) a timecode range for validating the assertion check, and (ii) at least one expected signature for a portion of at least one media frame expected for output by the media system, within that timecode range.

8. The method of claim 1, wherein each assertion check comprises, (i) a frozen frame assertion check, and (ii) a timecode range for validating the frozen frame assertion check, and the method further comprises:
receiving a plurality of observed signature files, each observed signature file having timestamp data within the timecode range,
wherein the plurality of observed signature files are generated for consecutive video frames output by the media system; and
validating the frozen frame assertion check by:
calculating a similarity metric between the observed and expected signatures corresponding to the consecutive video frames; and
determining that each calculated similarity metric is below a pre-determined threshold.

9. The method of claim 1, wherein the media streams comprise one or more of a video stream, an audio stream, an auxiliary data stream.

10. The method of claim 1, wherein determining if the media assertion rule is satisfied further comprises analyzing the one or more scheduled media streams.

11. A system for generating a media assertion schedule for content aware monitoring of an output of a media system, the system comprising:
a server processor configured for:
accessing a media program schedule indicating one or more media streams scheduled to be output and metadata associated with the one or more scheduled media streams;
determining one or more media assertion rules for generating one or more assertion checks for one or more of: the media program schedule, the one or more scheduled media streams and one or more expected signatures generated based on the scheduled media streams;
for each media assertion rule, determining if the media assertion rule is satisfied and one or more time intervals corresponding to the media assertion rule being satisfied and generating a corresponding one or more assertion checks including a timecode range corresponding to the one or more time intervals,
wherein determining if the media assertion rule is satisfied comprises analyzing one or more of: the media program schedule, the accessed metadata and the one or more expected signatures generated based on the scheduled media streams; and
generating the media assertion schedule including the one or more assertion checks.

12. The system of claim 11, wherein accessing the metadata associated with the one or more scheduled media streams comprises:
extracting, from the media program schedule media stream identifiers for the one or more scheduled media streams; and
retrieving the metadata using the media stream identifiers.

13. The system of claim 12, wherein the server processor is configured for retrieving the media streams associated with the media stream identifiers and retrieving the metadata from the retrieved media streams.

14. The system of claim 11, wherein each expected signature comprises a processed version of at least a portion of a media frame in a corresponding media stream.

15. The system of claim 14, wherein the server processor is configured for determining the one or more expected signatures by querying a corresponding one or more compact expected signature file using a media stream identifier.

16. The system of claim 11, wherein determining the one or more media assertion rules comprises retrieving from a storage the one or more pre-defined media assertion rules.

17. The system of claim 11, wherein each assertion check comprises a content match assertion check, the content match assertion check including: (i) a timecode range for validating the assertion check, and (ii) at least one expected signature for a portion of at least one media frame expected for output by the media system, within that timecode range.

18. The system of claim 11, wherein each assertion check comprises, (i) a frozen frame assertion check, and (ii) a timecode range for validating the frozen frame assertion check, and the method further comprises:
receiving a plurality of observed signature files, each observed signature file having timestamp data within the timecode range,
wherein the plurality of observed signature files are generated for consecutive video frames output by the media system; and
validating the frozen frame assertion check by:
calculating a similarity metric between the observed and expected signatures corresponding to the consecutive video frames; and
determining that each calculated similarity metric is below a pre-determined threshold.

19. The system of claim 11, wherein the media streams comprise one or more of a video stream, an audio stream, an auxiliary data stream.

20. The system of claim 11, wherein determining if the media assertion rule is satisfied further comprises analyzing the one or more scheduled media streams.

* * * * *